(12) United States Patent
Asveren et al.

(10) Patent No.: US 11,647,072 B2
(45) Date of Patent: May 9, 2023

(54) METHODS AND APPARATUS FOR EFFICIENT FAILURE RECOVERY AND SCALING OF A COMMUNICATIONS SYSTEM

(71) Applicant: Ribbon Communications Operating Company, Inc., Westford, MA (US)

(72) Inventors: Tolga Asveren, Bordentown, NJ (US); Subhransu S. Nayak, Acton, MA (US); Aby Kuriakose, Howell, NJ (US)

(73) Assignee: Ribbon Communications Operating Company, Inc., Westford, MA (US)

( * ) Notice: Subject to any disclaimer, the term of this patent is extended or adjusted under 35 U.S.C. 154(b) by 0 days.

(21) Appl. No.: 17/573,563

(22) Filed: Jan. 11, 2022

(65) Prior Publication Data
US 2022/0224751 A1 Jul. 14, 2022

Related U.S. Application Data

(60) Provisional application No. 63/136,178, filed on Jan. 11, 2021.

(51) Int. Cl.
*H04L 9/40* (2022.01)
*H04L 65/10* (2022.01)
*H04L 65/1073* (2022.01)
*H04L 67/1034* (2022.01)
*H04L 67/1038* (2022.01)
*H04L 69/16* (2022.01)
*H04L 67/1001* (2022.01)
*H04L 65/1104* (2022.01)

(52) U.S. Cl.
CPC ...... *H04L 67/1001* (2022.05); *H04L 63/0442* (2013.01); *H04L 65/1073* (2013.01); *H04L 65/1104* (2022.05); *H04L 69/16* (2013.01)

(58) Field of Classification Search
None
See application file for complete search history.

(56) References Cited

U.S. PATENT DOCUMENTS

| | | | | |
|---|---|---|---|---|
| 10,523,733 | B1* | 12/2019 | Bharrat | H04L 65/1069 |
| 10,594,821 | B1* | 3/2020 | Tylee | H04L 67/1029 |
| 2008/0282254 | A1* | 11/2008 | Blander | H04L 67/1001 |
| | | | | 718/105 |

(Continued)

*Primary Examiner* — Duc T Duong
(74) *Attorney, Agent, or Firm* — Straub & Straub; Stephen T. Straub; Michael P. Straub

(57) ABSTRACT

The present invention relates to communications methods and apparatus for distributing Session Initiation Protocol (SIP) messages among SIP processing entities including during periods of failure recovery. An exemplary method embodiment includes the steps of: establishing a first connection oriented protocol connection between a first Session Initiation Protocol Load Balancer (SLB) of a plurality of SLBs and a client device; receiving via the first connection oriented protocol connection at the first SLB a first SIP REGISTER request message from the first client device; determining, by the first SLB, based on information received from the client device, a first Session Border Controller (SBC) from a plurality of SBCs to send the first SIP REGISTER request message, said information uniquely identifying the first SBC from other SBCs in the plurality of SBCs; and sending, by the first SLB, the first SIP REGISTER request message to the first SBC.

20 Claims, 14 Drawing Sheets

(56) References Cited

U.S. PATENT DOCUMENTS

| | | | | |
|---|---|---|---|---|
| 2009/0323677 A1* | 12/2009 | Mehmood | ........... | H04L 65/1069 370/352 |
| 2010/0002686 A1* | 1/2010 | Rosenberg | .......... | H04M 7/0057 370/352 |
| 2011/0075652 A1* | 3/2011 | Ogura | ................ | H04L 65/4053 370/351 |
| 2011/0145639 A1* | 6/2011 | Farahmand | ......... | H04L 67/1031 714/25 |
| 2013/0054806 A1* | 2/2013 | Francis | .............. | H04L 67/1001 709/226 |
| 2013/0286836 A1* | 10/2013 | Uzelac | ................... | H04L 65/00 370/235 |
| 2015/0358458 A1* | 12/2015 | Jenkins | .............. | H04L 65/1013 370/230 |
| 2017/0163537 A1* | 6/2017 | Peterson | ............. | H04L 67/1025 |
| 2018/0227165 A1* | 8/2018 | Philip | ................... | H04L 47/748 |
| 2021/0006662 A1* | 1/2021 | Rosenberg | .......... | H04L 67/1008 |

\* cited by examiner

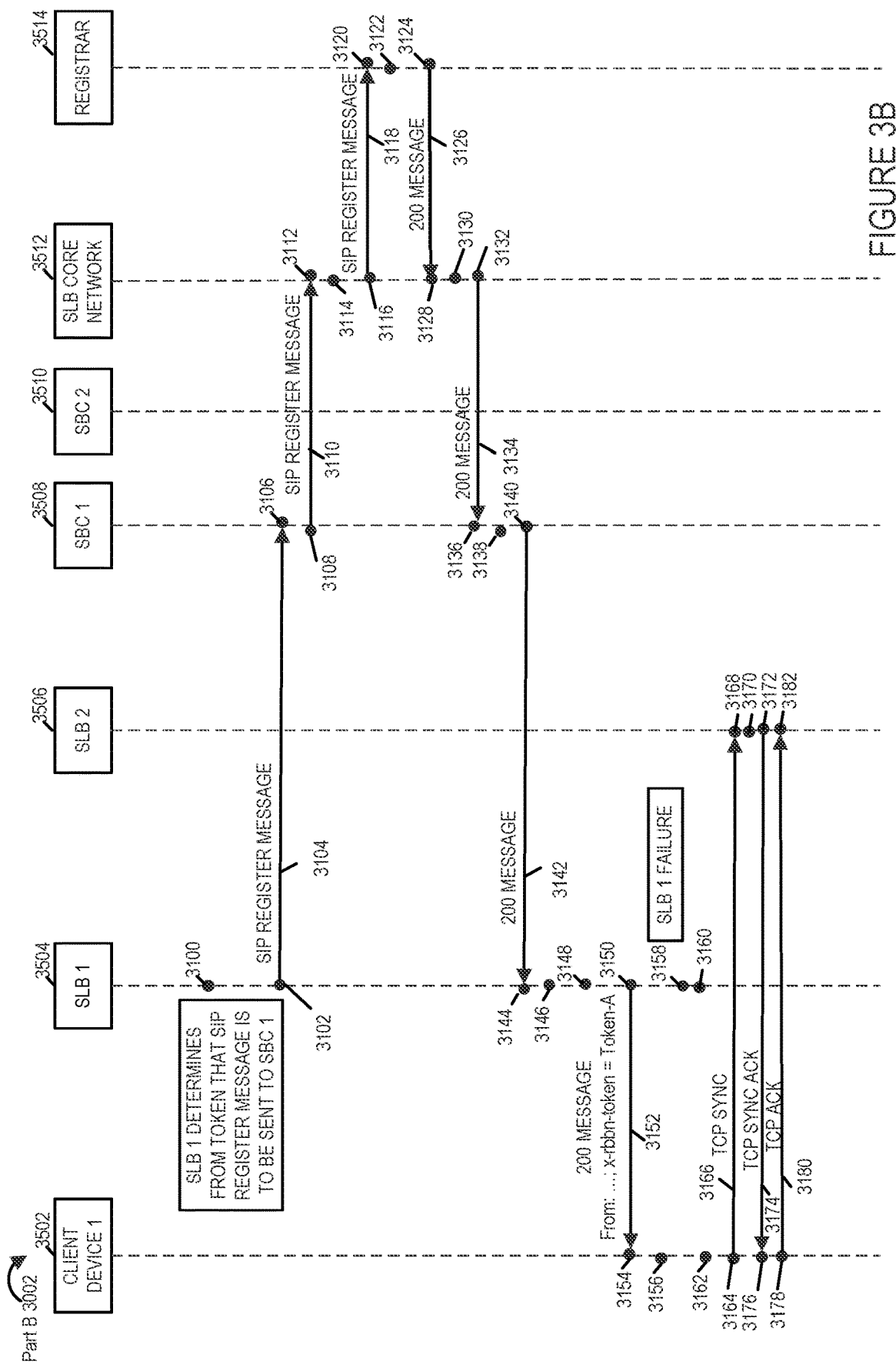

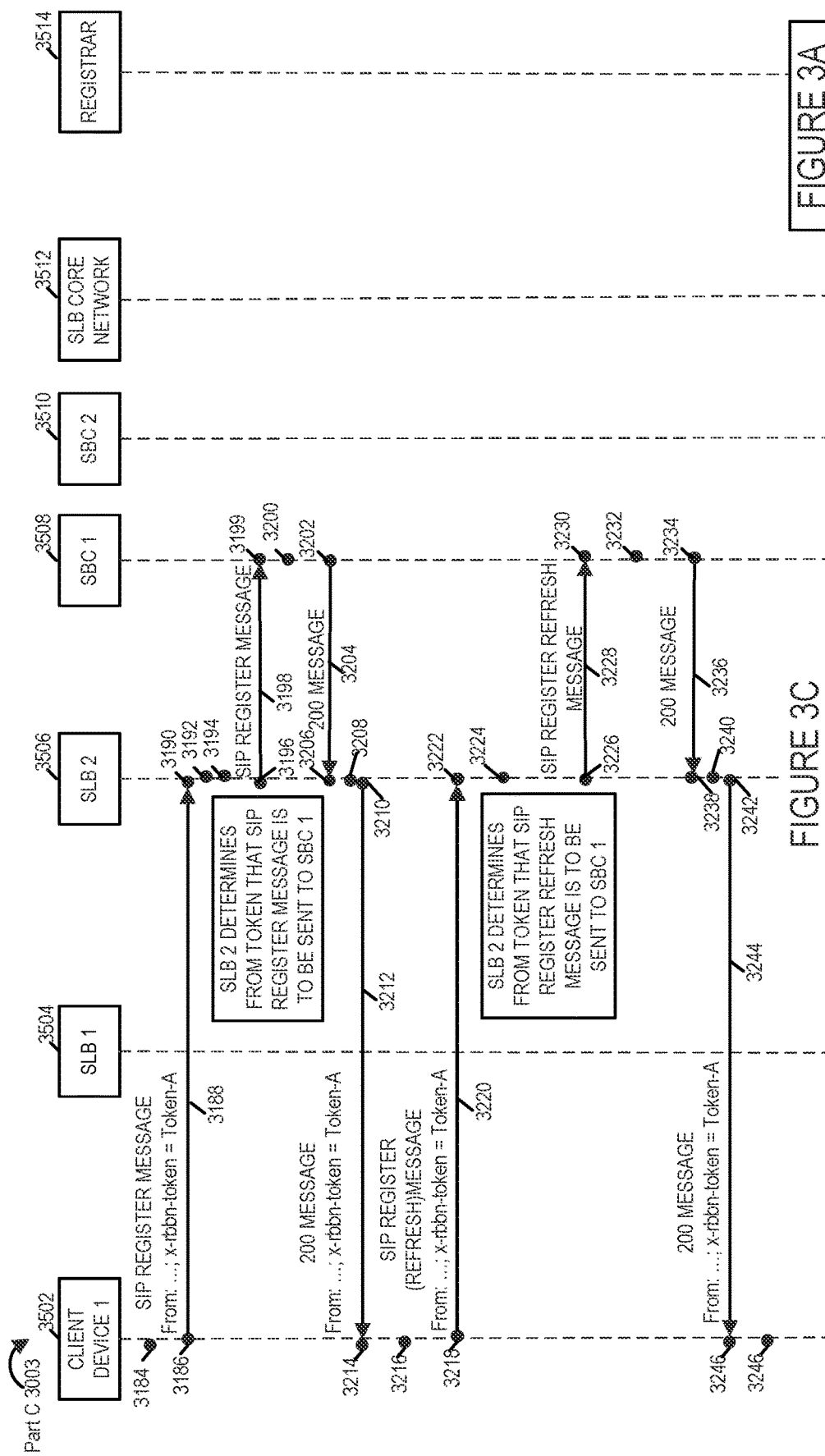

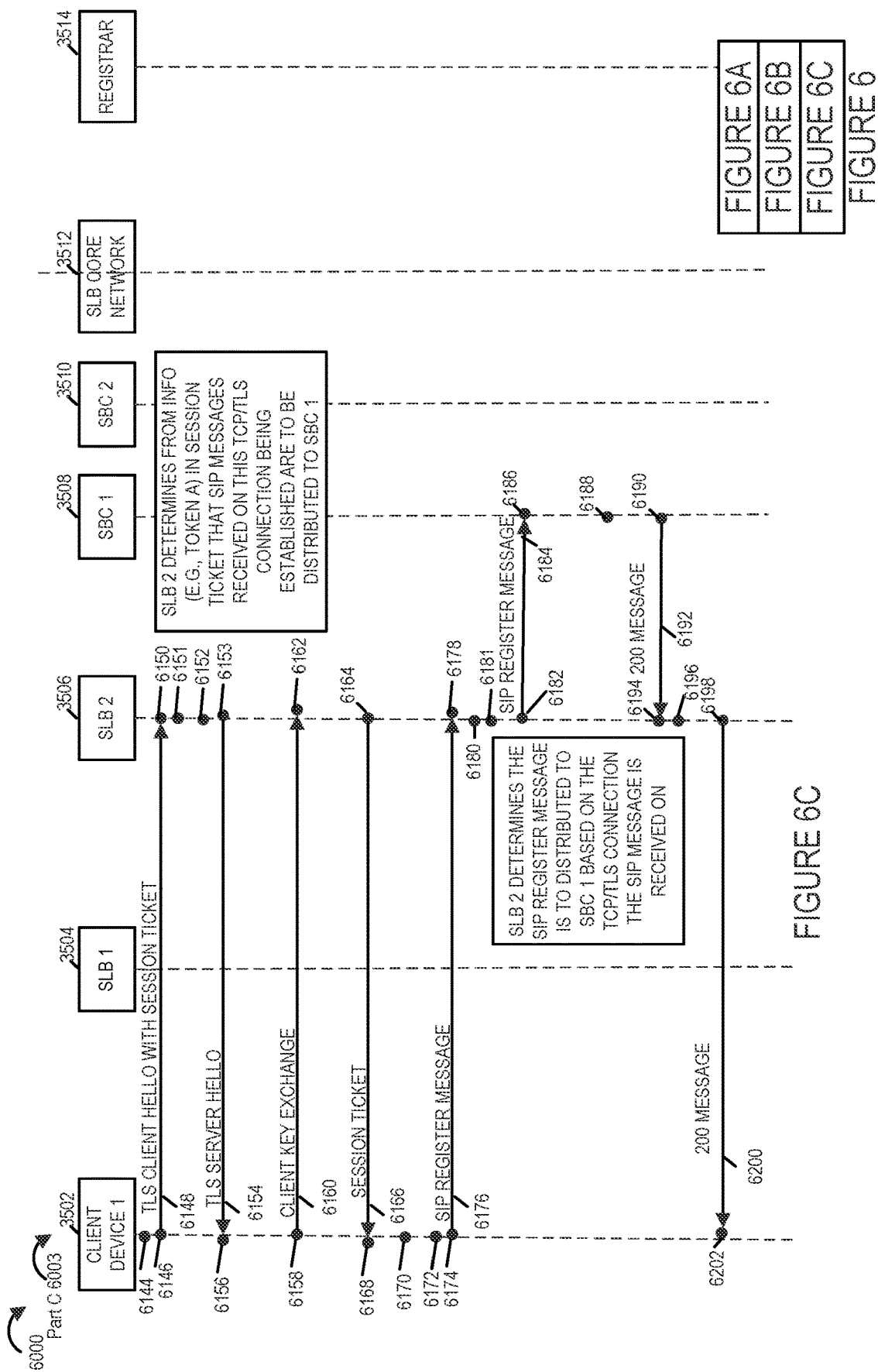

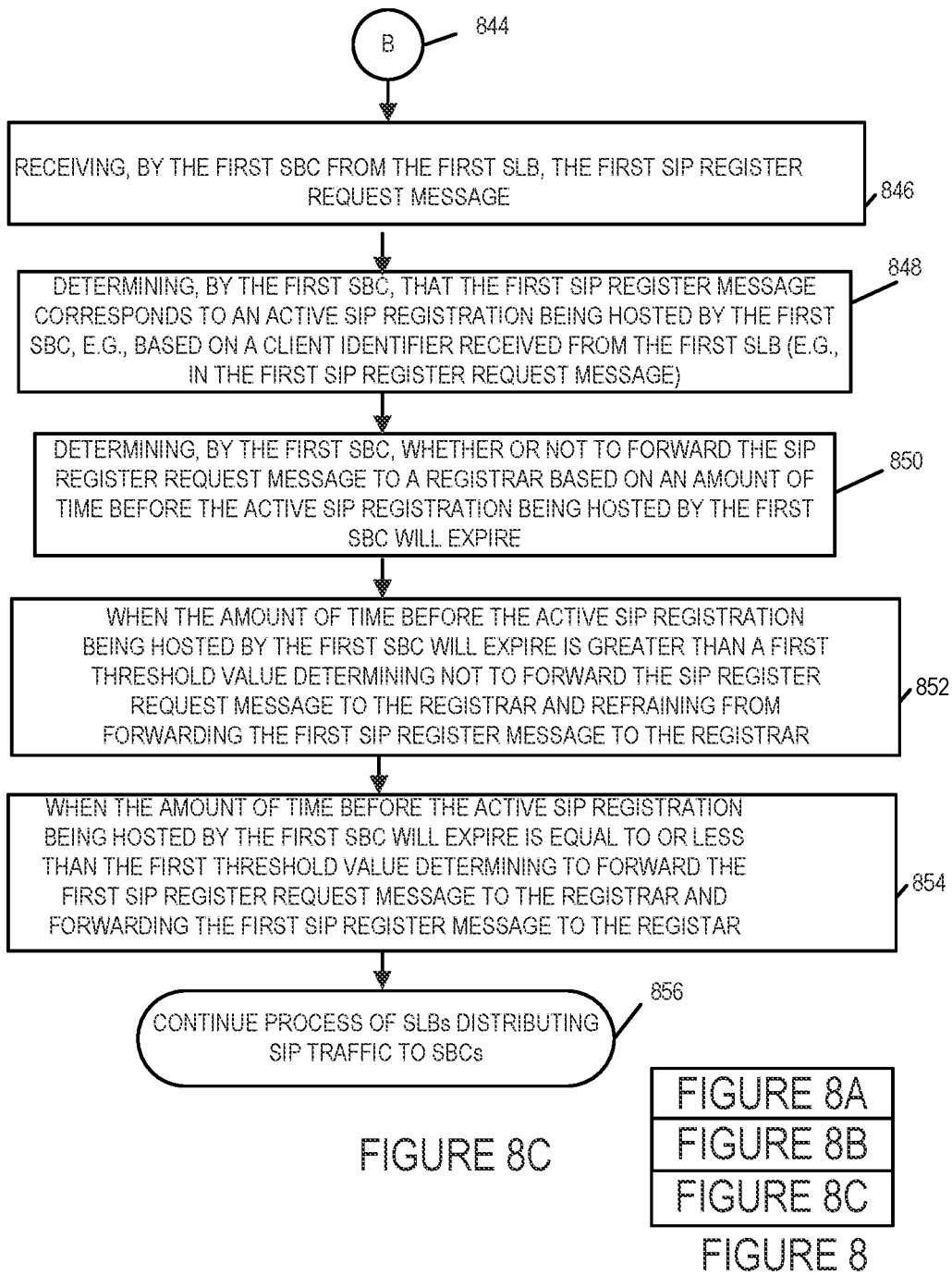

METHODS AND APPARATUS FOR EFFICIENT FAILURE RECOVERY AND SCALING OF A COMMUNICATIONS SYSTEM

RELATED APPLICATIONS

The present application claims the benefit of U.S. Provisional Patent Application Ser. No. 63/136,178 which was filed on Jan. 11, 2021 and which is hereby expressly incorporated by reference in its entirety.

FIELD OF INVENTION

The present invention relates to methods, apparatus and systems for efficient failure recovery and scaling of a communications system with a front end and a back end. The present application further relates to methods, apparatus and systems for distributing messages for processing for example after a failure, e.g., of a front end load balancing device, in a communications system.

BACKGROUND

Most Cluster architectures depend on the notion of a Front-End (FE). The FE distributes traffic to Back-End (BE) entities. Sometimes there are more than one FE entity working independent of each other. An exemplary communications system in having a front end and a back end include a Session Border Controller (SBC) Cluster front-ended by a Session Initiation Protocol (SIP) Load Balancer (SLB). FIG. 1 illustrates a system 100 with a plurality of Clients (Client A, Client B, Client C) 102, a single SIP Load Balancer 104, and a SBC Cluster 106 including two SBCs (SBC-1 108 and SBC-2 110). The SIP Load Balancer 104 and SBC Cluster 106 forming a sub-system 112 which handles requests from the Clients (Clients A, B, and C) 102.

The notion of a "controlled client" is also getting more widely used. With this approach, a service provider not only provides the network components for the service but also the client software used by end-users. Such controlled clients may be, and in some instances are, based on native executables and/or on WebRTC/WebAssembly (WASM).

Various challenges exist with the above described architectures some of which will now be described. When a connection oriented protocol, e.g. Transmission Control Protocol (TCP), Transmission Control Protocol/Transport Layer Security (TCP/TLS), is used between the SLB and the Clients, the Clients need to re-establish connections after a failure. Exemplary failures include a SLB failure and/or a restart of Enterprise/Carrier Network Address Translation (NAT) device located in the signaling path between the Clients and the SLB. When a failure occurs, the number of new TCP/TLS connections needed would be large as the failure would affect many Clients. The rate of new TCP/TLS connection attempts which can be successfully served by the SLB however is limited. Additionally, new TCP/TLS connections need to be followed by a SIP registration procedure which further reduces the rate of newly established signaling paths. The signaling path for each existing call is also lost until a new signaling path is established for Clients involved in each ongoing call during the failure.

Furthermore, Geo-redundant high availability is hard to achieve across SLBs in different geographies. This high availability pertains to keeping a mapping between a registered client and the SBC backend currently hosting the client's registration.

From the foregoing it is apparent that there is a need for a technological solution to how to efficiently and effectively provide for failure recovery and scaling of a communications system with a front end and a back end.

SUMMARY OF THE INVENTION

The present invention solves one or more of the above referenced problems. Various method, apparatus and system embodiments of the present invention utilize encrypted information such as an encrypted token to efficiently and effectively provide for failure recovery for example after one or more front end load balancers, e.g., a Session Initiation Protocol Load Balancers, fail or after a Client/NAT restart. Furthermore, various embodiments of the present invention allow for scaling of a communications system with a front end and a back end with efficient and effective failure recovery.

While in various exemplary embodiments discussed herein a Session Border Controller (SBC) Cluster front-ended by one or more Session Initiation Protocol (SIP) Load Balancers (SLBs) is used to describe the invention, the concepts can be applied to other use cases which have similar characteristics.

An exemplary method embodiment in accordance with the present invention includes the steps of: establishing a first connection oriented protocol connection between a first Session Initiation Protocol Load Balancer (SLB) of a plurality of SLBs and a client device; receiving via the first connection oriented protocol connection at the first Session Initiation Protocol Load Balancer (SLB) a first Session Initiation Protocol (SIP) REGISTER request message from the first client device; determining, by the first SLB, based on information received from the client device, a first Session Border Controller (SBC) from a plurality of SBCs to send the first SIP REGISTER request message, said information uniquely identifying the first SBC from other SBCs in the plurality of SBCs; and sending, by the first SLB, the first SIP REGISTER request message to the first SBC.

In some embodiments, the plurality of SLBs is a cluster of SLBs. In some embodiments, the plurality of SBCs is a cluster of SBCs. In some embodiments, the SLBs of the plurality of SLBs and the SBCs of the plurality of SBCs are arranged in a cluster architecture in which front end entities distribute traffic to back end entities.

In various embodiments, the plurality of SLBs are front end entities which distribute traffic to back end entities in said cluster architecture; and the plurality of SBCs are back end entities in said cluster architecture. In some embodiments, the first SIP registration request message is included in the traffic distributed by the first SLB to the plurality of SBCs.

In various embodiments, the SLBs of the plurality of SLBs is operated by a first operator (e.g., a first communications network operator). In some embodiments, the plurality of SBCs are also operated by the first operator (e.g., the first communications network operator).

In various embodiments, the first connection oriented protocol connection is a Transmission Control Protocol connection.

In some embodiments, the first connection oriented protocol connection is a Transmission Control Protocol/Transport Layer Security (TCP/TLS) connection.

In some embodiments, the information received from the first client has been encrypted by a second SLB. The second SLB being one of the plurality of SLBs using an encryption key unknown to any of the SBCs of the plurality of SBCs or to the first client device. In various embodiments, the encryption key is known to other SLBs in the plurality of SLBs. The encryption key is needed to decrypt the information received from the first client.

In some embodiments, the information received from the first client device is included in the first SIP registration request.

In some embodiments, the received information which uniquely identifies the first SBC from other SBCs in the plurality of SBCs is an SBC Instance-Id corresponding to the first SBC.

In some embodiments, the information received from the first client device is included in an encrypted token contained in the first SIP registration request message.

In some embodiments, the method further includes the steps of: decrypting, by the first SLB, the encrypted token, using an encryption key unknown to the plurality of SBCs or the first client, prior to determining, by the first SLB, based on information received from the client device, a first Session Border Controller (SBC) from a plurality of SBCs to send the first SIP REGISTER request message, said information uniquely identifying the first SBC from other SBCs in the plurality of SBCs. In some embodiments, the encryption key is a shared encryption key known to each of the SLBs in the plurality of SLBs.

In some embodiments, the method further includes the steps of: generating, by a second SLB of the plurality of SLBs, the encrypted token; and sending, by the second SLB, the encrypted token to the first client device in response to a second SIP registration request message prior to the first SLB receiving the first SIP registration request message.

In some embodiments, the encrypted token is sent by the second SLB to the first client device in a SIP 200 OK message indicating a successful registration with a Registrar.

In some embodiments, the encrypted token is sent by the second SLB to the first client device in a SIP 401 message.

In some embodiments, wherein the first connection oriented protocol connection is a Transmission Control Protocol/Transport Layer Security (TCP/TLS) connection, the information received from the first client device is included in a Transport Layer Security session ticket.

In some embodiments, the method further includes the steps of: receiving by the first SLB a first TCP SYN packet as part of establishing the first connection oriented protocol connection between the first SLB of the plurality of SLBs and the client device; and in response to receiving the first TCP SYN packet, installing, by the first SLB, a microflow at the first SLB to perform Internet Protocol packet policing of TCP packets received at the first SLB having a source Internet Protocol (IP) address, source port number, destination IP address, destination port number and transport protocol type of TCP matching a source Internet Protocol (IP) address, source port number, destination IP address, destination port number and transport protocol type of TCP of the received TCP SYN packet.

In some embodiments, the method further includes the steps of: setting, by the first SLB, a fill rate for the microflow to a value of zero; and setting a bucket size for the microflow to a first threshold value.

In some embodiments, the first threshold value is based on an estimate of a number of total packets needed for the TCP connection establishment to be completed. In some embodiments, the first threshold value is set to be sufficiently large to allow all packets needed for the TCP connection establishment to be completing including an estimate of the number of possible packets which will need to be retransmitted packets. In some embodiments, the first threshold value is set to be sufficiently large to allow all packets needed for the TCP and TLS connection establishment to be completing including an estimate of the number of possible packets which will need to be retransmitted packets.

In some embodiments, the method further includes the step of: deleting the microflow after a configurable timer T-guard timeout if TCP connection establishment is not completed successfully.

In various embodiments, the method further includes the step of: deleting the microflow after a configurable timer T-guard timeout if TCP connection establishment and TLS connection establishment is not completed successfully.

In some embodiments, the information received from the client device uniquely identifying the first SBC from other SBCs in the plurality of SBCs is received in one of the following: a transport layer security (TLS) protocol session ticket received from the client device prior to the receipt of the first Session Initiation Protocol (SIP) REGISTER request message; or the first Session Initiation Protocol (SIP) REGISTER request message. In some such embodiments, the information is encrypted, said information including a SBC identifier, said SBC identifier uniquely identifying the first SBC from other SBCs in the plurality of SBCs.

In some embodiments, the method further includes the following additional step: receiving with said information from the client device uniquely identifying the first SBC from other SBCs in the plurality of SBCs, one or more of the following additional pieces of information: a client identifier, said client identifier uniquely identifying the client device, or a SLB identifier said SLB identifier identifying one of the SLBs of the plurality of SLBs.

In some embodiments, the first SIP REGISTER request message is received by the first SLB from the client device after a second connection oriented protocol connection between a second Session Initiation Protocol Load Balancer (SLB) of the plurality of SLBs and the client device has been dropped (e.g., because of a communications link failure, a failure of second SLB, or a failure of a NAT or NAPT behind which the client device is located and which is providing services to the client device.)

In some embodiments, the first SIP REGISTER request message is received by the first SLB from the client device after a second connection oriented protocol connection between a second Session Initiation Protocol Load Balancer (SLB) of the plurality of SLBs and the client device has been dropped (e.g., because of a communications link failure, a failure of second SLB, or a failure of a NAT or NAPT behind which the client device is located and which is providing services to the client device.)

In some embodiments, the method further includes receiving with said information from the client device uniquely identifying the first SBC from other SBCs in the plurality of SBCs, one or more of the following additional pieces of information: a client identifier, said client identifier uniquely identifying the client device, or a SLB identifier said SLB identifier identifying one of the SLBs of the plurality of SLBs. In some embodiments, the information from the client device uniquely identifying the first SBC from other SBCs in the plurality of SBCs and said one or more of the additional pieces of information are encrypted by and provided to the client device by the second SLB prior to the second connection oriented protocol connection between the second SLB and the client device being dropped.

In some embodiments, prior to the first SLB determining based on information received from the client device, the first Session Border Controller (SBC) from the plurality of SBCs to send the first SIP REGISTER request message, the method further includes the steps of: creating a token, by a second SLB, said token including the information uniquely identifying the first SBC from other SBCs in the plurality of SBCs; transmitting from the second SLB to the client device the token over a second connection oriented protocol connection established between the second SLB and the client device; and storing the token at the client device in persistent memory.

In various embodiments, the token or information included in the token is encrypted by the second SLB using a shared encryption key known to each of the SLBs in the plurality of SLBs but not known to the client device, SBCs or other entities.

In some embodiments, the token includes a SBC identifier identifying the first SBC, a client identifier identifying the client device, and a SLB identifier identifying the second SLB.

In some embodiments, the token is transmitted to the client device from the second SLB in a SIP 200 or SIP 400 message or in a TLS session ticket.

In some embodiments, the token is transmitted to the client device from the second SLB prior to the failure of the second SLB causing the second connection oriented protocol connection to be dropped. In some embodiments, the establishment of the first connection oriented protocol connection is in response to the second connection oriented protocol connection being dropped.

In some embodiments, the method further includes the steps of: receiving, by the first SBC from the first SLB, the first SIP REGISTER request message; determining, by the first SBC, that the first SIP REGISTER request message corresponds to an active SIP registration being hosted by the first SBC; and determining, by the first SBC, whether or not to forward the SIP REGISTER request message to a Registrar based on an amount of time before the active SIP registration being hosted by the first SBC will expire. In some embodiments, when the amount of time before the active SIP registration being hosted by the first SBC will expire is greater than a first threshold value determining not to forward the SIP REGISTER request message to the Registrar. In some embodiments, when the amount of time before the active SIP registration being hosted by the first SBC will expire is less than or equal to the first threshold value determining to forward the SIP REGISTER request message to the Registrar.

In various embodiments, the method further includes the steps of: receiving with said information from the client device uniquely identifying the first SBC from other SBCs in the plurality of SBCs, a client identifier, said client identifier uniquely identifying the client device from other client devices; prior to said determining, by the first SBC, that the first SIP REGISTER request message corresponds to an active SIP registration being hosted by the first SBC, sending, from the first SLB to the first SBC, said client identifier; and wherein said determining, by the first SBC, that the first SIP REGISTER request message corresponds to the active SIP registration being hosted by the first SBC is based on said client identifier.

In some embodiments, the step of determining, by the first SBC, that the first SIP REGISTER request message corresponds to the active SIP registration being hosted by the first SBC is based on said client identifier includes: comparing said client identifier to information included in active SIP registration records stored at the first SBC.

In some embodiments, the client identifier is received by the first SLB from the client device in an encrypted format.

In some such embodiments, the first SLB decrypts the client identifier; and sends the unencrypted client identifier from the first SLB to the first SBC.

In some embodiments, the first REGISTER request message sent from the first SLB to the first SBC is a modified first REGISTER request, said modified first REGISTER request having been modified by the first SLB to include the unencrypted client identifier.

In some embodiments, the client identifier is included in a SIP header or SIP extension of the modified first SIP REGISTER request message sent to the first SBC by the first SLB.

The invention is also directed to systems and apparatus that are used to implement the various method embodiments of the invention. In some apparatus embodiments, the node or device, e.g., SBC, SLB, registrar, application server, or client device, executing one or more steps of the method, and each of the other apparatus/nodes/devices of the system include a processor and a memory, the memory including instructions which when executed by the processor control the apparatus/node/device of the system to operate to perform the steps of various method embodiments of the invention or functions ascribed to the various apparatus/node/device of the system. In some embodiments, the SLB, SBC, registrar or other entities are virtual devices implemented on compute nodes in a cloud system wherein the compute node includes a processor and memory or is attached to a memory. In various embodiments, the SLB, SBC, registrar and/or other entities of the system are implemented as native applications executing on a compute node.

An exemplary communications system in accordance with an embodiment of the present invention includes: a first Session Initiation Protocol Load Balancer (SLB), said first SLB being one of a plurality of SLBs, said first SLB including: a memory; and a first processor, said first processor controlling the first SLB to perform the following operations: establishing a first connection oriented protocol connection between a first Session Initiation Protocol Load Balancer (SLB) of a plurality of SLBs and a client device; receiving via the first connection oriented protocol connection at the first Session Initiation Protocol Load Balancer (SLB) a first Session Initiation Protocol (SIP) REGISTER request message from the first client device; determining, by the first SLB, based on information received from the client device, a first Session Border Controller (SBC) from a plurality of SBCs to send the first SIP REGISTER request message, said information uniquely identifying the first SBC from other SBCs in the plurality of SBCs; and sending, by the first SLB, the first SIP REGISTER request message to the first SBC.

In some communications system embodiments, the plurality of SLBs is a cluster of SLBs.

In some communications system embodiments, the plurality of SBCs is a cluster of SBCs.

In some communications system embodiments, the first connection oriented protocol connection is a Transmission Control Protocol connection.

In some communications system embodiments, the first connection oriented protocol connection is a Transmission Control Protocol/Transport Layer Security (TCP/TLS) connection.

In some communications system embodiments, the information received from the first client has been encrypted by a second SLB, said second SLB being one of the plurality of SLBs using an encryption key unknown to any of the SBCs of the plurality of SBCs or to the first client device; wherein the encryption key is known to other SLBs in the plurality of SLBs; and wherein the encryption key is needed to decrypt the information.

In some communications system embodiments, the information received from the first client device is included in the first SIP registration request.

In some communications system embodiments, the information uniquely identifying the first SBC from other SBCs in the plurality of SBCs is an SBC Instance-Id corresponding to the first SBC.

In some communications system embodiments, the information received from the first client device is included in an encrypted token contained in the first SIP registration request message.

In some communications system embodiments, the first processor further controls the first SLB to the perform the following operation: decrypting, by the first SLB, the encrypted token, using an encryption key unknown to the plurality of SBCs or the first client, prior to determining, by the first SLB, based on information received from the client device, a first Session Border Controller (SBC) from a plurality of SBCs to send the first SIP REGISTER request message, said information uniquely identifying the first SBC from other SBCs in the plurality of SBCs.

In some communications system embodiments, the encryption key is a shared encryption key known to each of the SLBs in the plurality of SLBs.

In some communication system embodiments, the communications system further includes: a second SLB, said second SLB being one of the plurality of SLBs, said second SLB including memory and a second processor, said second processor controlling the second SLB to perform the following operations: generating, by the second SLB of the plurality of SLBs, the encrypted token; and sending, by the second SLB, the encrypted token to the first client device in response to a second SIP registration request message prior to the first SLB receiving the first SIP registration request message.

In some communications system embodiments, the encrypted token is sent by the second SLB to the first client device in a SIP 200 OK message indicating a successful registration with a Registrar.

In some communications system embodiments, the encrypted token is sent by the second SLB to the first client device in a SIP 401 message.

In some communications system embodiments, the information received from the first client device is included in a Transport Layer Security session ticket.

In various system communications embodiments, the first processor further controls the first SLB to perform the following operations: receiving by the first SLB a first TCP SYN packet as part of establishing the first connection oriented protocol connection between the first SLB of the plurality of SLBs and the client device; and in response to receiving the first TCP SYN packet, installing, by the first SLB, a microflow at the first SLB to perform Internet Protocol packet policing of TCP packets received at the first SLB having a source Internet Protocol (IP) address, source port number, destination IP address, destination port number and transport protocol type of TCP matching a source Internet Protocol (IP) address, source port number, destination IP address, destination port number and transport protocol type of TCP of the received TCP SYN packet.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE DRAWINGS

FIG. 3 comprises FIG. 3A, FIG. 3B, and FIG. 3C.

FIG. 3B is the second part of a signaling diagram which illustrates the steps and signaling of an exemplary method in accordance with an embodiment of the present invention.

FIG. 3C is the third part of a signaling diagram which illustrates the steps and signaling of an exemplary method in accordance with an embodiment of the present invention.

FIG. 6 comprises FIG. 6A, FIG. 6B, and FIG. 6C.

FIG. 6C is the third part of a signaling diagram which illustrates the steps and signaling of an exemplary method in accordance with an embodiment of the present invention.

FIG. 8 comprises FIG. 8A, FIG. 8B, and FIG. 8C.

FIG. 8C is the third part of a flowchart which illustrates the steps of an exemplary method in accordance with an embodiment of the present invention.

DETAILED DESCRIPTION

Figure 2:
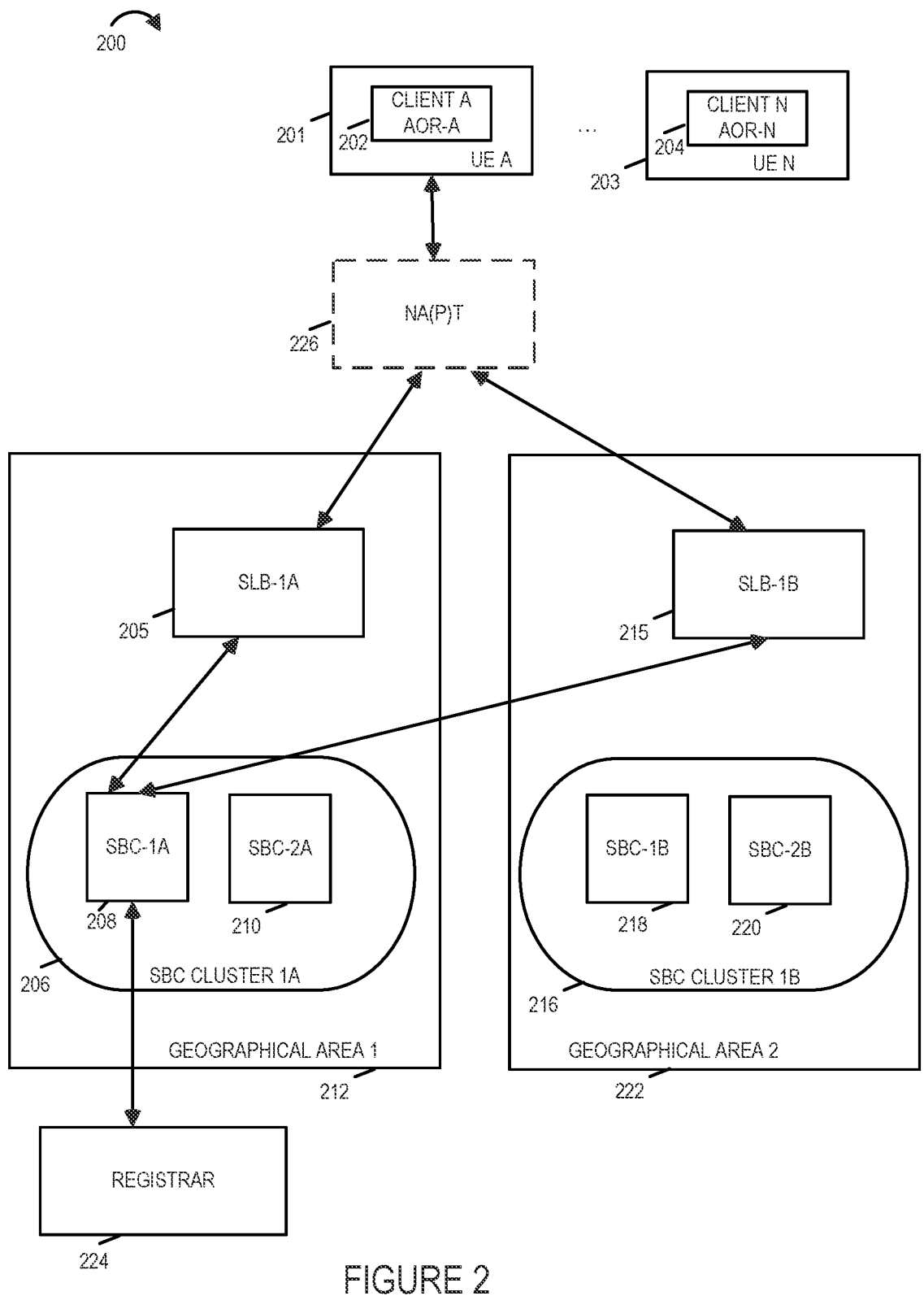
FIG. 2 is a drawing of an exemplary communications system in accordance with an embodiment of the present invention.

FIG. 2 illustrates an exemplary communications system 200 in accordance an embodiment of the present invention. Communications system 200 includes a plurality of client user equipment devices UE A 201, . . . , UE N 203, N being an integer greater than 1, a plurality of front end entities, (SIP load balancer (SLB-1A), . . . , SLB-1B 215), a plurality of back end devices (Session Border Controllers (SBC-1A 208, SBC-2A 210, SBC-1B, 218, SBC 220, a registrar 224, and one or more optional Network Address and Port Translation (NA(P)T) or NAT devices (NAPT 226). The front end entities, e.g., the SLB devices, distribute traffic, e.g., SIP messages, to back end entities (SBC devices). The SBC-1A 208 and SBC-2A 210 form a first cluster of back end entities. The first cluster being a cluster of SBCs (SBC cluster 1A 206). The SBC-1B 218 and SBC-2B 220 forming a second of back end entities. The second cluster also being a cluster of SBCs (SBC cluster 1B 216). Each of the cluster of SBCs appear as a single SBC to entities outside the cluster, e.g., UE A 201. In various embodiments, the SLB-1A 205 and SLB-1B 215 operate independently of one another and do not form a cluster. Each of the client user equipment devices includes a client application executing on the client device. Each of the plurality client user device and/or each of the client applications executing on the client user device having an address of record (AoR). UE A 201 having client application A 202 executing on the UE A 201 with client device UE A 201 and/or client application A 202 having address of record A (AoR-A). UE N 203 having client application N 2024 executing on the UE N 202 with client device UE N 203 and/or client application N 204 having address of record N (AoR-N). The terms Client A and Client application A are used interchangeably herein. The terms Client N and Client application N are used interchangeably herein.

In some embodiments, the UE A 201 is coupled to SLB-1A 205 and/or SLB-1B 215 via NAPT 226. The user equipment devices UE A 201, . . . , UE N 203 may be, and in some embodiments are computers, laptops, tablets, smartphones, cellphones, mobile devices, etc.

In some embodiments, SLB 1A 205 and SBC-1A 208, SBC-2A 210 are located in a first geographical area 1 212 while SLB-1B 215, SBC-1B 218, SBC-2B 220 are located in a second geographical area 2 222. The user equipment devices, SLBs, SBCs, and registrar are connected via a communications network including a plurality of communications links. The communications links may be, and in some embodiments include wired, wireless and/or cable (e.g., optical) communications links.

The front end load balancers, SLB-1A 205 and SLB-1B 215 may be, and in some embodiments are, implemented as a physical device. In various embodiments, the front end load balancer is implemented as a virtual device or as a network function virtualization. In some embodiments, the front end load balancer is implemented as a native application executing on compute node 1. The back end entities (SBC-1A 208, SBC-2A 210, SBC-1B 218, and SBC-2B 220) may be, and in some embodiments are, implemented as a physical device. In various embodiments, one or more of the back end processing entities is implemented as a virtual device or as a network function virtualization. Typically, all of the back end entities are of the same type for example all network function virtualization components. In many embodiments, the back end entities are implemented as native applications executing on their respective compute nodes. In some embodiments, the client applications in the user equipment devices are controlled clients in which the service provider not only provides the network components for the service but also the client software used by end-users. In some embodiments, these controlled clients based on native executables and/or on WebRTC/WebAssembly (WASM).

In some embodiments, one or more of the entities (e.g., SLB, SBC, etc.) of the system are implemented in a compute node. The compute node including a processor and memory or is attached to memory, the memory including instructions which control the operation of the compute node. In some embodiments, the SLB and SBC are implemented as virtual machines. In some embodiments, the SBCs and SLB are implemented as devices, e.g., physical devices. In some embodiments, the SLB and/or SBC are implemented as native applications executing on the compute nodes.

As discussed above, various method, apparatus and system embodiments of the present invention utilize encrypted information typically in the form of an encrypted token to efficiently and effectively provide for failure recovery for example after one or more front end load balancers, e.g., a Session Initiation Protocol Load Balancers, fail or after a Client/NAT restart. Furthermore, various embodiments of the present invention allow for scaling of a communications system with a front end and a back end with efficient and effective failure recovery.

In an exemplary embodiment of the present invention, the contents of the encrypted token contain an SBC Instance-Id hosting registration for a particular Address of Record (AoR). The SBC Instance-Id is globally unique across all SBCs and time. In some embodiments, the SBC Instance-Id is self generated or assigned by an SBC itself. In some embodiments, the SLB assigns the SBC Instance Id when the SBC is initialized and first communicates with the SLB to which it is connected.

Furthermore, the encrypted token may, and in some embodiments does, contain a Client instance-id assigned by the Client itself or by an SLB. If used/present, this Client instance-id will be used to match the client registration rather than source IP/port of the packet carrying the REGISTER request. This allows matching such a REGISTER request even after a Client/NAT restart which would result in a change in the public source IP/port used for the packets sent by the Client.

The encrypted token would initially be sent in a SIP 200 (REGISTER) message to the Client or in a SIP 401 (challenge) message. The Client will reflect the encrypted token back in all further messages it sends such as for example, SIP INVITE, SIP REGISTER, SIP SUBSCRIBE, etc. messages. The SLB will use the SBC Instance-Id in the token of a message received from a Client to identify/determine the destination SBC to which to send the received message which includes the token. And, upon identifying/determining the destination SBC based on the SBC Instance-Id in the token of the received message, the SLB will send the received message to the identified/determined destination SBC.

In some embodiments, the Client will register to multiple SLBs which potentially could be in different geo-areas. A client first would complete the first registration to a first SLB and would use the token it received for the second registration to a second SLB. This includes adding the token to the initial REGISTER request sent for the second registration to the second SLB as well.

The SBC will relay a REGISTER request/message to a Registrar only if it is needed. This includes when an initial REGISTER request/message is received from a Client and also when the registration expiry timer is sufficiently close enough to expiry so that the next refresh REGISTER from the Client potentially could arrive too late.

A Client may or may not be able to store the token in a persistent storage device or memory which survives a Client restart. When the Client is able to store the token in a persistent storage device or memory, the Client may, and typically does, use the token after the Client goes through a restart.

The token, in at least some embodiments, would constitute of encrypt[SBC Instance-Id|Client Instance-Id cryptographic-hash[SBC Instance-Id|Client Instance-Id]

The encryption key used to encrypt the token is known by all SLBs, e.g., it is a shared encryption key.

FIG. 2 as discussed above illustrates an exemplary system 200 which includes a plurality of user equipment devices (UE A 201, . . . , UE N 203), a plurality of SLBs (SLB-1A 205, SLB-1B 215), a plurality of SBC clusters (SBC cluster 1A 206, SBC cluster 1B 216), a registrar 224 which are connected with communications links of a communications networks. The user devices UE A 201, . . . , UE N 203 include client applications client A 202, . . . , client N 204 respectively. The user device UE A 201, . . . , UE N 203 and/or client applications client A 202, . . . , client N 204 have address of records (AoR) AoR A, . . . , AoR respectively. The client applications have the address of record in various embodiments in which the user equipment device includes a plurality of applications.

In the exemplary system 200, Client A 202 registers with multiple SLBs (SLB-1A 205 and SLB-1B 215) which are in different geo-areas. SLB-1A 205 being in geographical area 1 212 and SLB-1B 215 being in geographical area 2 222. SBC Cluster 1A 206 is in geographical area 1. 212. SBC Cluster 1B 216 is in geographical area 2 222. The SBC cluster 1A 206 includes SBC-1A 208 and SBC-2A 210. SBC-1A 208 and SBC-2A 210 are back end entities to the front end SLB-1A 205 and SLB-1B 215. SBC-1A 208 is hosting the registration of Client A 202 (Address of Record-A (AoR-A)), i.e., SBC-1A 208 is relaying the REGISTER messages it receives from Client A (AoR-A) to the Registrar 224. The token for the registration of Client A (AoR-A) includes an SBC Instance-Id for SBC-1A 208 and in some embodiments, a Client Instance_Id for Client A (AoR-A).

Additionally, in at least some embodiments, a Registrar-Id to which the first REGISTER message is sent can be encoded and/or included in the token as well. The second REGISTER message would be sent to an alternate Registrar allowing registration state to be present at two different Registrars which could be in different geographies.

Furthermore, the following optional procedures/steps may be, and in at least some embodiments are, executed, for example by the SLBs of the system 200, to increase throughput during packet level policing:

- a temporary microflow on IP packet policing level is installed upon receipt of a TCP SYN packet for the corresponding 5-tuple (source IP/port, destination IP/port, TCP);
- the fill rate for the microflow is set to zero 0;
- the bucket size for the microflow is set to be sufficiently large to allow all packets needed for TCP (and if applicable TLS) connection establishment by also considering the possibility of retransmitted packets; and
- the microflow is deleted after a configurable timer T-guard timeout if TCP (and if applicable TLS) connection establishment is not completed successfully.

These procedures allow that subsequent messages sent to establish TCP/TLS connection are favored over initial TCP SYN messages sent by other clients. This increases the rate of successfully established TCP/TLS connections as messages subsequent to TCP SYN are less likely to be dropped thanks to this mechanism.

Figure 3A:
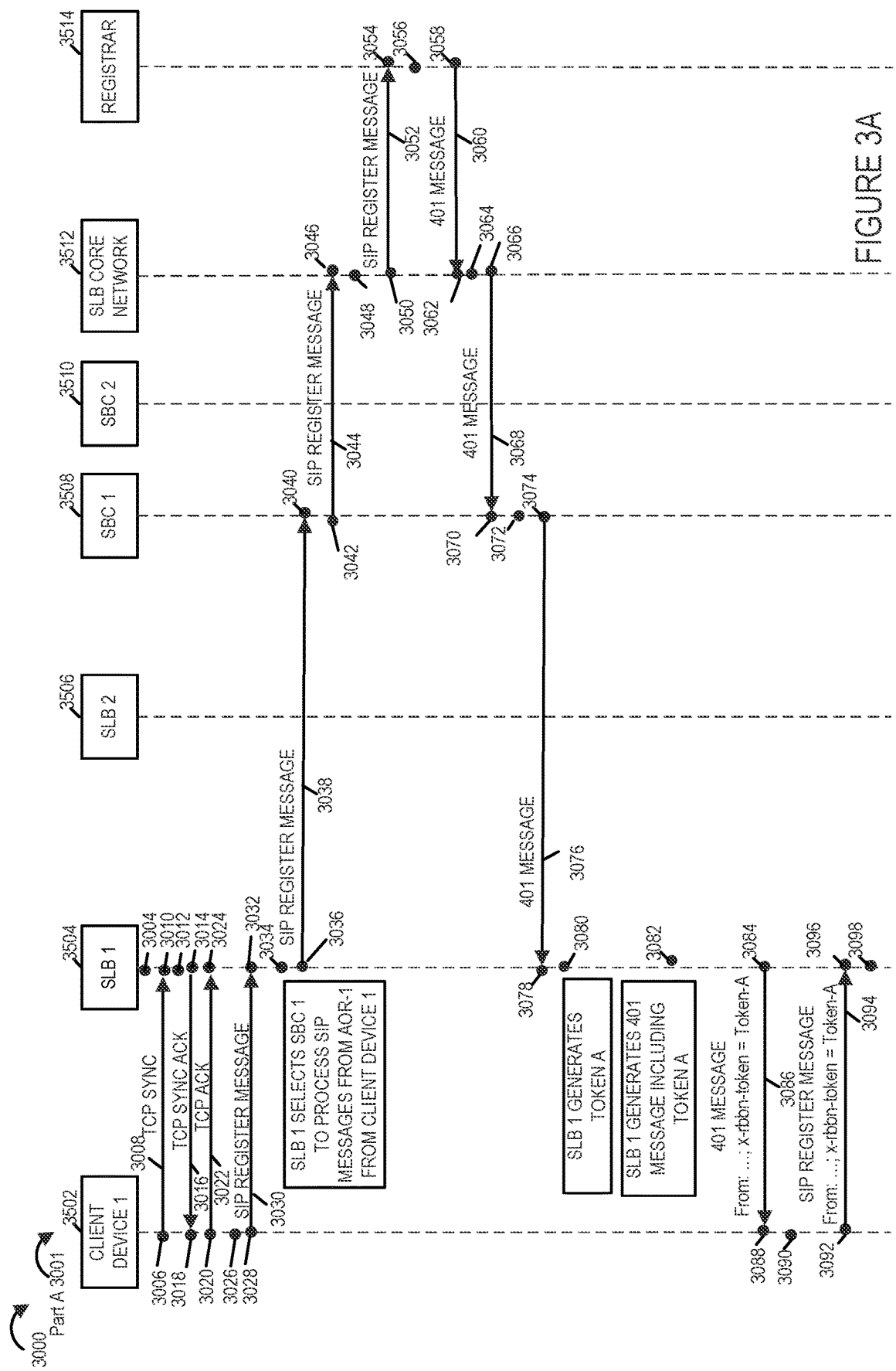
FIG. 3A is the first part of a signaling diagram which illustrates the steps and signaling of an exemplary method in accordance with an embodiment of the present invention.

FIG. 3 comprises FIG. 3A, FIG. 3B, and FIG. 3C. FIG. 3 illustrates a signaling diagram 3000 which illustrates steps of an exemplary method embodiment of the present invention and exemplary high level signaling between the elements. FIG. 3A illustrates the Part A 3001 of the signaling diagram. FIG. 3B illustrates Part B 3002 of the signaling diagram. FIG. 3C illustrates Part C 3003 of the signaling diagram. While it is to be understood that additional signaling and steps are typically required for communications among elements, the signaling diagram/method 3000 illustrates the steps pertinent to explaining the exemplary embodiment of the invention. Elements or steps with the same reference numbers used in different figures are the same or similar and those elements or steps will not be described in detail again. The signaling diagram/method 3000 may be, and in some embodiments is, implemented using exemplary system 200 of FIG. 2. However, it should be understood that the method 3000 is not limited to the exemplary system 200 and may be, and is used, on other systems and system configurations.

The method 3000 starts in step 3004. In start step 3004, the system is initialized and SLB 1 3504 and SLB 2 3506 each contain a copy of a shared encryption key. The SBC 1 3508 and SBC 2 3510 are instantiated and form a cluster of SBCs for processing SIP messages. The SBC 1 3508 and SBC 2 3510 are implemented so that among other things these SBCs during operation can host client registrations for the Registrar 3514. The SLB 1 3504 and SLB 2 3506 during operation establish TCP and/or TCP/TLS connections with client devices, such as exemplary client device 1 3502, and distribute SIP traffic received over the TCP and/or TCP/TLS connections from the client devices to SBC 1 3508 and SBC 2 3510. The client device 1 3502 includes a client application which has an address of record AoR-1. The SLBs (e.g., SLB-1 3504 and SLB 2 3506) and client devices (e.g., client device 1) are in a client server relationship with each SLB being a server and each of the client devices being a client. In some embodiments in which the method is implemented on system 200, client device 1 3502 is client device 201, SLB 1 3504 is SLB-1A 205, SLB 2 3506 is SLB-1B 215, SBC 1 3508 is SBC-1A 208, SBC 2 3510 is SBC-2A 210, the SLB core network 3512 comprises communications links and devices and is typically service provider's core network, and registrar 3514 is the registrar 224. The SLB core network and SLBs in various embodiments being owned and/or operated by the service provider. The SBCs also being owned and/or operated by the service provider. The SLBs are in some embodiments are in the same geographical area and are part of the cluster of SLBs servicing the client device 1 3502. In various embodiments, the operation and/or steps of the method 3000 described in connection with client device 1 are implemented by a client application executing on the client device 1 3502. For example, client application A 202 when client device 1 3502 is UE A 201. In some embodiments, the registrar 3514 is an application server which provides services, e.g., call services, to the client device 1 3502. While only a single client device 1 3502, two SLBs (SLB 1 3504 and SLB 2 3506, two SBCs (SBC 1 3508 and SBC 2 3510) are shown it should be understood that this has been done to simply the system for explanation purposes and that the system is not so limited includes a plurality of client devices, e.g., thousand of client devices, a large plurality or number of SLBs and SBCs. Various embodiments of the invention are most useful when a failure causes the failure of many TCP and/or TCP/TLS connections between client devices and SLBs, e.g., when a SLB fails and/or a NAT device between a plurality of client devices and one or more SLBs in the system such as after a short power disruption.

Operation proceeds from start step 3004 to step 3006. The steps 3006, 3010, 3012, 3016, 3018, 3022 illustrate the establishment of a TCP connection between the client device 1 3502 and SLB 1 3504. Alternatively, a TCP/TLS connection may be established.

In step 3006, Client device 1 3502 generates and sends TCP SYNC message 3008 to SLB 1 3504 to initiate a TCP connection. Operation proceeds from step 3006 to step 3010.

In step 3010, SLB 1 3504 receives and processes the TCP SYNC message 3008. Operation proceeds from step 3010 to step 3012.

In step 3012, the SLB 1 3504 institutes packet level policing procedures for the corresponding 5-tuple (source Internet Protocol (IP) address/port number, destination IP address/port number, TCP protocol type) of the received TCP SYN message 3008. The packet level policing procedures may be, and in some embodiments are implemented as sub-steps of step 3012. The packet level policing procedures are implemented to increase throughput of the SLB 1 and the overall system implementing the method 3000. In some embodiments, the packet level policing includes one or more of the following procedures and/or sub-steps: (i) installing a temporary microflow on IP packet policing level is installed upon receipt of the TCP SYN packet for the corresponding 5-tuple (source IP address/port number, destination IP address/port number, TCP protocol), (ii) setting the fill rate for the temporary microflow to be zero (0), (iii) the bucket size for the temporary microflow is set to a first threshold value, e.g., a threshold value which is sufficiently large to allow all packets needed for TCP (and if applicable TLS) connection establishment taking into consideration the possibility of retransmitted packets; and the temporary microflow is deleted after a configurable timer T-guard timeout if TCP (and if applicable TLS) connection establishment is not completed successfully. The packet level policing procedures allow that subsequent messages sent to establish TCP/TLS connection are favored over initial TCP SYN messages sent by other clients. This increases the rate of successfully established TCP/TLS connections as messages subsequent to TCP SYN are less likely to dropped thanks to these procedures especially when there is a large number of TCP and/or TCP/TLS connection requests such as after the failure of a SLB and/or the failure or restart of a NAPT device situated between a SLB and a plurality of client devices and/or the power outage causing the failure or restart of a plurality of client devices. The aforementioned failures for example causing and/or resulting in the dropping of TCP and/or TCP/TLS connections which had been established and which need to be re-established between the SLB and the client devices and/or client applications. In some embodiments step 3012 is optional. Operation proceeds step 3012 to step 3014.

In step 3014, SLB 1 3504 generates and transmits TCP SYN ACK message 3016 to client device 1 3502 in response to the TCP SYNC message 3008. Operation proceeds from step 3014 to step 3018.

In step 3018, the client device 1 3502 receives and processes the TCP SYNC ACK message 3016. Operation proceeds from step 3018 to step 3020.

In step 3020, the client device 1 3502 in response to the TCP SYN ACK message 3016 generates and transmits TCP ACK message 3022 to SLB 1 3504. Operation proceeds from step 3020 to step 3024 and step 3026.

In step 3024, SLB 1 3504 receives and processes the TCP ACK message 3022.

With the establishment of the TCP connection between the client device 1 3502 and the SLB 1 3504, in step 3026, the client device 1 3502 generates SIP register message 3030 to initiate registration with the registrar 3514. The SIP REGISTER message 3030 includes an Address of Record 1 (AoR-1). Operation proceeds from step 3026 to step 3028.

In step 3028, client device 1 3502 transmits the SIP REGISTER message 3030 to SLB 1 3504 using the established TCP connection between the client device 1 3502 and the SLB 1 3504. Operation proceeds from step 3028 to step 3032.

In step 3032, SLB 1 3504 receives the SIP REGISTER message 3030. Operation proceeds from step 3032 to step 3034.

In step 3034, SLB 1 3504 selects SBC 1 3508 from a first cluster of SBCs which include SBC 1 3508 and SBC 2 3510 to process the SIP REGISTER message 3030 and future SIP messages from client device 1 having address of record 1 (AoR-1). Operation proceeds from step 3034 to step 3036.

In step 3036, SLB 1 3504 generates and transmits SIP REGISTER message 3038 to SBC 1 3508. SLB 1 3504 generates SIP REGISTER message 3038 based on SIP REGISTER message 3030. Operation proceeds from step 3036 to step 3040.

In step 3040, SBC 1 3508 receives and processes the SIP REGISTER message 3038. The SBC 1 3508 determines during processing that the SIP REGISTER message 3038 is a REGISTER message destined for the registrar 3514. Operation proceeds from step 3040 to step 3042.

In step 3042, the SBC 1 generates and transmits SIP REGISTER message 3044 to network device(s) and/or entities in the SLB core network 3512 for transmission to the registrar 3514. The SIP REGISTER message 3044 is generated based on the received SIP REGISTER message 3038. Operation proceeds from step 3042 to step 3046.

In step 3046, device(s) and/or entities in the SLB core network 3512 receive and process the SIP REGISTER message 3044. Operation proceeds from step 3046 to step 3048.

In step 3048, the device(s) and/or entities in the SLB core network 3512 generate SIP REGISTER message 3052 based on SIP REGISTER message 3044. Operation proceeds from step 3048 to step 3050.

In step 3050, the device(s) and/or entities in the SLB core network 3512 transmit the SIP REGISTER message 3052 to the registrar 3514. Operation proceeds from step 3050 to step 3054.

In step 3054, the registrar 3514 receives the SIP REGISTER message 3052 from the device(s) and/or entities in the SLB core network 3512. In some embodiments, the SLB Core Network 3512 is merely traversed by SIP REGISTER message 3044 in which case the SIP REGISTER message 3052 and 3044 are the same such as for example when the SLB core network 3512 path traversed includes only links, repeaters and/or routers which pass or forward the received SIP REGISTER message. Operation proceeds from step 3054 to step 3056.

In step 3056, the registrar 3514 processes the SIP REGISTER request and generates SIP response message 3060. In this example the SIP response message 3060 is a SIP 401 message. In various embodiments, the SIP 401 message includes a challenge for the client device 1 3502. Operation proceeds from step 3056 to step 3058.

In step 3058, the registrar 3514 transmits the SIP 401 message 3060 to the device(s) and/or entities in the SLB core network 3512 for transmission to the SBC 1 3508. Operation proceeds from step 3058 to step 3062.

In step 3062, device(s) and/or entities in the SLB core network 3512 receive and process the SIP 401 message 3060. Operation proceeds from step 3062 to step 3064.

In step 3064, the device(s) and/or entities in the SLB core network 3512 generate SIP 401 message 3068 based on SIP 401 message 3060. Operation proceeds from step 3064 to step 3066.

In step 3066, the device(s) and/or entities in the SLB core network 3512 transmit the SIP 401 message 3068 to the SBC 1 3508. Operation proceeds from step 3066 to step 3070.

In step 3070, SBC 1 3508 receives the SIP 401 message 3068 from the device(s) and/or entities in the SLB core network 3512. In some embodiments, the SLB Core Network 3512 is merely traversed by SIP 401 message 3060 in which case the SIP 401 message 3060 and 3068 are the same such as for example when the SLB core network 3512 path traversed includes only links, repeaters and/or routers which pass or forward the received SIP 401 message. Operation proceeds from step 3070 to step 3072.

In step 3072, the SBC 3508 generates SIP 401 message 3076 based on received SIP 401 message 3068. Operation proceeds from step 3072 to step 3074.

In step 3074, SBC 1 transmits SIP 401 message 3076 to SLB 1 3504. Operation proceeds from step 3074 to step 3078.

In step 3078, SLB 1 receives the SIP 401 message 3076 from SBC 1 3508. Operation proceeds from step 3078 to step 3080.

In step 3080, SLB 1 generates a token that includes information identifying SBC 1 3508 as being the SBC which is hosting the registration for the client device 1 AoR-1. In some embodiments, the token includes an SBC Instance Id which identifies SBC 1 3508. In some embodiments, the SBC Instance Id is generated by the SLB 1. In some embodiments, the SBC Instance Id is generated by SBC 1 3508 upon initialization or instantiation and is transmitted to SLB 1 3504 from SBC 1 3508. In some embodiments, the token further includes a Client Instance ID which identifies client device 1 3502 AoR-1. In some embodiments, the Client Instance ID is generated by the SLB 1 3504. In some embodiments, the Client Instance ID is generated by the client device 1 3502 and is transmitted to the SLB 1 3504. In some embodiments, the token includes a SLB instance which identifies SLB 1 3508. In some embodiments, the Client Instance ID is generated by the SLB 1 3508 and includes an SLB 1 3508 component which identifies SLB 1 3508. In various embodiments, the SBC instance ID is globally unique. In various embodiments, the Client Instance ID is globally unique. In various embodiments, the SLB instance ID is globally unique. In various embodiments, at least a portion of the information included in the token is encrypted. In some embodiments, all of the information in the token is encrypted.

In some embodiments, one or more of the following pieces of information included in the token is encrypted: SBC Instance ID, Client Instance ID, and/or SLB instance ID. In various embodiments, the token and/or information included in the token is encrypted using an encryption key known to other SLBs in the system but not to other devices. In some embodiments, the token and/or information included in the token is encrypted using an encryption key known only to other SLBs and not known by the client devices, SBCs, registrar or other entities in the system. In some embodiments, the token and/or information included in the token is encrypted using a shared SLB encryption key. The shared SLB encryption key being only known to other SLBs in the system, e.g., other SLBs owned or operated by the same service provider. Knowledge of the shared encryption key allowing a device or entity to both encrypt and decrypt the information and/or token. This allows the SLBs to encrypt and decrypt tokens while the client application and/or client devices do not have the shared encryption key and can not decrypt the information providing security for the token and information contained in it to protect against unauthorized use and/or attacks.

In some embodiments, the token or information contained therein is encrypted by SLB 1 3504 using an encryption key known to SLB 2 3506 but the encryption key is unknown to SBC 1 3508, SBC 3510 or client device 1 3502. The encryption key being needed to decrypt the encrypted token or encrypted information contained in the token. In some embodiments, the token constitutes encrypt[SBC Instance-Id|Client Instance Id] crytographic-hash[SBC Instance-Id-|Client Instance Id]. The SBC Instance-Id uniquely identifying SBC-1 3506 and the Client Instance Id uniquely identifying client device 1 AoR-1 3502. In some embodiments, the token constitutes encrypt[SBC Instance-Id|Client Instance Id|SLB Instance Id] crytographic-hash[SBC Instance-Id|Client Instance Id|SLB Instance Id]. The SBC Instance-Id uniquely identifying SBC-1 3506; the Client Instance Id uniquely identifying client device 1 AoR-1 3502; and the SLB Instance Id uniquely identifying the SLB 1 3504.

In this example, the token generated in step 3080 is referred to as token A. Operation proceeds from step 3080 to step 3082.

In step 3082, the SLB 1 3504 generates SIP 401 message 3086 which includes the generated token (token A). The token may be, and in some embodiments is included in a SIP header or SIP extension. For example, the SIP 401 message 3086 may include the generated token A in a SIP From header such as for example From: . . . ; x-rbbn-token=Token-A. Operation proceeds from step 3082 to step 3084.

In step 3084, SLB 1 3504 transmits the SIP 401 message 3086 which includes the encrypted token A to the client device 1 3502 in response to the SIP REGISTER message 3030. The SIP REGISTER message 3030 is transmitted over the TCP connection previously established. Operation proceeds from step 3084 to step 3088.

In step 3088, the client device 1 3502 receives the SIP 401 message 3086. Operation proceeds from step 3088 to step 3090.

In step 3090, client device 1 3502 processes the received SIP 401 message 3086 and generates SIP REGISTER message 3094. Processing the received SIP 401 message includes extracting by client device 1 3502 token A from the received message 3086 and storing the received message in memory. The client device 1 AoR-1 3502 includes the token in future SIP message (e.g., in a SIP header or SIP extension) sent by the client device 1 AoR-1 3502 to SLBs providing services to the client device 1 3502 which in this example include SLB 1 3504 and SLB 2 3506. The SLBs using the token to identify SBC-1 3504 as the SBC selected to provide SIP processing services, e.g., SIP registration hosting services for the client device 1 AoR-1 3502. In some embodiments, the client device 1 3502 stores the token in persistent memory included in or attached to the client device 1 3502 so that the token is available for use after the client device 1 3502 goes through a reset for example due to a blackout or power failure. In some embodiments the client device 1 3502 stores the token in non-persistent memory included in or attached to the client device 1 3502. In such instances the token is available for use up until a reset of the client device 1 3502 which causes the non-persistent memory to be cleared. The token in such instances can be and is used after a TCP connection is dropped or lost for example because of a reset, failure or outage of a SLB or a NA(P)T device and the client device 1 3502 is attempting to re-establish or establish a new TCP connection. In step 3090, the client device A generates SIP REGISTER message 3094 which includes the token A in the From header (From: . . . ; x-rbbn-token=Token-A). The SIP REGISTER message 3094 is generated in response to the SIP 401 message 3086 and will also include the response to the challenge included in the SIP 401 message 3086. Operation proceeds from step 3090 to step 3092.

In step 3092, the client device 1 AoR-1 3502 transmits the SIP REGISTER message 3094 to the SLB 1 3504 over the TCP connection previously established between the client device 1 3502 and the SLB 1 3504. Operation proceeds from step 3092 to step 3096.

In step 3096, the SLB 1 3504 receives the SIP REGISTER message 3094 from the client device 1 3502 over the TCP connection previously established. Operation proceeds from step 3096 to step 3098.

In step 3098, the SLB 1 3504 processes the SIP REGISTER message 3094. Processing the SIP REGISTER message includes extracting the token-A from the SIP REGISTER message (e.g., from the SIP From header). In some embodiments, processing of the SIP REGISTER message 3094 includes decrypting the token and/or information included in the token such as the SBC Instance Id, Client Instance Id, and/or SLB Instance Id.

Operation proceeds from step 3098 to step 3100 shown on Part B 3002 of the signaling diagram 3000 illustrated on FIG. 3B. In step 3100, SLB 1 3504 determines based on the token and/or information included in the token that from the plurality of SBCs (SBC 1 3508 and SBC 2 3510) forming the cluster of back end entities performing SIP processing to which SLB 1 3504 is distributing SIP traffic/messages, the SIP REGISTER message 3094 is to be sent to SBC 1 3508. In some embodiments, the SLB 1 3504 determines the SBC to which the received SIP message 3094 is to be sent based on one or more of the following: SBC Instance Id, Client Instance Id, and/or SLB Instance Id included in the token. Operation proceeds from step 3100 to step 3101.

In step 3101, the SLB 1 3504 generates SIP REGISTER message 3104 based on the received SIP REGISTER message 3094. In some embodiments, the SIP REGISTER message 3104 does not include the token received in the SIP REGISTER message 3104. Generating the SIP REGISTER message 3104 includes in some embodiments modifying the received SIP REGISTER message 3094. The modifications including removing the token from the SIP REGISTER message 3094. In some embodiments, such as when the token includes a client identifier, the modifications include removing the token and including a copy of the client identifier in a SIP header or extension of the SIP REGISTER message 3104. The client identifier being in a format, e.g., in unencrypted form, that can be understood by an SBC. Operation proceeds from step 3101 to step 3102.

In step 3102, SLB 1 3504 transmits the generated SIP REGISTER message 3104 to the identified or determined SBC 1 3508 for SIP processing. Operation proceeds from step 3102 to step 3106.

In step 3106, SBC 1 3508 receives and processes the SIP REGISTER message 3104. The SBC 1 3508 determines during processing that the SIP REGISTER message 3104 is a REGISTER message destined for the registrar 3514. If the SIP REGISTER message 3104 includes a client identifier then the SBC 1 3508 stores the client identifier in a record in memory to track the client associated with the registration. Operation proceeds from step 3106 to step 3108.

In step 3108, the SBC 1 3508 generates and transmits SIP REGISTER message 3110 to network device(s) and/or entities in the SLB core network 3512 for transmission to the registrar 3514. The SIP REGISTER message 3110 is generated based on the received SIP REGISTER message 3104. Operation proceeds from step 3108 to step 3112.

In step 3112, device(s) and/or entities in the SLB core network 3512 receive and process the SIP REGISTER message 3110. Operation proceeds from step 3112 to step 3114.

In step 3114, the device(s) and/or entities in the SLB core network 3512 generate SIP REGISTER message 3118 based on SIP REGISTER message 3110. Operation proceeds from step 3114 to step 3116.

In step 3116, the device(s) and/or entities in the SLB core network 3512 transmit the SIP REGISTER message 3118 to the registrar 3514. Operation proceeds from step 3116 to step 3120.

In step 3120, the registrar 3514 receives the SIP REGISTER message 3118 from the device(s) and/or entities in the SLB core network 3512. In some embodiments as previously discussed, the SLB Core Network 3512 is merely traversed SIP messages in which case the SIP REGISTER message 3110 and 3118 are the same or substantially the same such as for example when the SLB core network 3512 path traversed includes only links, repeaters and/or routers which pass or forward the received SIP REGISTER message unchanged or substantially unchanged. Operation proceeds from step 3120 to step 3122.

In step 3122, the registrar 3514 processes the SIP REGISTER request message 3118 and generates SIP response message 3126. In this example the SIP response message 3126 is a SIP 200 message indicating successful registration. For example, the SIP REGISTER message includes the correct response to the challenge included in the SIP 401 message 3060. Operation proceeds from step 3122 to step 3124.

In step 3124, the registrar 3514 transmits the SIP 200 message 3126 to the device(s) and/or entities in the SLB core network 3512 for transmission to the SBC 1 3508. Operation proceeds from step 3124 to step 3128.

In step 3128, device(s) and/or entities in the SLB core network 3512 receive and process the SIP 200 message 3126. Operation proceeds from step 3128 to step 3130.

In step 3130, the device(s) and/or entities in the SLB core network 3512 generate SIP 200 message 3134 based on SIP 200 message 3126. Operation proceeds from step 3130 to step 3132.

In step 3132, the device(s) and/or entities in the SLB core network 3512 transmit the SIP 200 message 3134 to the SBC 1 3508. Operation proceeds from step 3132 to step 3136.

In step 3136, SBC 1 3508 receives the SIP 200 message 3134 from the device(s) and/or entities in the SLB core network 3512. In some embodiments, the SLB Core Network 3512 as previously discussed is merely traversed by SIP messages such as SIP message 3126 in which case the SIP 200 message 3126 and 3134 are the same or substantially the same such as for example when the SLB core network 3512 path traversed includes only links, repeaters and/or routers which pass or forward the received SIP 200 message unchanged or substantially unchanged. Operation proceeds from step 3136 to step 3138.

In step 3138, the SBC 1 3508 generates SIP 200 message 3142 based on received SIP 200 message 3134. Operation proceeds from step 3138 to step 3140.

In step 3140, SBC 1 3508 transmits SIP 200 message 3142 to SLB 1 3504. Operation proceeds from step 3140 to step 3144.

In step 3144, SLB 1 3504 receives the SIP 200 message 3142 from SBC 1 3508. Operation proceeds from step 3144 to step 3146.

In step 3146, SLB 1 3504 stores in memory that client device 1 3502 AoR-1 is associated with the previously generated token A and/or information contained therein and that the client device 1 3502 AoR-1 has been successfully registered and is being hosted by SBC 1 3504. In at least some embodiments, in instances in which the registration fails the token A is deleted as SBC 1 is not hosting the SIP registration and the Client device 1 3502 AoR-1 has not successfully registered with the registrar 3514. Operation proceeds from step 3146 to step 3148.

In step 3148, the SLB 1 3504 generates SIP 200 message 3152 which includes the previously generated token (token A). The token may be, and in some embodiments is included in a SIP header or SIP extension. For example, the SIP 200 message 3152 may include the generated token A in a SIP From header such as for example From: . . . ; x-rbbn-token=Token-A. Operation proceeds from step 3150 to step 3154.

In step 3154, the client device 1 3502 receives the SP 200 message 3152. Operation proceeds from step 3154 to step 3156.

In step 3156, the client device 1 3502 processes the received SIP 200 message 3152 and determines that the SIP registration was successful. In some embodiments, the client device 1 also stores in a record in memory information tracking the successful SIP registration and that the token A should be used for future SIP messages. Operation proceeds from step 3156 to step 3157.

At step 3158, SLB 1 3504 fails. This is followed by dropping or loss of all of the TCP connections between client devices and the SLB 1 3504 in step 3160. This includes the TCP connection established between the client device 1 3502 and SLB 1 3504. This results in an avalanche or flood of new TCP connection requests and/or SIP registration requests given that the communications link between the SLB 1 3504 and all of the client devices it was serving has been severed, lost or dropped. After the TCP connection between client device 1 3502 and SLB 1 3504 has dropped, operation proceeds to step 3162 wherein the client device 1 3502 AoR-1 attempts to establish a new TCP connection with SLB 2 3506 given the failure of SLB 1 3504.

Steps 3162, 3164, 3168, 3170, 3172, 3176, 3178, 3182 illustrate the establishment of new TCP connection between the client device 1 3502 and SLB 2 3506 following the loss or dropping of the TCP connection previously established between SLB 1 3504 and client device 1 3502. Alternatively, a TCP/TLS connection may be established as previously discussed in connection with the TCP connection between the client device 1 3502 and SLB 1 3504.

In step 3162, Client device 1 3502 generates TCP SYNC message 3166. Operation proceeds from step 3162 to step 3164.

In step 3164, client device 1 3502 transmits the generated TCP SYNC message 3166 to SLB 2 3506 to initiate a TCP connection. Operation proceeds from step 3164 to step 3168.

In step 3168, SLB 2 3506 receives and processes the TCP SYNC message 3166. Operation proceeds from step 3168 to step 3170.

In step 3170, the SLB 2 3506 institutes packet level policing procedures for the corresponding 5-tuple (source Internet Protocol (IP) address/port number, destination IP address/port number, TCP protocol type) of the received TCP SYN message 3166. The packet level policing procedures may be, and in some embodiments are implemented as sub-steps of step 3170. The packet level policing procedures are implemented to increase throughput of the SLB 2 3506 and the overall system implementing the method 3000. In some embodiments, the packet level policing includes one or more of the following procedures and/or sub-steps: (i) installing a temporary microflow on IP packet policing level is installed upon receipt of the TCP SYN packet for the corresponding 5-tuple (source IP address/port number, destination IP address/port number, TCP protocol), (ii) setting the fill rate for the temporary microflow to be zero (0), (iii) the bucket size for the temporary microflow is set to a first threshold value, e.g., a threshold value which is sufficiently large to allow all packets needed for TCP (and if applicable TLS) connection establishment taking into consideration the possibility of retransmitted packets; and the temporary microflow is deleted after a configurable timer T-guard timeout if TCP (and if applicable TLS) connection establishment is not completed successfully. The packet level policing procedures allow that subsequent messages sent to establish TCP/TLS connection are favored over initial TCP SYN messages sent by other clients. This increases the rate of successfully established TCP/TLS connections as messages subsequent to TCP SYN are less likely to dropped thanks to these procedures especially when there is a large number of TCP and/or TCP/TLS connection requests such as after the failure of a SLB, e.g., the failure of SLB 13504, and/or the failure or restart of a NAPT device situated between a SLB and a plurality of client devices and/or the power outtage causing the failure or restart of a plurality of client devices. The aforementioned failures for example causing and/or resulting in the dropping of TCP and/or TCP/TLS connections which had been established and which need to be re-established between an SLB of the system and the client devices and/or client applications. In some embodiments step 3170 is optional. Operation proceeds from step 3170 to step 3172.

In step 3172, SLB 2 3506 generates and transmits TCP SYN ACK message 3174 to client device 1 3502 in response to the TCP SYNC message 3166. Operation proceeds from step 3172 to step 3176.

In step 3176, the client device 1 3502 receives and processes the TCP SYNC ACK message 3174. Operation proceeds from step 3176 to step 3178.

In step 3178, the client device 1 3502 in response to the TCP SYN ACK message 3174 generates and transmits TCP ACK message 3180 to SLB 2 3506. Operation proceeds from step 3178 to step 3182 and step 3184. Step 3184 being shown on Part 3003 of signaling method 3000 illustrated on FIG. 3C.

In step 3182, SLB 2 3506 receives and processes the TCP ACK message 3180.

With the establishment of the TCP connection between the client device 1 3502 and the SLB 2 3056, in step 3184, the client device 1 3502 generates SIP REGISTER message 3188 to initiate registration with the registrar 3514. The SIP REGISTER message 3188 includes an Address of Record 1 (AoR-1). The SIP REGISTER message 3188 includes the Token A previously provided to client device 1 3502 by SLB 1 3504. The token being included in a SIP header or SIP extension as previously described. In this example, the Token A is included in the SIP From header of the SIP REGISTER message 3188. Operation proceeds from step 3184 to step 3186.

In step 3186, client device 1 3502 transmits the SIP REGISTER message 3188 to SLB 2 3506 using the established TCP connection between the client device 1 3502 and the SLB 2 3506. Operation proceeds from step 3186 to step 3190.

In step 3192, the SLB 2 3506 receives the SIP REGISTER message 3188 from the client device 1 3502 over the TCP connection established between client device 1 3502 and SLB 2 3506. Operation proceeds from step 3192 to step 3194.

In step 3194, the SLB 2 3506 processes the SIP REGISTER message 3188. Processing the SIP REGISTER message includes extracting the token-A from the SIP REGISTER message (e.g., from the SIP From header). In some embodiments, processing of the SIP REGISTER message 3188 includes decrypting the token and/or information included in the token such as the SBC Instance Id, Client Instance Id, and/or SLB Instance Id. The SLB 2 3506 decrypts the token A and/or information contained in the token A using an encryption key known to SLB 1 3504 and SLB 2 3506. The SLB 2 3506 decrypts the token A and/or information contained in the token A using a shared encryption key which as previously described is shared by SLB 1 3504 and SLB 2 3506 but is not shared with client devices and/or SBC devices. The shared encryption key being the encryption key or a copy thereof used to encrypt the token A and/or information contained in the token A when it was generated by an SLB, e.g., SLB 1 3504, and sent to the client device 1 3052.

In step 3194, SLB 2 3506 determines based on the token A and/or information included in the token A that from the plurality of SBCs (SBC 1 3508 and SBC 2 3510) forming the cluster of back end entities performing SIP processing to which SLB 2 3506 is distributing SIP traffic/messages, the SIP REGISTER message 3188 is to be sent to SBC 1 3508. In some embodiments, the SLB 2 3506 determines the SBC to which the received SIP message 3188 is to be sent based on one or more of the following: SBC Instance Id, Client Instance Id, and/or SLB Instance Id included in the token extracted from the received SIP REGISTER message 3188. Operation proceeds from step 3194 to step 3196.

In step 3196, the SLB 2 3506 generates and transmits the SIP REGISTER message 3198 to the identified or determined SBC 1 3508. The SLB 2 3506 generates the SIP REGISTER message 3198 based on the received SIP REGISTER message 3188. In some embodiments, the SIP REGISTER message 3196 does not include the token received in the SIP REGISTER message 3188. Generating the SIP REGISTER message 3198 includes in some embodiments modifying the received SIP REGISTER message 3188. The modifications including removing the token from the SIP REGISTER message 3188. Operation proceeds from step 3196 to step 3199.

In step 3199, SBC 1 3508 receives and processes the SIP REGISTER message 3198. The SBC 1 3508 determines during processing that the SIP REGISTER message 3198 is a REGISTER message destined for the registrar 3514 from client device 1 AoR-1 3502. Operation proceeds from step 3199 to step 3200.

In step 3200, the SBC 1 3508 determines that it is hosting the SIP registration for client device 1 AoR-1 3502 and that the client device 1 AoR-1 3502 is currently actively registered with the registrar 3514. In various embodiments, the SBC 1 3508 maintains records including state information for each of the SIP registrations it is hosting. The records include information as to which client SIP registrations are active as well as the AoR and/or other identifying information about the client and/or an established SIP session. The records typically include, among other things, TTL times, registration expiry timeouts, when the SBC 1 3508 needs to send SIP registration refresh messages to the registrar 3514 to maintain the SIP registration as well as when the SIP REGISTER refresh messages need to be received by the SBC from a client device to maintain the SIP registration. The SBC 1 3508 also makes the determination to treat the SIP REGISTER message 3196 as a SIP REGISTER refresh request message as an existing SIP registration is still active with the registrar 3514. As a result of treating the SIP REGISTER message 3196 as a SIP REGISTER refresh request message, the SBC 1 3508 updates it state records regarding the state of the SIP registration and also determines that it does not need to send a SIP registration request message to the registrar 3514 on behalf of the client device 1 3502. The SBC 1 3508 refrains from generating and transmitting a SIP registration request to the registrar 3514. In various embodiments, SBCs utilize the client identifier received in a SIP REGISTER message from a SLB to determine whether the SBC is hosting an active SIP registration. The SBC correlating the client identifier included in the SIP REGISTER message to records of active registrations stored in memory at the SBC. Operation proceeds from step 3200 to step 3202.

In step 3202, as the SIP registration is still active the SBC 1 3508 generates a SIP 200 message 3204 indicating success and transmits the SIP 200 message 3204 to SLB 2 3506 in response to the SIP REGISTER message 3196. Operation proceeds from step 3202 to step 3206.

In step 3206, the SLB-2 3506 receives and processes the SIP 200 message 3204 from the SBC 1 3508. Operation proceeds from step 3206 to step 3208.

In step 3208, the SLB-2 3506 generates SIP 200 message 3212 which includes the token-A. The token-A being included in a SIP header or SIP extension. In this example, the token A is included in a SIP From header of the SIP 200 message 3212 e.g., "From: . . . ; x-rbbn-token=Token-A". Operation proceeds from step 3208 to step 3210.

In step 3210, SLB 2 3506 transmits the SIP 200 message 3212 to client device 1 AoR-1 3502 over the TCP connection established between the client device 1 AoR-1 3502 and the SLB 2 3506. The SIP 200 message 3212 being sent in response to the SIP REGISTER message 3188. Operation proceeds from step 3210 to step 3214.

In step 3214, the client device 1 3502 receives the SIP 200 message 3212 from SLB 2 3506. Operation proceeds from step 3214 to step 3216.

In step 3216, the client device AoR-1 3502 processes the SIP 200 message 3212 and updates information stored in its memory or memory attached to it to indicate the success of the SIP registration with registrar 3514. In some embodiments, the client device 1 AoR-1 3502 also updates a record including registration state information in which it associates the currently active registration with the token-A and includes information indicating that all future SIP messages should include the token-A.

Operation proceeds from step 3216 to step 3218. Steps 3218, 3222, 3224, 3226, 3230, 3232, 3234, 3238, 3240, and 3244 illustrate how SIP REGISTER (refresh) messages are implemented by the client device 1 3502 and handled by the SLB receiving it based on the token-A.

In step 3218 the client device 1 AoR-1 3502 determines that a SIP REGISTER (refresh) message is to be sent to maintain the client device 1 AoR-1 3502 registration with the registrar 3514. Upon determining in step 3218 that the SIP REGISTER (refresh) message is to be sent, the client device 1 AoR-1 3502 generates SIP REGISTER (refresh) message 3220 and transmits it to SLB 2 3506 over the TCP connection established between the client device 1 3502 and the SLB 2 3506. The SIP REGISTER (refresh) message 3220 includes the Token-A. The token A being included in a SIP header or SIP extension. In this example, the token-A is included in the SIP From header "From: . . . ; x-rbbn-token=Token-A". Operation proceeds from step 3218 to step 3222.

In step 3222, the SLB 2 3506 receives the SIP REGISTER (refresh) message 3220. Operation proceeds from step 3222 to step 3224.

In step 3224, the SLB 2 processes the SIP REGISTER (refresh) message 3220 and determines based on the Token-A and/or information included in the Token-A that the SIP REGISTER refresh message 3220 is to be sent to SBC 1 3508 which is processing SIP messages from client device 1 AoR-1 3502. In various embodiments, processing the SIP REGISTER (refresh) message 3220 includes one or more of the following: extracting the token-A from the SIP message 3220, decrypting the token-A, determining from and/or based on the token and/or information in the token-A to which of a plurality of SBCs forming a cluster of SBCs the SIP message 3220 is to be sent. In various embodiments, the token-A and/or information included in the token-A is decrypted using a shared encryption as previously discussed. The determination as to SBC to distribute or send the SIP message 3220 may be, and in some embodiments is, based on one or more of the following pieces of information included in the token-A: i) SBC Instance Id, ii) Client Instance Id, and SLB instance Id. This determination is done for example as previously discussed in connection with SIP message 3188 in step 3194. Operation proceeds from step 3224 to step 3226.

In step 3226, the SLB 2 3506 generates and transmits the SIP REGISTER (refresh) message 3228 to the identified or determined SBC 1 3508. The SLB 2 3506 generates the SIP REGISTER refresh message 3228 based on the received SIP REGISTER refresh message 3220. In some embodiments, the SIP REGISTER message 3228 does not include the token received in the SIP REGISTER (refresh) message 3220. Generating the SIP REGISTER (refresh) message 3228 includes in some embodiments modifying the received SIP REGISTER message 3220. The modifications including removing the token from the SIP REGISTER message 3220. Operation proceeds from step 3226 to step 3230.

In step 3230, the SBC 1 3508 receives the messages SIP REGISTER refresh message 3228 from SLB 2 3506. Operation proceeds from step 3230 to step 3232.

In step 3232, the SBC 1 3508 processes the received SIP REGISTER (refresh) message 3228. Processing by the SBC 1 3508, the SIP REGISTER (refresh) message 3228 in some embodiments includes determining that the SBC 1 3508 is hosting the registration for the client device 1 AoR-1 3502 for which the SIP REGISTER (refresh) message 3228 was sent. Updating one or more records indicating that the client device 1 AoR-1 3502, registration with registrar 3512 is active and a REGISTER refresh message has been received from the client device 1 AoR-1 3502. In addition, the SBC 1 3508 generates a SIP 200 message 3236 indicating success in response to the SIP REGISTER (refresh) message 3220 sent by the client device 1 AoR-1 3502. Operation proceeds from step 3232 to step 3234.

In step 3234, the SBC 1 3508 transmits SIP 200 message 3236 to SLB 2 3506 in response to the SIP REGISTER (refresh) message 3228. Operation proceeds from step 3234 to step 3238.

In step 3238, the SLB 2 3506 receives the SIP REGISTER (refresh) message 3228 from the SBC 1 3508. Operation proceeds from step 3238 to step 3240.

In step 3240, the SLB 2 3506 generates SIP 200 message 3244 which includes the token-A. The token-A being included in a SIP header or SIP extension. In this example, the token A is included in a SIP From of the SIP 200 message 3244 e.g., "From: . . . ; x-rbbn-token=Token-A". Operation proceeds from step 3240 to step 3242.

In step 3242, SLB 2 3506 transmits the SIP 200 message 3244 to client device 1 AoR-1 3502 over the TCP connection established between the client device 1 AoR-1 3502 and the SLB 2 3506. The SIP 200 message 3244 being sent in response to the SIP REGISTER (refresh) message 3220. Operation proceeds from step 3242 to step 3246.

In step 3246, the client device 1 AoR-1 3502 receives the SIP 200 message 3244 from SLB 2 3506. Operation proceeds from step 3246 to step 3248.

In step 3248, the client device AoR-1 3502 processes the SIP 200 message 3244 and updates information stored in its memory or memory attached to it to indicate the success of the refreshment of the SIP registration with SIP registrar 3514.

The method 3000 continues with the client device 1 AoR-1 3502 using the token-A in future SIP messages it sends with the SLB of the system receiving the SIP message and determining from the token-A that the SBC to which the message is to be sent for processing.

In some embodiments of the method 3000 in which the token includes a client identifier in addition to a SBC identifier, the SLB which receives the token passes or sends a copy of the client identifier to the SBC identifies by the SBC identifier, e.g., in a SIP message header field or extension, e.g., the from SIP header of the SIP REGISTER message sent to the SBC. When the token received by the SLB is encrypted, the token is first decrypted by the SLB and the client identifier extracted before it is sent to the SBC. In various embodiments, the SBC upon receiving a SIP REGISTER message from an SLB, extracts the client identifier from the SIP message and determines whether the SIP REGISTER message is associated with an active SIP registration being hosted by the SBC based on the client identifier. If it is, the SBC then makes a determination whether to forward the received SIP REGISTER message to the registrar or not based on the remaining registration expiration time. When the remaining registration expiration time does not require the SBC to forward the SIP REGISTER request message to the Registrar to prevent the active SIP registration being hosted by the first SBC from expiring, the SBC does not forward the received SIP REGISTER message to the registrar.

Figure 1:
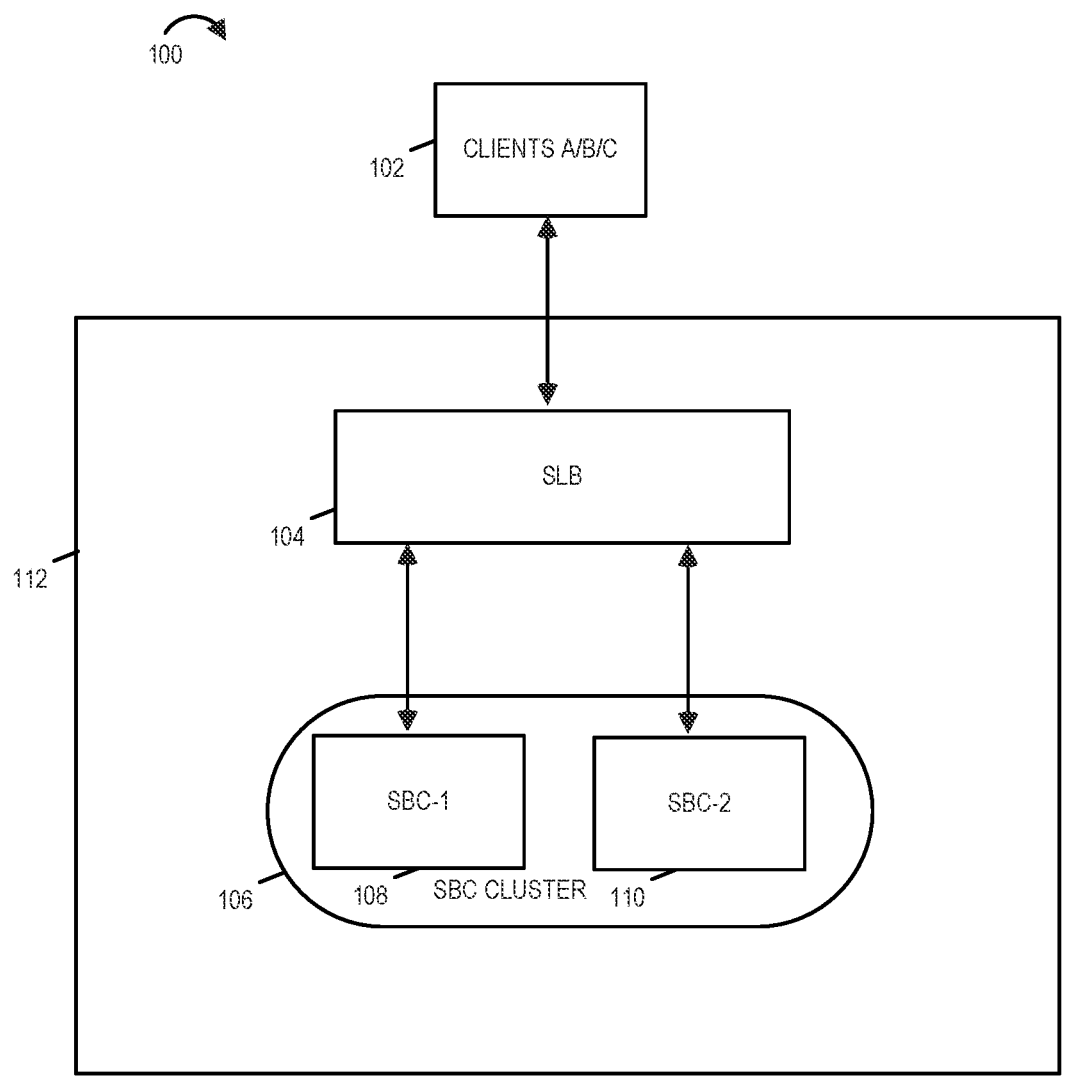
FIG. 1 is a drawing of a communications system with a cluster architecture where in a front end entity distributes traffic, e.g., messages, to back end entities.
Figure 4:
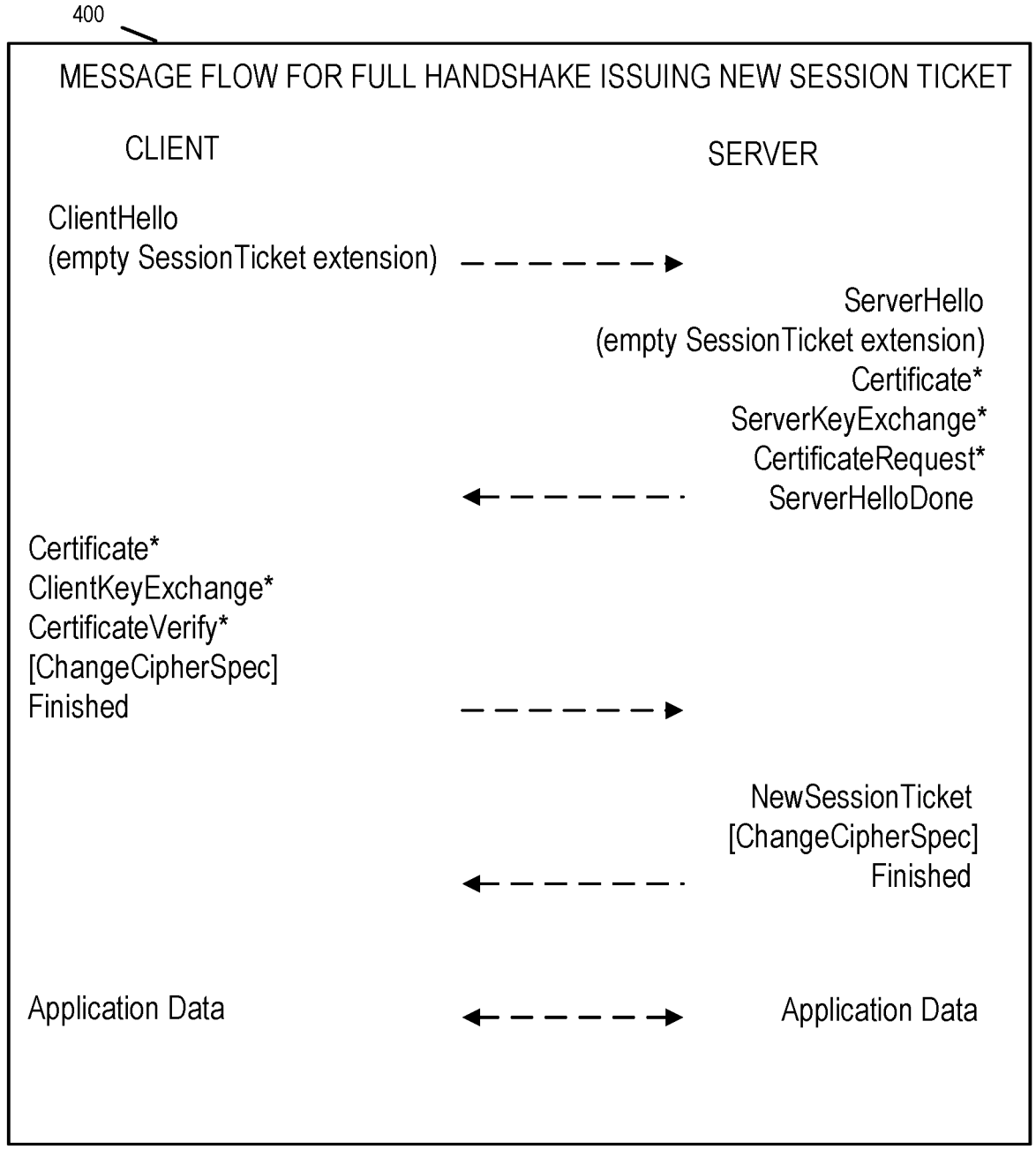
FIG. 4 illustrates a TLS message flow in which a New Session Ticket is sent from a server to a client.

Alternatively, in some embodiments, the token and/or the information to be provided in the token is provided as part of a TLS Session Ticket. Diagram 400 illustrated in FIG. 4 is the "FIG. 1: Message Flow for Full Handshake Issue New Session Ticket" diagram from Internet Engineering Task Force (IETF) Request For Comment (RFC) 5077 entitled "Transport Layer Security (TLS) Session Resumption without Server-Side State" published in January 2008" illustrates the TLS message flow in which a NewSessionTicket is sent from a server to a client. The aforementioned IETF RFC 5077 entitled "Transport Layer Security (TLS) Session Resumption without Server-Side State" published in January 2008 is hereby incorporated by reference in its entirety. The Client device 3502 or application running thereon is the client and the SLBs are the server. The token and/or information to be provided in the token is encrypted with a key known to all SLBs but not to any other entity whether be internal to SBC cluster or external to it. Client would provide the Session Ticket when it needs to re-establish a TLS session to a SLB which, for example, could happen after the SLB, to which the initial TLS session was established, fails. Information in the provided Session Ticket is decrypted by the receiving SLB and is used to identify the client and the SBC currently hosting the corresponding registration. A microflow, e.g., a temporary microflow, for the client is also installed when a TLS session establishment request with a Session Ticket is received. SIP REGISTER request, which subsequently is sent by the Client on the new TLS session, will be forwarded to the SBC instance based on the information, e.g., SBC identifier, received in the Session Ticket. If that SBC rejects the REGISTER request because it does not have an entry corresponding to the client then the microflow in the SLB is deleted.

Figure 6A:
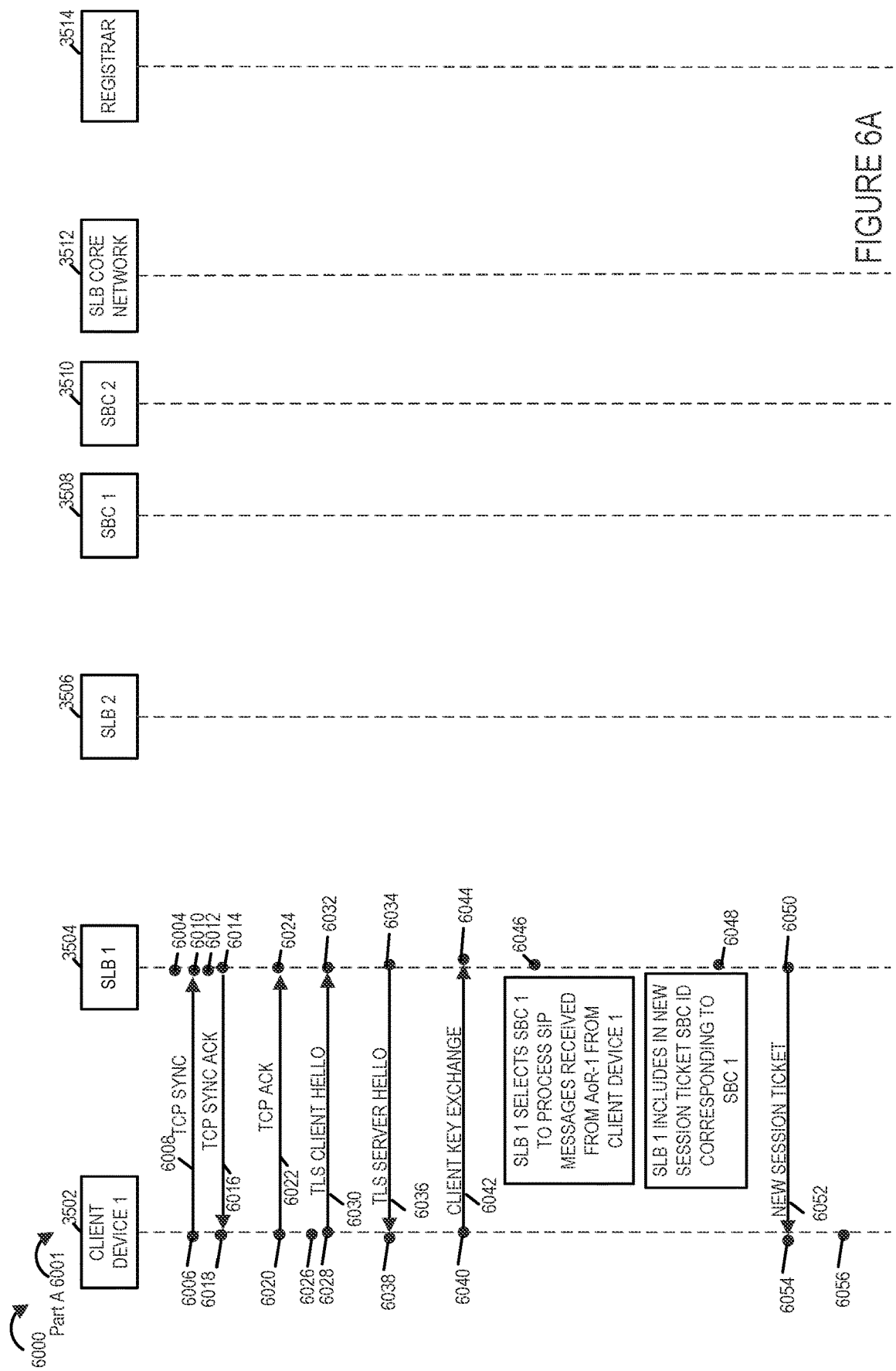
FIG. 6A is the first part of a signaling diagram which illustrates the steps and signaling of an exemplary method in accordance with an embodiment of the present invention.
Figure 6B:
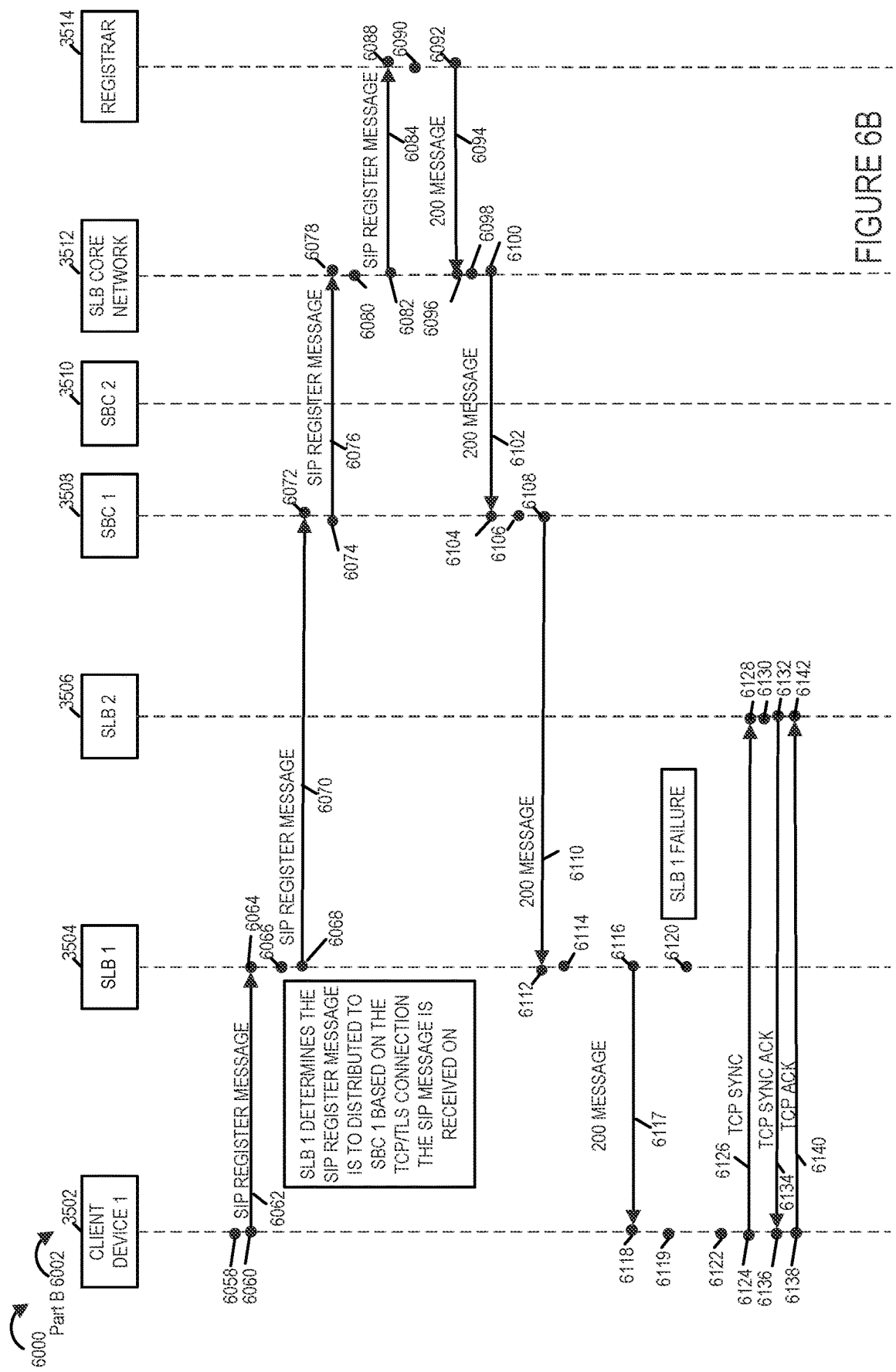
FIG. 6B is the second part of a signaling diagram which illustrates the steps and signaling of an exemplary method in accordance with an embodiment of the present invention.

FIG. 6 comprises FIG. 6A, FIG. 6B, and FIG. 6C. FIG. 6 illustrates a signaling diagram 6000 which illustrates steps of an exemplary method embodiment of the present invention and exemplary high level signaling between the elements. FIG. 6A illustrates Part A 6001 of the signaling diagram. FIG. 6B illustrates Part B 6002 of the signaling diagram. FIG. 6C illustrates Part C 6003 of the signaling diagram. While it is to be understood that additional signaling and steps are typically required for communications among elements, the signaling diagram/method 6000 illustrates the steps pertinent to explaining the exemplary embodiment of the invention. Elements or steps with the same reference numbers used in different figures are the same or similar and those elements or steps will not be described in detail again. The signaling diagram/method 6000 may be, and in some embodiments is, implemented using exemplary system 200 of FIG. 2. However, it should be understood that the method 6000 is not limited to the exemplary system 200 and may be, and is used, on other systems and system configurations.

The method 6000 starts in step 6004. In start step 6004, the system is initialized and SLB 1 3504 and SLB 2 3506 each contain a copy of a shared encryption key. The SBC 1 3508 and SBC 2 3510 are instantiated and form a cluster of SBCs for processing SIP messages. The SBC 1 3508 and SBC 2 3510 are implemented so that among other things these SBCs during operation can host client registrations for the Registrar 3514. The SLB 1 3504 and SLB 2 3506 during operation establish TCP/TLS connections with client devices, such as exemplary client device 1 3502, and distribute SIP traffic received over the TCP/TLS connections from the client devices to SBC 1 3508 and SBC 2 3510. The client device 1 3502 includes a client application which has an address of record AoR-1. The SLBs (e.g., SLB-1 3504 and SLB 2 3506) and client devices (e.g., client device 1) are in a client server relationship with each SLB being a server and each of the client devices being a client. In some embodiments in which the method is implemented on system 200, client device 1 3502 is client device 201, SLB 1 3504 is SLB-1A 205, SLB 2 3506 is SLB-1B 215, SBC 1 3508 is SBC-1A 208, SBC 2 3510 is SBC-2A 210, the SLB core network 3512 comprises communications links and devices and is typically service provider's core network, and registrar 3514 is the registrar 224. The SLB core network and SLBs in various embodiments being owned and/or operated by the service provider. The SBCs also being owned and/or operated by the service provider. In various embodiments, the operation and/or steps of the method 6000 described in connection with client device 1 are implemented by a client application executing on the client device 1 3502. For example, client application A 202 when client device 1 3502 is UE A 201. In some embodiments, the registrar 3514 is an application server which provides services, e.g., call services, to the client device 1 3502. While only a single client device 1 3502, two SLBs (SLB 1 3504 and SLB 2 3506, two SBCs (SBC 1 3508 and SBC 2 3510)

are shown it should be understood that this has been done to simply the system for explanation purposes and that the system is not so limited includes a plurality of client devices, e.g., thousand of client devices, a large plurality or number of SLBs and SBCs. Various embodiments of the invention are most useful when a failure causes the failure of many TCP and/or TCP/TLS connections between client devices and SLBs, e.g., when a SLB fails and/or a NAT device between a plurality of client devices and one or more SLBs in the system such as after a short power disruption.

Operation proceeds from start step 6004 to step 6006. The steps 3006, 3010, 3012, 3016, 3018, 3022 illustrate the establishment of a TCP connection between the client device 1 3502 and SLB 1 3504.

In step 6006, Client device 1 3502 generates and sends TCP SYNC message 6008 to SLB 1 3504 to initiate a TCP connection. Operation proceeds from step 6006 to step 6010.

In step 6010, SLB 1 3504 receives and processes the TCP SYNC message 6008. Operation proceeds from step 6010 to step 6012.

In step 6012, the SLB 1 3504 institutes packet level policing procedures for the corresponding 5-tuple (source Internet Protocol (IP) address/port number, destination IP address/port number, TCP protocol type) of the received TCP SYN message 6008. The packet level policing procedures may be, and in some embodiments are implemented as sub-steps of step 6012. The packet level policing procedures are implemented to increase throughput of the SLB 1 and the overall system implementing the method 6000. In some embodiments, the packet level policing includes one or more of the following procedures and/or sub-steps: (i) installing a temporary microflow on IP packet policing level is installed upon receipt of the TCP SYN packet for the corresponding 5-tuple (source IP address/port number, destination IP address/port number, TCP protocol), (ii) setting the fill rate for the temporary microflow to be zero (0), (iii) the bucket size for the temporary microflow is set to a first threshold value, e.g., a threshold value which is sufficiently large to allow all packets needed for TCP and TLS connection establishment taking into consideration the possibility of retransmitted packets; and the temporary microflow is deleted after a configurable timer T-guard timeout if TCP and TLS connection establishment is not completed successfully. The packet level policing procedures allow that subsequent messages sent to establish TCP/TLS connection are favored over initial TCP SYN messages sent by other clients. This increases the rate of successfully established TCP/TLS connections as messages subsequent to TCP SYN are less likely to be dropped thanks to these procedures especially when there is a large number of TCP and/or TCP/TLS connection requests such as after the failure of a SLB and/or the failure or restart of a NAPT device situated between a SLB and a plurality of client devices and/or the power outage causing the failure or restart of a plurality of client devices. The aforementioned failures for example causing and/or resulting in the dropping of TCP and/or TCP/TLS connections which had been established and which need to be re-established between the SLB and the client devices and/or client applications. In some embodiments step 6012 is optional. Operation proceeds step 6012 to step 6014.

In step 6014, SLB 1 3504 generates and transmits TCP SYN ACK message 6016 to client device 1 3502 in response to the TCP SYNC message 6008. Operation proceeds from step 6014 to step 6018.

In step 6018, the client device 1 3502 receives and processes the TCP SYNC ACK message 6016. Operation proceeds from step 6018 to step 6020.

In step 6020, the client device 1 3502 in response to the TCP SYN ACK message 6016 generates and transmits TCP ACK message 6022 to SLB 1 3504. Operation proceeds from step 6020 to step 6024 and step 6026.

In step 6024, SLB 1 3504 receives and processes the TCP ACK message 6022.

With the establishment of the TCP connection between the client device 1 3502 and the SLB 1 3504, in step 6026, the client device 1 3502 generates TLS CLIENT HELLO message 6030 to initiate a TLS connection with SLB 1 on top of the TCP connection. Operation proceeds from step 6026 to step 6028.

In step 6028, the client device 1 3502 transmits the generated TLS CLIENT HELLO message 6030 to SLB 1 3504. Operation proceeds from step 6026 to step 6032.

In step 6032, SLB 1 3504 receives and processes the TLS CLIENT HELLO message 6030. Operation proceeds from step 6032 to step 6034.

In step 6034, SLB 1 3504 generates and transmits TLS SERVER HELLO message 6036 to client device 1 3502 in response to the TLS CLIENT HELLO message 6030 received in step 6032. Operation proceeds from step 6032 to step 6038.

In step 6038, the client device 1 3502 receives and process the TLS SERVER HELLO message 6036. Operation proceeds from step 6038 to step 6040.

In step 6040, client device 3502 generates and transmits CLIENT KEY EXCHANGE message 6042 to SLB 1 3504. Operation proceeds from step 6040 to step 6044.

In step 6044, SLB 1 3504 receives and processes CLIENT KEY EXCHANGE message 6042. Operation proceeds from step 6044 to step 6046.

In step 6046, SLB 1 3504 selects SBC 1 to process SIP messages received on this TCP/TLS connection which will be from client device 1 AoR-1 3502 which sent the TLS messages. Operation proceeds from step 6046 to step 6048.

In step 6048, SLB 1 3504 generates a new session ticket which includes an SBC Identifier corresponding to the SBC 1 3508. In some embodiments the New Session Ticket also includes a Client Identifier which identifies the client device 1 3502 and/or the client device 1 AoR-1 3504. In some embodiments, the client identifier is generated by the SLB 1 3504. In some embodiments, the new session ticket also includes a SLB identifier which identifies SLB 1 3504. The SLB 1 3504 identifier uniquely identifying SLB 1 3504 from other SLBs. In various embodiments one or more of the following are included in a token included in the new session ticket: the SBC identifier, the client identifier and/or the SLB identifier. In various embodiments, token or the information, e.g., SBC identifier, the client identifier and/or the SLB identifier are encrypted by shared encryption key. The shared encryption key being known to other SLBs, e.g., SLB 2 3506, but not to the SBCs or client devices in or connected to the system or in some cases any other entities/devices/nodes in or outside system. In this example a token A is generated and included the New Session Ticket. The token A and/or information included in the token A is encrypted. The token A includes the SBC Id which identifies SBC 1 3508. The token A in some embodiments, also includes a client identifier which identifies client device 1 AoR-1 3502 and a SLB identifier which identifies SLB-1 3504. The combination of the client identifier and SLB identifier uniquely identifying the client associated with the TCP/TLS connection. In various embodiments, the SLB-1 3504 creates a record and stores in the record information to associate or correlate the TCP/TLS session with token and/or the SBC Identifier, client identifier and the SLB identifier included in the TLS New Session Ticket. Operation proceeds from step 6048 to step 6050.

In step 6050, SLB 1 3504 generates and transmits TLS New Session Ticket message 6052 to client device 1 AoR-1 3502. Generating the TLS New Session Ticket message 6052 includes: placing or including the generated TLS New Session Ticket in the TLS New Session Ticket message 6052. Operation proceeds from step 6050 to step 6054.

In step 6054, the client device 1 3502 receives the TLS New Session Ticket 6052. Operation proceeds from step 6054 to step 6056.

In step 6056, the client device processes the TLS New Session Ticket message 6052 and stores the New Session Ticket and/or the contents of the new session ticket, e.g., token A, SBC Identifier, Client Identifier, and/or SLB identifier in memory. The token A, SBC Identifier, Client Identifier, and/or SLB identifier being stored in the format received, e.g., in encrypted format.

Operation proceeds from step 6056 to step 6058 shown FIG. 6B.

With the establishment of the TCP/TLS connection between the client device 1 3502 and the SLB 1 3054, in step 6058, the client device 1 3502 generates SIP REGISTER message 6062 to initiate registration with the registrar 3514. The SIP REGISTER message 6162 includes an Address of Record 1 (AoR-1). Operation proceeds from step 6058 to step 6060.

In step 6060, client device 1 AoR-1 3502 transmits the SIP REGISTER message 6062 to SLB 1 3504 over the established TCP/TLS connection. Operation proceeds from step 6060 to step 6064.

In step 6064, SLB 1 3504 receives and processes the SIP REGISTER message 6062 from client device 1 3502 via the TCP/TLS connection.

In step 6066, SLB 1 3504 determines based on the TCP/TLS connection on which the SIP REGISTER message 6062 was received that from the plurality of SBCs (SBC 1 3508 and SBC 2 3510) forming the cluster of back end entities performing SIP processing to which SLB 1 3504 is distributing SIP traffic/messages, the SIP REGISTER message 6062 is to be sent to SBC 1 3508. Operation proceeds from step 6066 to step 6068.

In step 6068, the SLB 1 3504 generates SIP REGISTER message 6070 based on the received SIP REGISTER message 6058 and transmits it to the identified to the identified or determined SBC 1 3508 for SIP processing. Operation proceeds from step 6068 to step 6072.

In step 6072, SBC 1 3508 receives and processes the SIP REGISTER message 6070. The SBC 1 3508 determines during processing that the SIP REGISTER message 6070 is a register message destined for the registrar 3514. Operation proceeds from step 6072 to step 6074.

In step 6074, the SBC 1 3508 generates and transmits SIP REGISTER message 6076 to network device(s) and/or entities in the SLB core network 3512 for transmission to the registrar 3514. The SIP REGISTER message 6076 is generated based on the received SIP REGISTER message 6070. Operation proceeds from step 6074 to step 6078.

In step 6078, device(s) and/or entities in the SLB core network 3512 receive and process the SIP REGISTER message 6076. Operation proceeds from step 6078 to step 6080.

In step 6080, the device(s) and/or entities in the SLB core network 3512 generate SIP REGISTER message 6084 based on SIP REGISTER message 6076. Operation proceeds from step 6080 to step 6082.

In step 6082, the device(s) and/or entities in the SLB core network 3512 transmit the SIP REGISTER message 6084 to the registrar 3514. Operation proceeds from step 6082 to step 6088.

In step 6088, the registrar 3514 receives the SIP REGISTER message 6088 from the device(s) and/or entities in the SLB core network 3512. In some embodiments as previously discussed, the SLB Core Network 3512 is merely traversed SIP messages in which case the SIP REGISTER message 6076 and 6084 are the same or substantially the same such as for example when the SLB core network 3512 path traversed includes only links, repeaters and/or routers which pass or forward the received SIP REGISTER message unchanged or substantially unchanged. Operation proceeds from step 6088 to step 6090.

In step 6090, the registrar 3514 processes the SIP REGISTER request message 6084 and generates SIP response message 6094. In this example the SIP response message 6094 is a SIP 200 message indicating successful registration. Operation proceeds from step 6090 to step 6092.

In step 6092, the registrar 3514 transmits the SIP 200 message 6094 to the device(s) and/or entities in the SLB core network 3512 for transmission to the SBC 1 3508. Operation proceeds from step 6092 to step 6096.

In step 6096, device(s) and/or entities in the SLB core network 3512 receive and process the SIP 200 message 6094. Operation proceeds from step 6096 to step 6098.

In step 6098, the device(s) and/or entities in the SLB core network 3512 generate SIP 200 message 6102 based on SIP 200 message 6094. Operation proceeds from step 6098 to step 6100.

In step 6100, the device(s) and/or entities in the SLB core network 3512 transmit the SIP 200 message 6102 to the SBC 1 3508. Operation proceeds from step 6100 to step 6104

In step 6104, SBC 1 3508 receives the SIP 200 message 6102 from the device(s) and/or entities in the SLB core network 3512. In some embodiments, the SLB Core Network 3512 as previously discussed is merely traversed by SIP messages such as SIP message 6102 in which case the SIP 200 message 6094 and 6102 are the same or substantially the same such as for example when the SLB core network 3512 path traversed includes only links, repeaters and/or routers which pass or forward the received SIP 200 message unchanged or substantially unchanged. Operation proceeds from step 6104 to step 6106.

In step 6106, the SBC 1 3508 generates SIP 200 message 6110 based on received SIP 200 message 6102. Operation proceeds from step 6106 to step 6108.

In step 6108, SBC 1 3508 transmits SIP 200 message 6110 to SLB 1 3504. Operation proceeds from step 6108 to step 6112.

In step 6112, SLB 1 3504 receives the SIP 200 message 6110 from SBC 1 3508. Operation proceeds from step 6112 to step 6114.

In step 6114, SLB 1 3504 stores in memory that client device 1 3502 AoR-1 is associated with the previously generated token A and/or information contained therein and that client device 1 3502 AoR-1 has been successfully registered and is being hosted by SBC 1 3504. The SLB 1 3504 also stores in memory an association of the TCP/TLS connection and that SIP messages received via this connection from client device 1 AoR-1 3502 are to be sent to SBC 1 3504 for SIP processing. In at least some embodiments, in instances in which the registration fails the token A is deleted as SBC 1 is not hosting the SIP registration and the Client device 1 3502 AoR-1 has not successfully registered with the registrar 3514. Operation proceeds from step 6114 to step 6116.

In step 6116, the SLB 1 3504 generates SIP 200 message 6117. Operation proceeds from step 6116 to step 6118.

In step 6118, the client device 1 3502 receives the SP 200 message 6117. Operation proceeds from step 6118 to step 6119.

In step 6119, the client device 1 3502 processes the received SIP 200 message 6117 and determines that the SIP registration was successful. In some embodiments, the client device 1 also stores in a record in memory information tracking the successful SIP registration and that the token A should be used for future TCP/TLS session establishment by including the information in a Session Ticket. Operation proceeds from step 6119 to step 6120.

At step 6120, SLB 1 3504 fails. This is followed by dropping or loss of all of the TCP and TCP/TLS connections between client devices and the SLB 1 3504 in step 6120. This includes the TCP/TLS connection established between the client device 1 3502 and SLB 1 3504. This results in an avalanche or flood of new TCP and TCP/TLS connection requests and/or SIP registration requests to SLB 2 3506 given that the communications link between the SLB 1 3504 and all of the client devices it was serving has been severed, lost or dropped. After the TCP/TLS connection between client device 1 3502 and SLB 1 3504 drops, client device 1 AoR-1 3502 begins the process of establishing new TCP/TLS connection, this time with SLB 2 3506 given the failure of SLB 1 3504. Operation proceeds to step 6122 wherein the client device 1 3502 AoR-1 generates TCP SYNC message 6126. Operation proceeds from step 6122 to step 6124.

In step 6124, Client device 1 3502 generates and sends TCP SYNC message 6126 to SLB 2 3506 to initiate a TCP connection. Operation proceeds from step 6124 to step 6128.

In step 6128, SLB 2 3506 receives and processes the TCP SYNC message 6126. Operation proceeds from step 6128 to step 6130.

In step 6130, the SLB 2 3506 institutes packet level policing procedures for the corresponding 5-tuple (source Internet Protocol (IP) address/port number, destination IP address/port number, TCP protocol type) of the received TCP SYN message 6126. The packet level policing procedures may be, and in some embodiments are implemented as sub-steps of step 6130. The packet level policing procedures are implemented to increase throughput of the SLB 2 and the overall system implementing the method 6000. In some embodiments, the packet level policing includes one or more of the following procedures and/or sub-steps: (i) installing a temporary microflow on IP packet policing level is installed upon receipt of the TCP SYN packet for the corresponding 5-tuple (source IP address/port number, destination IP address/port number, TCP protocol), (ii) setting the fill rate for the temporary microflow to be zero (0), (iii) the bucket size for the temporary microflow is set to a first threshold value, e.g., a threshold value which is sufficiently large to allow all packets needed for TCP and TLS connection establishment taking into consideration the possibility of retransmitted packets; and the temporary microflow is deleted after a configurable timer T-guard timeout if TCP and TLS connection establishment is not completed successfully. The packet level policing procedures allow that subsequent messages sent to establish TCP/TLS connection are favored over initial TCP SYN messages sent by other clients. This increases the rate of successfully established TCP/TLS connections as messages subsequent to TCP SYN are less likely to be dropped thanks to these procedures especially when there is a large number of TCP and/or TCP/TLS connection requests such as after the failure of a SLB and/or the failure or restart of a NAPT device situated between a SLB and a plurality of client devices and/or the power outage causing the failure or restart of a plurality of client devices. The aforementioned failures for example causing and/or resulting in the dropping of TCP and/or TCP/TLS connections which had been established and which need to be re-established between the SLB and the client devices and/or client applications. In some embodiments step 6130 is optional. Operation proceeds step 6130 to step 6132.

In step 6132, SLB 2 3506 generates and transmits TCP SYN ACK message 6134 to client device 1 3502 in response to the TCP SYNC message 6126. Operation proceeds from step 6132 to step 6136.

In step 6136, the client device 1 3502 receives and processes the TCP SYNC ACK message 6134. Operation proceeds from step 6136 to step 6138.

In step 6138, the client device 1 3502 in response to the TCP SYN ACK message 6134 generates and transmits TCP ACK message 6140 to SLB 2 3506. Operation proceeds from step 6138 to step 6142 and step 6144 shown on FIG. 6C.

In step 6142, SLB 2 3506 receives and processes the TCP ACK message 6140.

With the establishment of the TCP connection between the client device 1 3502 and the SLB 2 3506, in step 6144, the client device 1 3502 generates TLS CLIENT HELLO message with session ticket 6148 to initiate a TLS connection with SLB 2 3508 on top of the TCP connection which has been established. The TLS Client Hello with session ticket message 6148 includes information received in New Session Ticket included in the New Session Ticket message 6052. This information includes the token A. In some embodiments, a token is not included in the new session ticket but information that identifies SBC-1 and in some embodiments client device 1 AoR-1 3502 and SLB 1 3504 is included, such as a SBC identifier, a Client Identifier, and a SLB identifier. This is information is included in the session ticket included in CLIENT HELLO message with session ticket 6148. In this example, the token and/or information contained therein is encrypted having been encrypted by SLB 1 3504 with a encryption key unknown to the client device 1 3502. Operation proceeds from step 6144 to step 6146.

In step 6146, the client device 1 3502 transmits the generated TLS CLIENT HELLO message with session ticket 6148 to SLB 2 3506. Operation proceeds from step 6146 to step 6150.

In step 6150, SLB 2 3506 receives and processes the TLS CLIENT HELLO message with session ticket 6148. Operation proceeds from step 6150 to step 6151.

In step 6151 the SLB 2 3506 extracts information from the session ticket in the TLS CLIENT HELLO message with session ticket 6148. The SLB 2 also decrypts any of the information which is encrypted, e.g., using the SLB shared encryption key. The extracted information includes for example the token A, and/or information, e.g., SBC identifier, identifying the SBC to which SIP messages from client device 1 AoR-1 3502 received on the TCP/TLS connection being established are to be sent, the client identifier and/or the SLB identifier. Operation proceeds from step 6151 to step 6152.

In step 6152, the SLB 2 3506 determines based on the information contained in the session ticket, e.g., token A and/or SBC identifier identifying SBC 1 3508, that SIP messages received from client device 1 AoR-1 3502 are to be distributed to SBC 1 3508 for SIP processing. SLB 2 3506 stores in a record in memory information indicating that SIP messages received on this TCP/TLS connection are to distributed to SBC 1 3508. Operation proceeds from step 6152 to step 6153.

In step 6153, SLB 2 3506 generates and transmits TLS SERVER HELLO message 6154 to client device 1 3502 in response to the TLS CLIENT HELLO message with session ticket 6148 received in step 6150. Operation proceeds from step 6152 to step 6156.

In step 6156, the client device 1 3502 receives and processes the TLS SERVER HELLO message 6154. Operation proceeds from step 6156 to step 6158.

In step 6158, client device 3502 generates and transmits CLIENT KEY EXCHANGE message 6160 to SLB 2 3506. Operation proceeds from step 6158 to step 6162.

In step 6162, SLB 2 3506 receives and processes CLIENT KEY EXCHANGE message 6160. Operation proceeds from step 6162 to step 6164.

In step 6164, SLB 2 3506 generates a session ticket which includes the SBC Identifier corresponding to the SBC 1 3508. In some embodiments the Session Ticket includes at least a portion of the information received from the client device 3502 in the session ticket received from the client device 1 3502 in message 6148, e.g., the token A, SBC identifier, client identifier, SLB identifier. The information remaining in the same format as it was received, e.g., encrypted by the SLB shared session key.

In step 6164, SLB 2 3506 generates and transmits TLS Session Ticket message 6166 to client device 1 AoR-1 3502. Generating the TLS Session Ticket message 6166 includes: placing or including the generated TLS Session Ticket in the TLS Session Ticket message 6166. Operation proceeds from step 6166 to step 6168.

In step 6168, the client device 1 3502 receives the TLS Session Ticket 6166. Operation proceeds from step 6168 to step 6170.

In step 6170, the client device processes the TLS Session Ticket message 6166 and stores the Session Ticket and/or the contents of the session ticket, e.g., token A, SBC Identifier, Client Identifier, and/or SLB identifier in memory. The token A, SBC Identifier, Client Identifier, and/or SLB identifier being stored in the format received, e.g., in encrypted format.

With the establishment of the TCP/TLS connection between the client device 1 3502 and the SLB 2 3056, in step 6172, the client device 1 3502 generates SIP REGISTER message 6176 to initiate registration with the registrar 3514. The SIP REGISTER message 6176 includes an Address of Record 1 (AoR-1). Operation proceeds from step 6172 to step 6174.

In step 6174, client device 1 3502 transmits the SIP REGISTER message 6176 to SLB 2 3506 using the established TCP/TLS connection between the client device 1 3502 and the SLB 2 3506. Operation proceeds from step 6174 to step 6178.

In step 6178, the SLB 2 3506 receives the SIP REGISTER message 6176 from the client device 1 3502 over the TCP/TLS connection established between client device 1 3502 and SLB 2 3506. Operation proceeds from step 6178 to step 6180.

In step 6180, the SLB 2 3506 processes the SIP REGISTER message 6176 and determines based on TCP/TLS connection upon which the SIP REGISTER message 6176 was received which SBC of the cluster of SBC back entities performing SIP processing, the SIP REGISTER message 6176 is to be sent. In this example it determines that the SIP REGISTER message 6176 is to be sent to SBC 1 3508. Operation proceeds from step 6180 to step 6181.

In step 6181, the SLB 2 3506 generates the SIP REGISTER message 6184 to the identified or determined SBC 1 3508. The SLB 2 3506 generates the SIP REGISTER message 6184 based on the received SIP REGISTER message 6176. Operation proceeds from step to step 6181 to step 6182.

In step 6182, the SLB 2 transmits the generated SIP REGISTER message 6184 to SBC 1 3508. Operation proceeds from step 6182 to step 6186.

In step 6186, SBC 1 3508 receives and processes the SIP REGISTER message 6184. The SBC 1 3508 determines during processing that the SIP REGISTER message 6184 is a REGISTER message destined for the registrar 3514 from client device 1 AoR-1 3502. Operation proceeds from step 6186 to step 6188.

In step 6188, the SBC 1 3508 determines that it is hosting the SIP registration for client device 1 AoR-1 3502 and that the client device 1 AoR-1 3502 is currently actively registered with the registrar 3514. In various embodiments, the SBC 1 3508 maintains records including state information for each of the SIP registrations it is hosting. The records include information as to which client SIP registrations are active as well as the AoR and/or other identifying information about the client and/or an established SIP session. The records typically include, among other things, TTL times, registration expiry timeouts, when the SBC 1 3508 needs to send SIP registration refresh messages to the registrar 3514 to maintain the SIP registration as well as when the SIP REGISTER refresh messages need to be received by the SBC from a client device to maintain the SIP registration. The SBC 1 3508 also makes the determination to treat the SIP REGISTER message 6184 as a SIP REGISTER refresh request message as an existing SIP registration is still active with the registrar 3514. As a result of treating the SIP REGISTER message 6184 as a SIP REGISTER refresh request message, the SBC 1 3508 updates its state records regarding the state of the SIP registration and also determines that it does not need to send a SIP registration request message to the registrar 3514 on behalf of the client device 1 3502. The SBC 1 3508 refrains from generating and transmitting a SIP registration request to the registrar 3514. Operation proceeds from step 6188 to step 6190.

In step 6190, as the SIP registration is still active the SBC 1 3508 generates a SIP 200 message 6192 indicating success and transmits the SIP 200 message 6192 to SLB 2 3506 in response to the SIP REGISTER message 6184. Operation proceeds from step 6190 to step 6194.

In step 6194 the SLB-2 3506 receives and processes the SIP 200 message 6192 from the SBC 1 3508. Operation proceeds from step 6194 to step 6196.

In step 6196, the SLB-2 3506 generates SIP 200 message 200. Operation proceeds from step 6196 to step 6198

In step 6198, SLB 2 3506 transmits the SIP 200 message 6200 to client device 1 AoR-1 3502 over the TCP/TLS connection established between the client device 1 AoR-1 3502 and the SLB 2 3506. The SIP 200 message 6200 being sent in response to the SIP REGISTER message 6176. Operation proceeds from step 6198 to step 6202.

In step 6202, the client device 1 3502 receives and processes the SIP 200 message 6200 from SLB 2 3506. The client device 1 3502 updates information stored in its memory or memory attached to it to indicate the success of the SIP registration with registrar 3514. In some embodiments, the client device 1 AoR-1 3502 also updates a record including registration state information in which it associates the currently active registration with the token-. and includes information indicating that all future TCP/TLS Session Tickets sent during TLS establishment with a SLB should include the token-A.

Figure 8A:
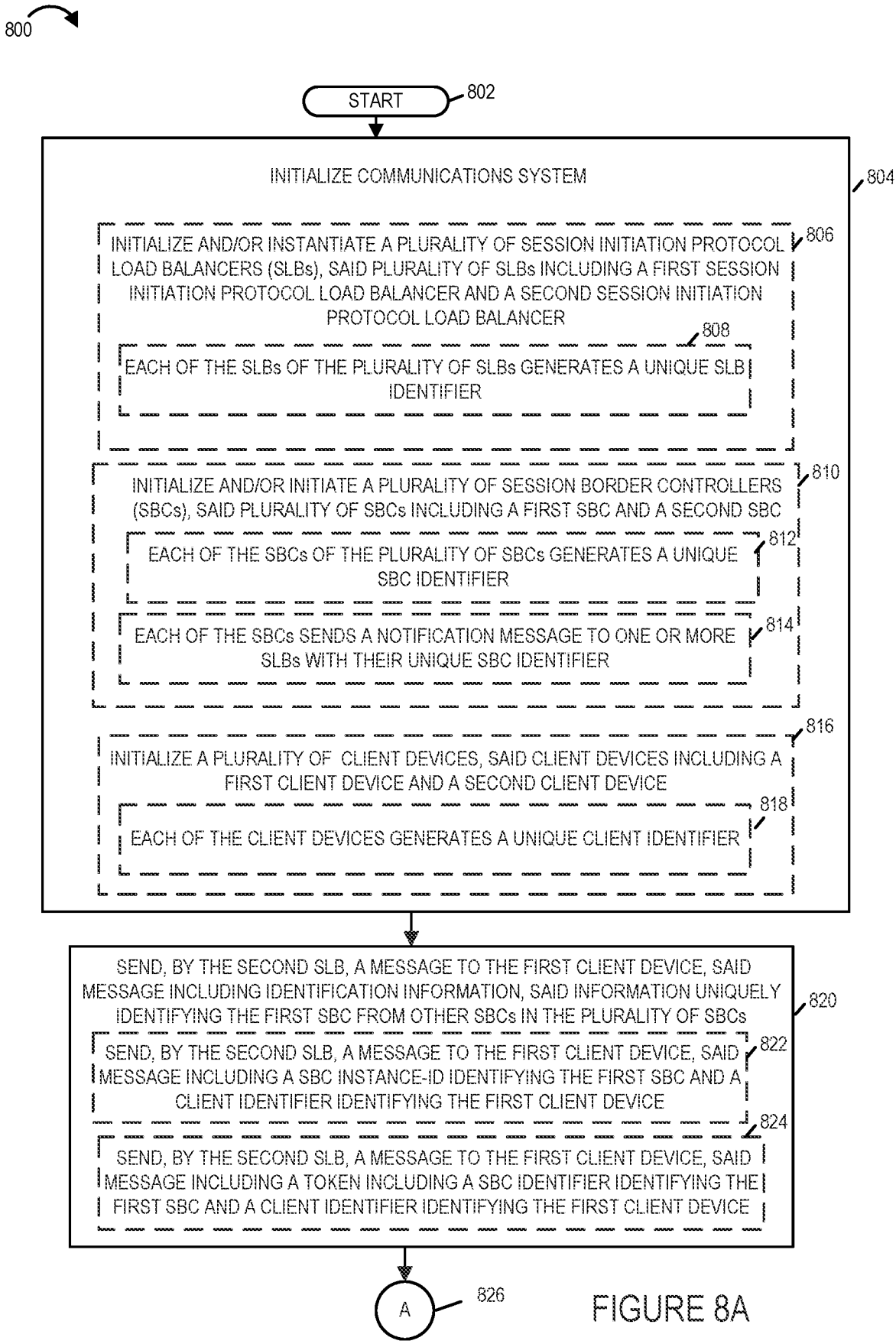
FIG. 8A is the first part of a flowchart which illustrates the steps of an exemplary method in accordance with an embodiment of the present invention.
Figure 8B:
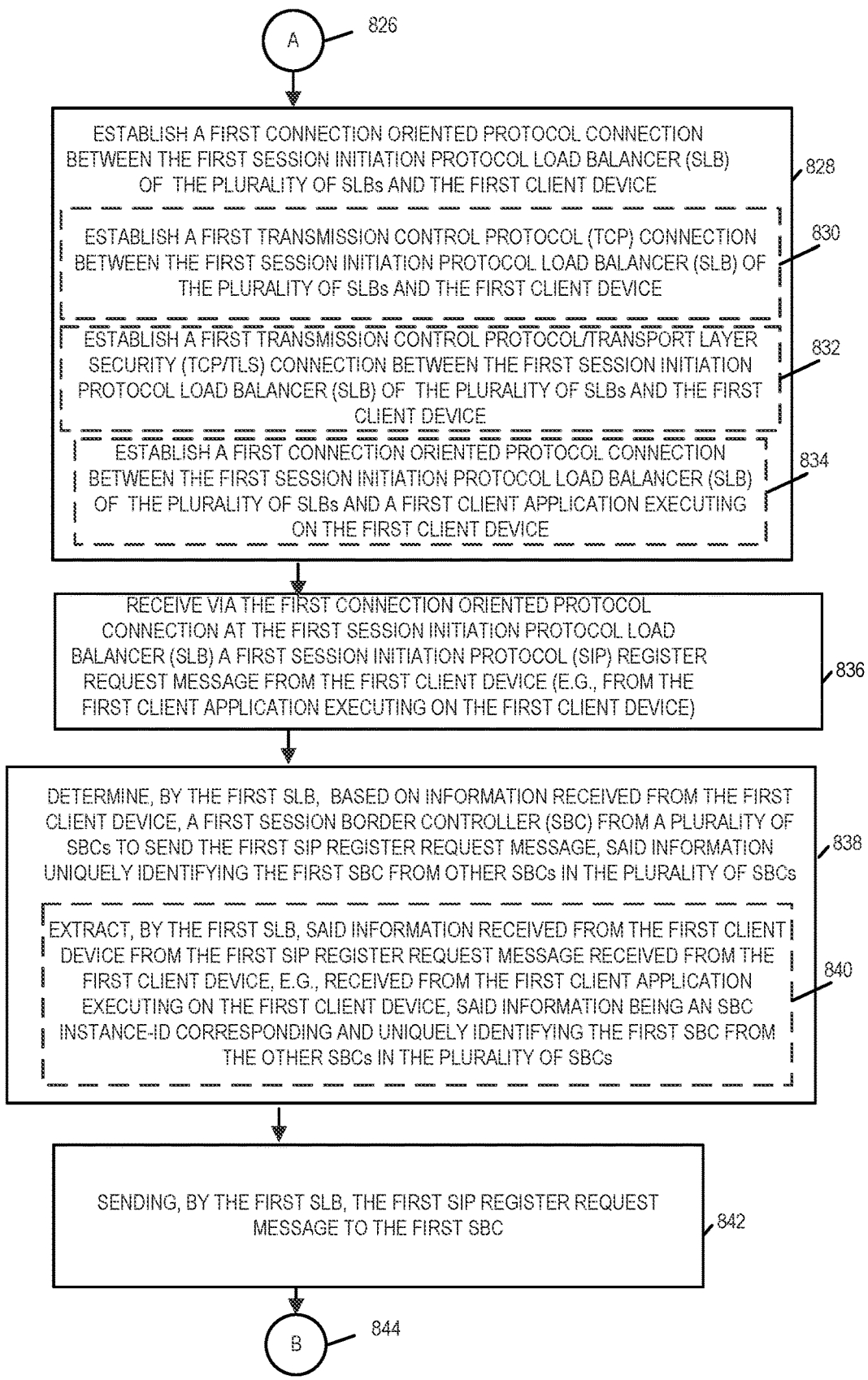
FIG. 8B is the second part of a flowchart which illustrates the steps of an exemplary method in accordance with an embodiment of the present invention.

FIG. 8 comprises FIG. 8A, FIG. 8B, and FIG. 8C. FIG. 8 illustrates a flowchart 800 which illustrates steps of another exemplary method embodiment of the present invention. FIG. 8A illustrates the first part the flowchart 800. FIG. 8B illustrates the second part of flowchart 800. FIG. 8C illustrates the third part of the flowchart 800. While it is to be understood that additional steps are typically required for communications among elements, the steps of flowchart 800 illustrates the steps pertinent to explaining the exemplary embodiment of the invention. Elements or steps with the same reference numbers used in different figures are the same or similar and those elements or steps will not be described in detail again. The method 800 may be, and in some embodiments is, implemented using exemplary system 200 of FIG. 2. However, it should be understood that the method 800 is not limited to the exemplary system 200 and may be, and is used, on other systems and system configurations.

The method 800 starts in step 802 shown on FIG. 8A. Operation proceeds from start step 802 to step 804.

In step 804, a communications system which includes elements, nodes and/or devices which will implement the method 800 is initialized. In some embodiments, step 804 includes one or more sub-steps 806, 810, and 812.

In sub-step 808, a plurality of Session Initiation Protocol Load Balancers (SLBs) are initialized and/or instantiated. The plurality of SLBs include a first SLB and a second SLB. In some embodiments, sub-step 806 includes sub-step 808. In sub-step 808, each of the SLBs of the plurality of SLBs generates a unique SLB identifier which identifies the SLB which generated it. In some embodiments when the system is initialized SLB 1 and SLB 2 each are provided or include a copy of a shared encryption key. In many embodiments, the shared encryption key is known only to other SLBs in the system and is not known by other entities inside or outside the system (e.g., client devices and SBCs). This provides security for SLB communications using the shared key.

In sub-step 810, a plurality of Session Border Controllers (SBCs) is initialized and/or initiated. The plurality of SBCs include a first SBC and a second SBC. In some embodiments, step 810 includes one or more sub-steps 812 and 814. In sub-step 812, each of the SBCs of the plurality of SBCs generates a unique SBC identifier which corresponds to and identifies the SBC from other SBCs. In sub-step 814, each of the SBCs sends a notification message to one or more SLBs, e.g., typically all of the SLBs, with their unique SBC identifier.

In sub-step 816, a plurality of client devices are initialized. The plurality of client devices including a first client device and a second client device. In some embodiments sub-step 816 includes sub-step 818. In sub-step 818, each of the client devices generates a unique client device. Operation proceeds from step 804 to step 820.

In step 820, the second SLB, sends a message to the first client device. The message includes identification information. The identification information uniquely identifies the first SBC from other SBCs in the plurality of SBCs. In some embodiments, step 820 includes one or more sub-step 822 and 824. In sub-step 822, the second SLB sends a message to the first client device. The message includes a SBC identifier also sometimes referred to as an SBC Instance_ID identifying the first SBC. In some embodiments, the message also includes a client identifier which uniquely identifies the first client device. In sub-step 824, the second SLB sends a message to the first client device. The message including a token including a SBC identifier identifying the first SBC and a client identifier identifying the first client device. In some embodiments, the message is TCP/TLS message. In some embodiments, the TCP/TLS message is sent to the first client device from the second SLB during establishment of a TCP/TLS connection and the token is included in a Transport Layer Security session ticket. In some embodiments, the message is a 200 Ok message or a SIP 401 message sent by the second SLB to the first client device in response to a SIP REGISTER message the second SLB received from the first client device. In various embodiments, the token and/or identification information (e.g., SBC identifier and/or client identifier) are encrypted by the second SLB prior to be sent to the first client device using the shared encryption key which is unknown the first client device. Operation proceeds from step 820 via connection node A 826 to step 828 shown on FIG. 8B.

In step 828, a first connection oriented protocol connection is established between the first session initiation protocol load balancer (SLB) of the plurality of SLBs and the first client device. In some embodiments, step 828 includes one or more sub-steps 830, 832, and 834.

In sub-step 830, a first transmission control protocol (TCP) connection between the first SLB of the plurality of SLBs and the first client device is established.

In sub-step 832, a first transmission control protocol/transport layer security (TCP/TLS) connection is established between the first session initiation protocol load balancer of the plurality of SLBs and the first client device.

In sub-step 834, a first connection oriented protocol connection between the first session initiation protocol load balancer of the plurality of SLBs and a first client application executing on the first client device.

Operation proceeds from step 828 to step 836. In step 836, the first SLB receives via the first connection oriented protocol connection at the first SLB a first SIP REGISTER request message from the first client device (e.g., from the first client application executing on the first client device). Operation proceeds from step 836 to step 838.

In step 838, the first SLB determines based on information received from the first client, a first session border controller (SBC) from a plurality of SBCs to send the first SIP REGISTER request message. The information uniquely identifying the first SBC from other SBCs in the plurality of SBCs. E.g., the identification information, e.g., token, SBC identifier, sent by the second SLB to the first client device in step 820. In some embodiments, step 838 includes sub-step 840.

In sub-step 840, the first SLB, extracts the information received from the first client device from the first SIP REGISTER request message received from the first client device, e.g., received from the first client application executing on the first client device. The information in some embodiments being a SBC identifier or SBC instance-ID corresponding to and uniquely identifying the first SBC from the other SBCs in the plurality of SBCs. Operation proceeds from step 838 to step 842.

In step 842, the first SLB, forwards and/or sends the first SIP REGISTER request message to the first SBC. In some embodiments, the first SBL modifies the first REGISTER request message prior to sending it to the first SBC by removing the SBC identifier and unencrypting and including the client identifier identifying the first client in the modifier first SIP REGISTER message.

In some embodiments, the plurality of SLBs is a cluster of SLBs. In some embodiments, the plurality of SBCs is a cluster of SBCs.

In some embodiments, the SLBs of the plurality of SLBs and the SBCs of the plurality of SBCs are arranged in a cluster architecture in which front end entities distribute traffic, e.g., SIP message including SIP REGISTER messages, to back end entities. In some such embodiments, the SLBs are the front end entities and the SBCs are the back end entities. The first SIP REGISTER message is included in the traffic distributed by the first SLB to the plurality of SBCs. In some embodiments, the SLBs of the plurality of SLBs are operated by the same operator. In some embodiments, the SBCs of the plurality of SBCs is operated by the same operator. In some embodiments, the plurality of SLBs and the plurality of SBCs are operated by the same operator. The communications method of Method Embodiment 1, wherein the information received from the first client has been encrypted by a second SLB, said second SLB being one of the plurality of SLBs using an encryption key unknown to any of the SBCs of the plurality of SBCs or to the first client device; wherein the encryption key is known to other SLBs in the plurality of SLBs; and wherein the encryption key is needed to decrypt the information.

In various embodiments of method 800, the information received from the first client device is included in the first SIP registration request and uniquely identifies the first SBC from other SBCs in the plurality of SBCs. In various embodiments, this information is an SBC Instance-Id corresponding to the first SBC.

In various embodiments, the information received from the first client device by the first SLB is included in an encrypted token contained in the first SIP registration request message. In some such embodiments the method further includes the step of decrypting, by the first SLB, the encrypted token, using an encryption key unknown to the plurality of SBCs or the first client, prior to or as part of determining, by the first SLB, based on information received from the client device, the first Session Border Controller (SBC) from a plurality of SBCs to send the first SIP REGISTER request message, said information uniquely identifying the first SBC from other SBCs in the plurality of SBCs. The shared encryption key being for example the shared encryption key provided to or included with the SLBs during the initialization step.

As previously discussed in some embodiments, the encryption key is a shared encryption key known to each of the SLBs in the plurality of SLBs.

In some embodiments, the method 800 further includes the step of generating, by a second SLB of the plurality of SLBs, the encrypted token. The step 820 in some such embodiments including a sub-step wherein the second SLB sends the encrypted token to the first client device in response to a second SIP registration request message which occurs prior to the first SLB receiving the first SIP registration request message in step 836. In some such embodiments of method 800, the encrypted token is sent by the second SLB to the first client device in a SIP 200 OK message indicating a successful registration with a Registrar. In some such embodiments of method 800, the encrypted token is sent by the second SLB to the first client device in a SIP 401 message.

In various embodiments, the information (received from the first client device by the first SLB and upon which the determination in step 838 is based) is included in a Transport Layer Security session ticket sent from the first client device to the first SLB during the establishment of the first connection oriented protocol connection between the first client device and the first SLB and prior to the receipt of the first SIP REGISTER request message by the first SLB.

In some embodiments in which the first connection oriented protocol connection between the first SLB and the first client device is a TCP/TLS connection the method 800 includes the steps of: receiving by the first SLB a first TCP SYN packet as part of establishing the first connection oriented protocol connection between the first SLB of the plurality of SLBs and the first client device; and in response to receiving the first TCP SYN packet, installing, by the first SLB, a microflow at the first SLB to perform Internet Protocol packet policing of TCP packets received at the first SLB having a source Internet Protocol (IP) address, source port number, destination IP address, destination port number and transport protocol type of TCP matching a source Internet Protocol (IP) address, source port number, destination IP address, destination port number and transport protocol type of TCP of the received TCP SYN packet. In some such embodiments the method 800 further includes setting, by the first SLB, a fill rate for the microflow to a value of zero; and setting a bucket size for the microflow to a first threshold value. In some such embodiments, the first threshold value is based on an estimate of a number of total packets needed for the TCP connection establishment to be completed. In some embodiments, the first threshold value is set to be sufficiently large to allow all packets needed for the TCP connection establishment to be completed including an estimate of the number of possible packets which will need to be retransmitted packets. In some embodiments, the first threshold value is set to be sufficiently large to allow all packets needed for the TCP and TLS connection establishment to be completed including an estimate of the number of possible packets which will need to be retransmitted packets. In some such embodiments, the first SLB deletes the microflow after a configurable timer T-guard timeout if TCP connection establishment is not completed successfully. In some embodiments, the first SLB performs the operation of deleting the microflow after a configurable timer T-guard timeout if TCP connection establishment and TLS connection establishment is not completed successfully.

In some embodiments, the information received from the client device uniquely identifying the first SBC from other SBCs in the plurality of SBCs is received in one of the following: a transport layer security (TLS) protocol session ticket received from the client device prior to the receipt of the first Session Initiation Protocol (SIP) REGISTER request message; or the first Session Initiation Protocol (SIP) REGISTER request message. In some such embodiments, the information is encrypted and includes a SBC identifier. The SBC identifier uniquely identifying the first SBC from other SBCs in the plurality of SBCs. In some embodiments, the method 800 further includes the step of receiving by the first SLB with said information from the client device uniquely identifying the first SBC from other SBCs in the plurality of SBCs, one or more of the following additional pieces of information: a client identifier, said client identifier uniquely identifying the client device, or a SLB identifier said SLB identifier identifying one of the SLBs of the plurality of SLBs.

In some embodiments, the first SIP REGISTER request message is received by the first SLB from the client device after a second connection oriented protocol connection between a second Session Initiation Protocol Load Balancer (SLB) of the plurality of SLBs and the client device has been dropped (e.g., because of a communications link failure, a failure of second SLB, or a failure of a NAT or NAPT behind which the client device is located and which is providing services to the client device.) For example, the connection between the second SLB and the first client device is dropped because the second SLB fails.

In various embodiments, the first SIP REGISTER request message is received in step 836 by the first SLB from the client device after a second connection oriented protocol connection between a second Session Initiation Protocol Load Balancer (SLB) of the plurality of SLBs and the client device has been dropped (e.g., because of a communications link failure, a failure of second SLB, or a failure of a NAT or NAPT behind which the client device is located and which is providing services to the client device.)

In some embodiments, the method 800 further includes the step of: receiving with said information from the client device uniquely identifying the first SBC from other SBCs in the plurality of SBCs, one or more of the following additional pieces of information: a client identifier, said client identifier uniquely identifying the client device, or a SLB identifier, said SLB identifier identifying one of the SLBs of the plurality of SLBs. In some embodiments. the information from the client device uniquely identifying the first SBC from other SBCs in the plurality of SBCs and said one or more of the additional pieces of information are encrypted by and provided to the client device by the second SLB prior to the second connection oriented protocol connection between the second SLB and the client device being dropped.

In various embodiments of the method 800, prior to the first SLB determining based on information received from the client device, the first Session Border Controller (SBC) from the plurality of SBCs to send the first SIP REGISTER request message in step 838, the second SLB creates the token. The token including the information uniquely identifying the first SBC from other SBCs in the plurality of SBCs. For example, the second SLB may create the token and in step 820 transmit from the second SLB to the first client device the token over a second connection oriented protocol connection established between the second SLB and the first client device. The first client device upon receiving the token stores the token at the client device in persistent memory. As previously discussed, in various embodiments, the token or information included in the token is encrypted by the second SLB using a shared encryption key known to each of the SLBs in the plurality of SLBs but not known to the first client device, SBCs or other entities. Also as previously discussed, in some embodiments, the token includes a SBC identifier identifying the first SBC, a client identifier identifying the first client device, and a SLB identifier identifying the second SLB. Also as previously discussed, in various method embodiments, the token is transmitted to the client device from the second SLB in a SIP 200 or SIP 400 message or in a TLS session ticket.

In various embodiments, the token is transmitted to the client device from the second SLB, e.g., in step 820, prior to a failure of the second SLB causing the second connection oriented protocol connection between the second SLB and the first client device to be dropped. The establishment of the first connection oriented protocol connection between the first client device and the first SLB in step 828 occurring in response to the second connection oriented protocol connection being dropped.

Returning to step 842 of method 800, the method proceeds from step 842 via connection node B 844 to step 846 shown on FIG. 8C.

In step 846, the first SBC receives the first SIP REGISTER request message or modified first SIP REGISTER request message from the first SLB. Operation proceeds from step 846 to step 848. In step 848, the first SBC determines that the first SIP REGISTER request message or the modified first SIP REGISTER request message corresponds to an active SIP registration being hosted by the first SBC, e.g., based on a client identifier received from the first SLB. In some embodiments the first SBC receives the client identifier in the first SIP REGISTER request message or modified first SIP REGISTER request message. Operation proceeds from step 848 to step 850.

In step 850, the first SBC, determines whether or not to forward the first SIP REGISTER request message to a Registrar based on an amount of time before the active SIP registration being hosted by the first SBC will expire (e.g., the remaining registration expiration time does not require the first SBC to forward the SIP REGISTER request to the Registrar to prevent the active SIP registration being hosted by the first SBC from expiring).

Operation proceeds from step 850 to step 852, in step 852 when the amount of time before the active SIP registration being hosted by the first SBC will expire is greater than a first threshold value the first SBC determines not to forward the first SIP REGISTER request message or modified first SIP REGISTER request message to the Registrar and refrains from forwarding the message.

Operation proceeds from step 852 to step 854. In step 854, when the amount of time before the active SIP registration being hosted by the first SBC will expire is less than or equal to the first threshold value the first SBC determines to forward the SIP REGISTER request message to the Registrar and does forward or send the message to the Registrar. Operation proceeds from step 854 to step 856.

In step 856, the process or method continues, e.g., with the clients devices establishing connections with the SLBs and the SLBs distributing the SIP traffic to the SBCs based on identification information provided to the SLBs, e.g., SBC client identifiers and/or tokens.

In various embodiments, the step of determining, by the first SBC, that the first SIP REGISTER request message corresponds to the active SIP registration being hosted by the first SBC is based on said client identifier includes comparing said client identifier to information included in active SIP registration records stored at the first SBC (e.g., comparing the received client identifier to determine if any of the stored active SIP registration records includes a matching client identifier).

In some embodiments, the client identifier is received by the first SLB from the client device in an encrypted format. The first SLB decrypts the client identifier and sends the unencrypted client identifier from the first SLB to the first SBC, e.g., in a SIP header or SIP extension of the first SIP REGISTER request message.

In some such embodiments, the first REGISTER request message sent from the first SLB to the first SBC in step 842 is a modified first REGISTER request, said modified first SIP REGISTER request message having been modified by the first SLB to include the unencrypted client identifier. In some such embodiments, the client identifier is included in a SIP header or SIP extension of the modified first SIP REGISTER request message sent to the first SBC by the first SLB.

Figure 5:
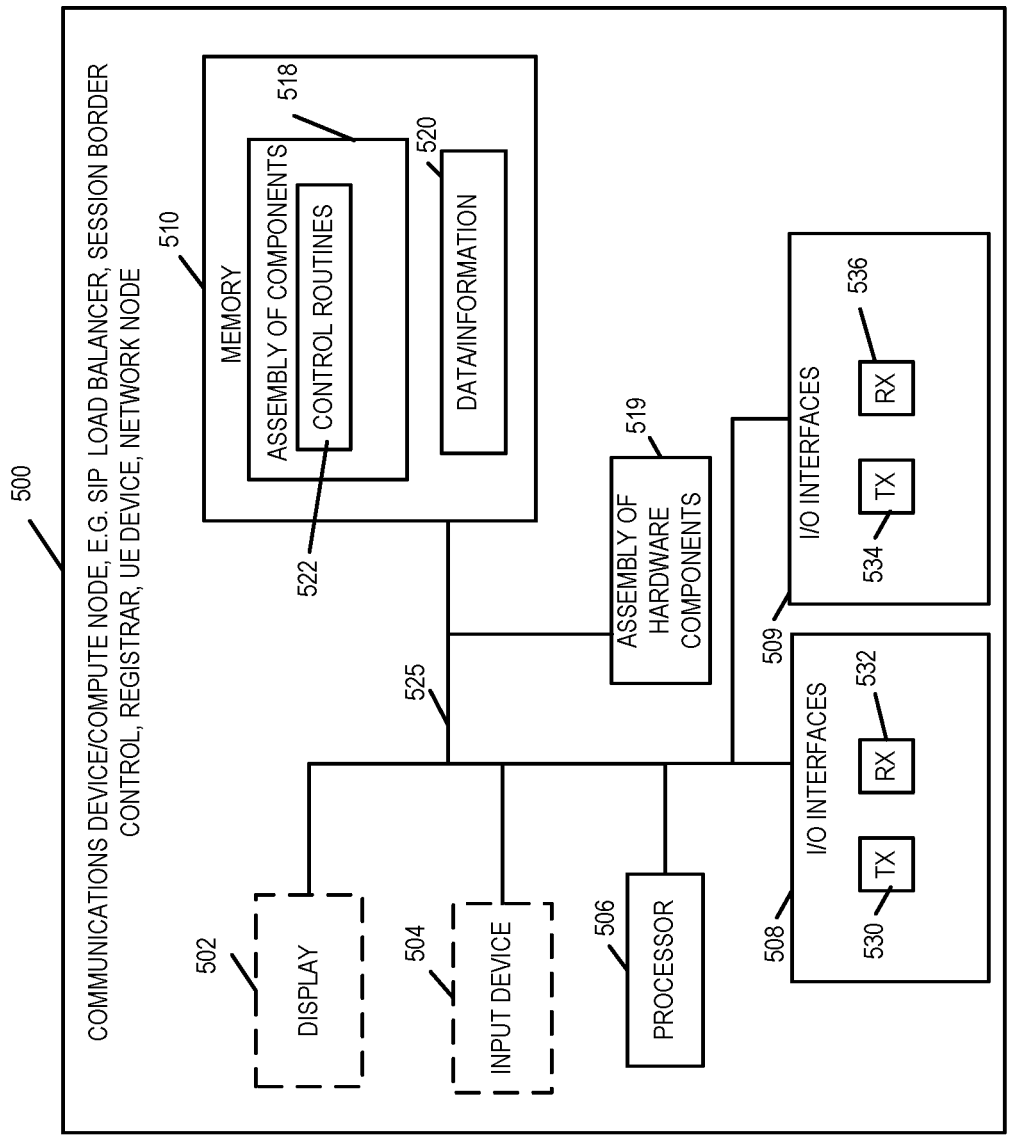
FIG. 5 is an exemplary communications/computing device/node in accordance with an embodiment of the present invention.

In some embodiments, one or more of the elements, nodes, devices, entities or components of the above mentioned systems are implemented in accordance with the exemplary computing device/node 500 illustrated in FIG. 5.

Exemplary communications device and/or compute device/node 500 includes an optional display 502, an optional input device 504, a processor 506, e.g., a CPU, I/O interfaces 508 and 509, which couple the communications device/node 500 to networks or communications links and/or various other nodes/devices, memory 510, and an assembly of hardware components 519, e.g., circuits corresponding to different components and/or modules, coupled together via a bus 525 over which the various elements may interchange data and information. Memory 510 includes an assembly of components 518, e.g., an assembly of software components, and data/information 520. The assembly of software components 518 includes a control routines component 522 which includes software instructions which when processed and executed by processor 506 control the operation of the communications/computing device/node 500 to perform various functions and/or one or more steps of the various method embodiments of the invention. The I/O interface 508 includes transmitters 530 and receivers 532. The I/O interface 509 includes transmitters 534 and receivers 536. The I/O interfaces are hardware interfaces including hardware circuitry. The communications device/node and/or compute device/node 500 is also configured to have a plurality of Internet Protocol (IP) address/port number pairs, e.g., logical IP address/port pairs, for use in exchanging signaling information. In some embodiments the I/O interfaces include IP address/port pairs. The I/O interfaces in some embodiments are configured to communicate in accordance with the Session Initiation Protocol, Session Description Protocol, Internet Protocol (IP), Transport Control Protocol (TCP), Transmission Control Protocol/Transport Layer Security (TCP/TLS) protocols, User Datagram Protocol (UDP), WebRTC protocols, Representative State Transfer (REST) protocol, SQL (Structured Query Language) Protocol, and HDFS (Hadoop Distributed File System) Protocol, SQL and/or HDFS being used to interface and access information from the various databases and/or storage devices to which it may be coupled. In some embodiments, the communications and/or computing device/node 500 includes a communication component configured to operate using Session Initiation Protocol, Session Description Protocol, IP, TCP, TCP/TLS, UDP, REST, SQL (Structured Query Language), or HDFS (Hadoop Distributed File System). In some embodiments, the communications component is a hardware component, a software component or a component including hardware and software components. While only a single hardware processor is illustrated in some embodiments, it is to be understood that the computing device/node 500 can include more than one processor with the processing being distributed among the plurality of processors. In various embodiments, the assembly of hardware components are specialized hardware components or resources which provide the compute device/node on which the assembly of components resides with specialized hardware capabilities and/or functionalities.

In some system communications embodiments of the invention the system includes an orchestrator device or module, a Virtual Network Function manager device or module, and an element management system device or module. The orchestrator controls the orchestration and management of network function virtualized infrastructure and software resources and realizing network services on network function virtualized infrastructure. The Virtual Network Function manager device or module operates to control virtual network function lifecycle management including for example instantiation, update, query and termination. A virtual network function as described in the ETSI GS NFV 002 V1.1.1 is a virtualization of a network function. In some embodiments, one or more of the following entities of system 200 are implemented as virtualized network functions: SIP load balancers, SBCs, registrar and NA(P)T. The element management system or module performs management functions for one or several of the virtual network functions, e.g., the plurality of SBCs or plurality of SLBs.

Each compute node includes one or more processors. In some embodiments, one or more of the compute nodes in the system include a single processor upon which multiple virtual entities, e.g., virtual SBCs or virtual SLBs, are instantiated. In some embodiments, each virtual SLB is a set of programming instructions forming a SLB application, which is executed on a processor of a compute node. In some embodiments, each virtual SBC is a set of programming instructions forming a SBC application, which is executed on a processor of a compute node.

In some embodiments, one or more of the network entities of system 200, e.g., SBCs and/or SLBs, are implemented as virtual network functions. In some embodiments, one or more of the network entities of the system 200 are implemented on virtual machines executing one or more compute nodes in a cloud.

Figure 7:
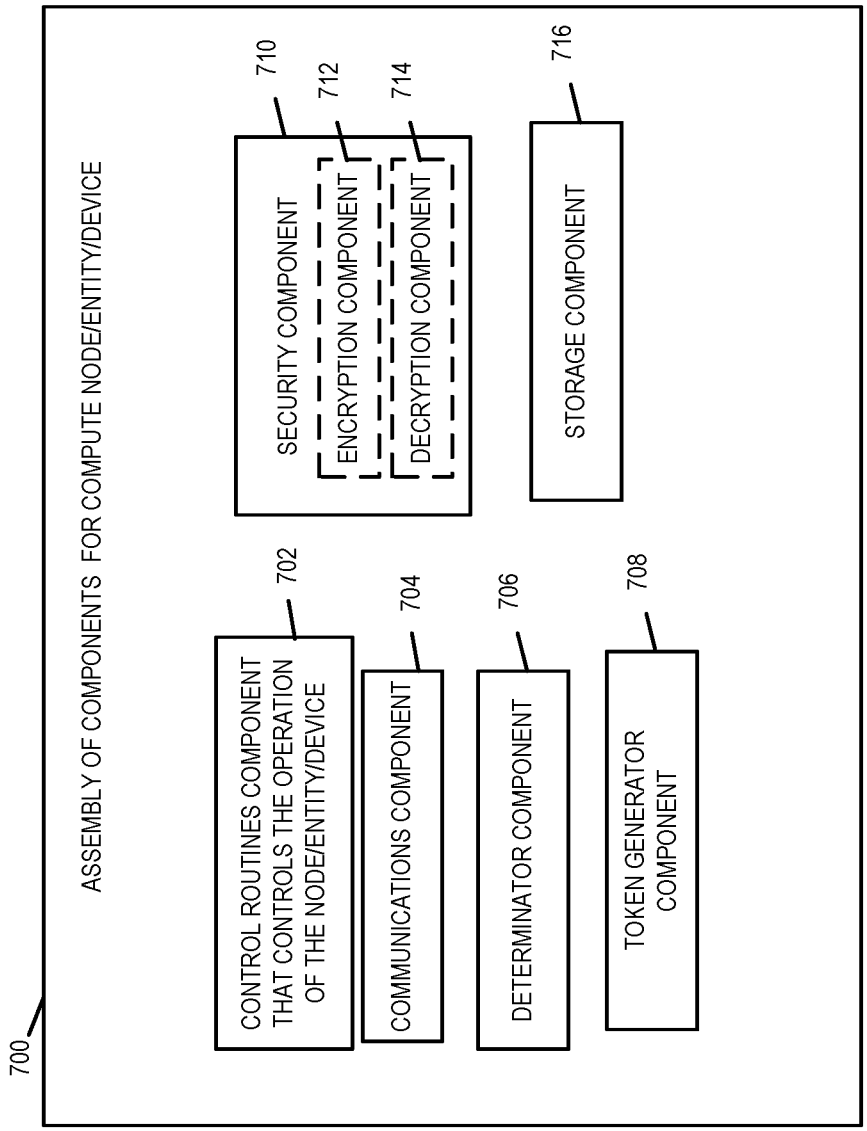
FIG. 7 illustrates an exemplary assembly of components for a compute node, entity, or device.

FIG. 7 is a drawing illustrating an assembly of components 700 which may be included in a computing node/entity/device 500 of FIG. 5 implemented in accordance with an exemplary embodiment of the present invention. Assembly of components 700 may be, and in some embodiments is, used in compute device/entity/node 500. The components in the assembly of components 700 can, and in some embodiments are, implemented fully in hardware within the processor 506, e.g., as individual circuits. The components in the assembly of components 700 can, and in some embodiments are, implemented fully in hardware within the assembly of components 519, e.g., as individual circuits corresponding to the different components. In other embodiments some of the components are implemented, e.g., as circuits, within the processor 506 with other components being implemented, e.g., as circuits within assembly of components 519, external to and coupled to the processor 506. As should be appreciated the level of integration of components on the processor and/or with some components being external to the processor may be one of design choice. Alternatively, rather than being implemented as circuits, all or some of the components may be implemented in software and stored in the memory 510 of the computing node/entity/device 500, with the components controlling operation of computing node/entity/device 500 to implement the functions corresponding to the components when the components are executed by a processor, e.g., processor 506. In some such embodiments, the assembly of components 700 is included in the memory 510 as assembly of components 518. In still other embodiments, various components in assembly of components 700 are implemented as a combination of hardware and software, e.g., with another circuit external to the processor providing input to the processor 506 which then under software control operates to perform a portion of a component's function. While shown in the FIG. 5 embodiment as a single processor, e.g., computer, it should be appreciated that the processor 506 may be implemented as one or more processors, e.g., computers.

When implemented in software the components include code, which when executed by the processor 506, configure the processor 506 to implement the function corresponding to the component. In embodiments where the assembly of components 700 is stored in the memory 510, the memory 510 is a computer program product comprising a computer readable medium comprising code, e.g., individual code for each component, for causing at least one computer, e.g., processor 506, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 7 assembly of components 700 control and/or configure the computing node/entity/device 500 or elements therein such as the processor 506, to perform the functions of corresponding steps illustrated and/or described in the methods and signaling diagrams and flowchart of FIGS. 3 and 6 and/or described with respect to any of the Figures or embodiments described herein. Thus, the assembly of components 700 includes various components that perform functions of corresponding steps of methods described herein.

Assembly of components 700 includes components 702, 704, 706, 708, 710, 716. Not all components in the assembly of components need to be implemented in a particular device. The particular components implemented depends on the device in which they are included.

The control routines component 702 is configured to control the operation of the node/entity/device.

The communications component 704 is configured to provide communications functionality including communications signaling and support for various communications protocols and interfaces. The communications component 704 includes functionality for generating, transmitting, receiving, modifying, relaying and processing messages including for example, TCP message, TLS messages, and SIP messages.

The determinator component 706 makes determinations for node/entity/device for example when the entity is a SBC it makes the following exemplary determinations: whether it is hosting SIP processing for a client device, whether to update a SIP registration record for a client, whether to forward SIP registration request, whether a registration for a client device AoR is active, whether to update a refresh timer for a registration corresponding to a client device AoR. When the entity is a SLB, the determinator component 706, makes the following exemplary determinations: selection or determination of which SBC from a cluster of SBCs to send SIP messages, e.g., SIP registration, SIP Invite, SIP Ok messages, determination of a SLB Identifier for itself, determination of a client identifier by which to identify a client device AoR from which a session initiation request, e.g., TCP session, TCP/TLS session, and/or SIP REGISTER request has been received.

The token generator component 708 is a component only included in SLBs. It generates tokens. In some embodiments, each token as previously described includes information which uniquely identify a SBC, a client device or AoR, and a SLB.

The security component 710 performs security operations at the device/node for example performing encryption and decryption of information, tokens, and data. In some embodiments, security component 710 includes one or more of the following sub-components: encryption component 712 and decryption component 714. The encryption component 712 performs encryption operations. The decryption component 714 performs decryption operations.

The storage component 716 manages and performs the task of storing and retrieving data, records and information from memory, databases, and storage devices. For example, when entity 500 is a client device the storage component stores the token or session ticket information the client device receives during session establishment in the client device's memory, e.g., persistent memory.

List of Exemplary Numbered Method Embodiments

Method Embodiment 1. A communications method comprising: establishing a first connection oriented protocol connection between a first Session Initiation Protocol Load Balancer (SLB) of a plurality of SLBs and a client device; receiving via the first connection oriented protocol connection at the first Session Initiation Protocol Load Balancer (SLB) a first Session Initiation Protocol (SIP) REGISTER request message from the first client device; determining, by the first SLB, based on information received from the client device, a first Session Border Controller (SBC) from a plurality of SBCs to send the first SIP REGISTER request message, said information uniquely identifying the first SBC from other SBCs in the plurality of SBCs; and sending, by the first SLB, the first SIP REGISTER request message to the first SBC.

Method Embodiment 1A. The communications method of Method Embodiment 1, wherein the plurality of SLBs is a cluster of SLBs.

Method Embodiment 1AA. The communications method of Method Embodiment 1A, wherein the plurality of SBCs is a cluster of SBCs.

Method Embodiment 1B. The communications method of Method Embodiment 1, wherein the SLBs of the plurality of SLBs and the SBCs of the plurality of SBCs are arranged in a cluster architecture in which front end entities distribute traffic to back end entities.

Method Embodiment 1BB. The communications method of Method Embodiment 1B, wherein said plurality of SLBs are front end entities which distribute traffic to back end entities in said cluster architecture; wherein said plurality of SBCs are back end entities in said cluster architecture; and wherein said first SIP registration request message is included in the traffic distributed by the first SLB to the plurality of SBCs.

Method Embodiment 1BBB. The communications method of Method Embodiment 1BB, wherein the SLBs of the plurality of SLBs is operated by a first operator (e.g., a first communications network operator).

Method Embodiment 1BBBB. The communications method of Method Embodiment 1BBB, wherein the plurality of SBCs are also operated by the first operator (e.g., the first communications network operator).

Method Embodiment 2. The communications method of Method Embodiment 1, wherein the first connection oriented protocol connection is a Transmission Control Protocol connection.

Method Embodiment 3. The communications method of Method Embodiment 1, wherein the first connection oriented protocol connection is a Transmission Control Protocol/Transport Layer Security (TCP/TLS) connection.

Method Embodiment 4. The communications method of Method Embodiment 1, wherein the information received from the first client has been encrypted by a second SLB, said second SLB being one of the plurality of SLBs using an encryption key unknown to any of the SBCs of the plurality of SBCs or to the first client device; wherein the encryption key is known to other SLBs in the plurality of SLBs; and wherein the encryption key is needed to decrypt the information.

Method Embodiment 5. The communications method of Method Embodiment 1, wherein the information received from the first client device is included in the first SIP registration request.

Method Embodiment 6. The communications method of Method Embodiment 1, wherein the information uniquely identifying the first SBC from other SBCs in the plurality of SBCs is an SBC Instance-Id corresponding to the first SBC.

Method Embodiment 7. The communications method of Method Embodiment 5, wherein the information received from the first client device is included in an encrypted token contained in the first SIP registration request message.

Method Embodiment 7A. The communications method of Method Embodiment 7, further comprising: decrypting, by the first SLB, the encrypted token, using an encryption key unknown to the plurality of SBCs or the first client, prior to determining, by the first SLB, based on information received from the client device, a first Session Border Controller (SBC) from a plurality of SBCs to send the first SIP REGISTER request message, said information uniquely identifying the first SBC from other SBCs in the plurality of SBCs.

Method Embodiment 7B. The communications method of Method Embodiment 7A, wherein the encryption key is a shared encryption key known to each of the SLBs in the plurality of SLBs.

Method Embodiment 8. The communications method of Method Embodiment 7, further comprising: generating, by a second SLB of the plurality of SLBs, the encrypted token; and sending, by the second SLB, the encrypted token to the first client device in response to a second SIP registration request message prior to the first SLB receiving the first SIP registration request message.

Method Embodiment 8A. The communications method of Method Embodiment 8, wherein the encrypted token is sent by the second SLB to the first client device in a SIP 200 OK message indicating a successful registration with a Registrar.

Method Embodiment 8B. The communications method of Method Embodiment 8, wherein the encrypted token is sent by the second SLB to the first client device in a SIP 401 message.

Method Embodiment 9. The communications method of Method Embodiment 1, wherein the information received from the first client device is included in a Transport Layer Security session ticket.

Method Embodiment 10. The communications method of Method Embodiment 2, further comprising: receiving by the first SLB a first TCP SYN packet as part of establishing the first connection oriented protocol connection between the first SLB of the plurality of SLBs and the client device; and in response to receiving the first TCP SYN packet, installing, by the first SLB, a microflow at the first SLB to perform Internet Protocol packet policing of TCP packets received at the first SLB having a source Internet Protocol (IP) address, source port number, destination IP address, destination port number and transport protocol type of TCP matching a source Internet Protocol (IP) address, source port number, destination IP address, destination port number and transport protocol type of TCP of the received TCP SYN packet.

Method Embodiment 11. The communications method of Method Embodiment 10, further comprising: setting, by the first SLB, a fill rate for the microflow to a value of zero; and setting a bucket size for the microflow to a first threshold value.

Method Embodiment 12. The communications method of Method Embodiment 11, wherein the first threshold value is based on an estimate of a number of total packets needed for the TCP connection establishment to be completed.

Method Embodiment 12A. The communications method of Method Embodiment 12, wherein the first threshold value is set to be sufficiently large to allow all packets needed for the TCP connection establishment to be completing including an estimate of the number of possible packets which will need to be retransmitted packets.

Method Embodiment 12AA. The communications method of Method Embodiment 12, wherein the first threshold value is set to be sufficiently large to allow all packets needed for the TCP and TLS connection establishment to be completing including an estimate of the number of possible packets which will need to be retransmitted packets.

Method Embodiment 13. The communications method of Method Embodiment 11 further comprising: deleting the microflow after a configurable timer T-guard timeout if TCP connection establishment is not completed successfully.

Method Embodiment 13A. The communications method of Method Embodiment 11 further comprising: deleting the microflow after a configurable timer T-guard timeout if TCP connection establishment and TLS connection establishment is not completed successfully.

Method Embodiment 14. The communications method of Method Embodiment 11, wherein the information received from the client device uniquely identifying the first SBC from other SBCs in the plurality of SBCs is received in one of the following: a transport layer security (TLS) protocol session ticket received from the client device prior to the receipt of the first Session Initiation Protocol (SIP) REGISTER request message; or the first Session Initiation Protocol (SIP) REGISTER request message; and wherein the information is encrypted, said information including a SBC identifier, said SBC identifier uniquely identifying the first SBC from other SBCs in the plurality of SBCs.

Method Embodiment 15. The communications method of Method Embodiment 14, further comprising: receiving with said information from the client device uniquely identifying the first SBC from other SBCs in the plurality of SBCs, one or more of the following additional pieces of information: a client identifier, said client identifier uniquely identifying the client device, or a SLB identifier said SLB identifier identifying one of the SLBs of the plurality of SLBs.

Method Embodiment 16. The method of Method Embodiment 1, wherein the first SIP REGISTER request message is received by the first SLB from the client device after a second connection oriented protocol connection between a second Session Initiation Protocol Load Balancer (SLB) of the plurality of SLBs and the client device has been dropped (e.g., because of a communications link failure, a failure of second SLB, or a failure of a NAT or NAPT behind which the client device is located and which is providing services to the client device.)

Method Embodiment 17. The method of Method Embodiment 16, wherein the first SIP REGISTER request message is received by the first SLB from the client device after a second connection oriented protocol connection between a second Session Initiation Protocol Load Balancer (SLB) of the plurality of SLBs and the client device has been dropped (e.g., because of a communications link failure, a failure of second SLB, or a failure of a NAT or NAPT behind which the client device is located and which is providing services to the client device.)

Method Embodiment 18. The communications method of Method Embodiment 17, further comprising: receiving with said information from the client device uniquely identifying the first SBC from other SBCs in the plurality of SBCs, one or more of the following additional pieces of information: a client identifier, said client identifier uniquely identifying the client device, or a SLB identifier, said SLB identifier identifying one of the SLBs of the plurality of SLBs.

Method Embodiment 19. The communications method of Method Embodiment 18, wherein said information from the client device uniquely identifying the first SBC from other SBCs in the plurality of SBCs and said one or more of the additional pieces of information are encrypted by and provided to the client device by the second SLB prior to the second connection oriented protocol connection between the second SLB and the client device being dropped.

Method Embodiment 20. The communications method of Method Embodiment 1 further comprising: prior to the first SLB determining based on information received from the client device, the first Session Border Controller (SBC) from the plurality of SBCs to send the first SIP REGISTER request message: creating a token, by a second SLB, said token including the information uniquely identifying the first SBC from other SBCs in the plurality of SBCs; transmitting from the second SLB to the client device the token over a second connection oriented protocol connection established between the second SLB and the client device; and storing the token at the client device in persistent memory.

Method Embodiment 21. The communications method of Method Embodiment 20, wherein the token or information included in the token is encrypted by the second SLB using a shared encryption key known to each of the SLBs in the plurality of SLBs but not known to the client device, SBCs or other entities.

Method Embodiment 22. The communication method of Method Embodiment 21, wherein the token includes a SBC identifier identifying the first SBC, a client identifier identifying the client device, and a SLB identifier identifying the second SLB.

Method Embodiment 23. The communications method of Method Embodiment 22, wherein the token is transmitted to the client device from the second SLB in a SIP 200 or SIP 400 message or in a TLS session ticket.

Method Embodiment 24. The communications method of Method Embodiment 23, wherein the token is transmitted to the client device from the second SLB prior to the failure of the second SLB causing the second connection oriented protocol connection to be dropped; and wherein the establishment of the first connection oriented protocol connection is in response to the second connection oriented protocol connection being dropped.

Method Embodiment 25. The communications method of Method Embodiment 1, further comprising: receiving, by the first SBC from the first SLB, the first SIP REGISTER request message; determining, by the first SBC, that the first SIP REGISTER request message corresponds to an active SIP registration being hosted by the first SBC; determining, by the first SBC, whether or not to forward the SIP REGISTER request message to a Registrar based on an amount of time before the active SIP registration being hosted by the first SBC will expire (e.g., the remaining registration expiration time does not require the SBC to forward the SIP REGISTER request to the Registrar to prevent the active SIP registration being hosted by the first SBC from expiring).

Method Embodiment 26. The communications method of Method Embodiment 25, further comprising: when the amount of time before the active SIP registration being hosted by the first SBC will expire is greater than a first threshold value determining not to forward the SIP REGISTER request message to the Registrar.

Method Embodiment 26A. The communications method of Method Embodiment 25, further comprising: when the amount of time before the active SIP registration being hosted by the first SBC will expire is less than or equal to the first threshold value determining to forward the SIP REGISTER request message to the Registrar.

Method Embodiment 27. The communications method of Method Embodiment 26, further comprising: receiving with said information from the client device uniquely identifying the first SBC from other SBCs in the plurality of SBCs, a client identifier, said client identifier uniquely identifying the client device from other client devices; prior to said determining, by the first SBC, that the first SIP REGISTER request message corresponds to an active SIP registration being hosted by the first SBC, sending, from the first SLB to the first SBC, said client identifier; and wherein said determining, by the first SBC, that the first SIP REGISTER request message corresponds to the active SIP registration being hosted by the first SBC is based on said client identifier.

Method Embodiment 27A. The communications method of Method Embodiment 27, wherein said determining, by the first SBC, that the first SIP REGISTER request message corresponds to the active SIP registration being hosted by the first SBC is based on said client identifier includes comparing said client identifier to information included in active SIP registration records stored at the first SBC (e.g., comparing the received client identifier to determine if any of the stored active SIP registration records includes a matching client identifier).

Method Embodiment 28. The communications method of Method Embodiment 27, further comprising: wherein the client identifier is received by the first SLB from the client device in an encrypted format; wherein the first SLB decrypts the client identifier; and wherein the first SLB sends the unencrypted client identifier from the first SLB to the first SBC.

Method Embodiment 29. The communications method of Method Embodiment 28, wherein said first REGISTER request message sent from the first SLB to the first SBC is a modified first REGISTER request, said modified first REGISTER request having been modified by the first SLB to include the unencrypted client identifier.

Method Embodiment 30. The communications method of Method Embodiment 29, wherein the client identifier is included in a SIP header or SIP extension of the modified first SIP REGISTER request message sent to the first SBC by the first SLB.

List of Exemplary Numbered System/Apparatus Embodiments

System Embodiment 1. A communications system comprising: a first Session Initiation Protocol Load Balancer (SLB), said first SLB being one of a plurality of SLBs, said first SLB including: a memory; and a first processor, said first processor controlling the first SLB to perform the following operations: establishing a first connection oriented protocol connection between a first Session Initiation Protocol Load Balancer (SLB) of a plurality of SLBs and a client device; receiving via the first connection oriented protocol connection at the first Session Initiation Protocol Load Balancer (SLB) a first Session Initiation Protocol (SIP) REGISTER request message from the first client device; determining, by the first SLB, based on information received from the client device, a first Session Border Controller (SBC) from a plurality of SBCs to send the first SIP REGISTER request message, said information uniquely identifying the first SBC from other SBCs in the plurality of SBCs; and sending, by the first SLB, the first SIP REGISTER request message to the first SBC.

System Embodiment 1A. The communications system of System Embodiment 1, wherein the plurality of SLBs is a cluster of SLBs.

System Embodiment 1AA. The communications system of System Embodiment 1A, wherein the plurality of SBCs is a cluster of SBCs.

System Embodiment 1B. The communications system of System Embodiment 1, wherein the SLBs of the plurality of SLBs and the SBCs of the plurality of SBCs are arranged in a cluster architecture in which front end entities distribute traffic to back end entities.

System Embodiment 1BB. The communications system of System Embodiment 1B, wherein said plurality of SLBs are front end entities which distribute traffic to back end entities in said cluster architecture; wherein said plurality of SBCs are back end entities in said cluster architecture; and wherein said first SIP registration request message is included in the traffic distributed by the first SLB to the plurality of SBCs.

System Embodiment 1BBB. The communications system of System Embodiment 1BB, wherein the SLBs of the plurality of SLBs is operated by a first operator (e.g., a first communications network operator).

System Embodiment 1BBBB. The communications system of System Embodiment 1BBB, wherein the plurality of SBCs are also operated by the first operator (e.g., the first communications network operator).

System Embodiment 2. The communications system of System Embodiment 1, wherein the first connection oriented protocol connection is a Transmission Control Protocol connection.

System Embodiment 3. The communications system of System Embodiment 1, wherein the first connection oriented protocol connection is a Transmission Control Protocol/Transport Layer Security (TCP/TLS) connection.

System Embodiment 4. The communications system of System Embodiment 1, wherein the information received from the first client has been encrypted by a second SLB, said second SLB being one of the plurality of SLBs using an encryption key unknown to any of the SBCs of the plurality of SBCs or to the first client device; wherein the encryption key is known to other SLBs in the plurality of SLBs; and wherein the encryption key is needed to decrypt the information.

System Embodiment 5. The communications system of System Embodiment 1, wherein the information received from the first client device is included in the first SIP registration request.

System Embodiment 6. The communications system of System Embodiment 1, wherein the information uniquely identifying the first SBC from other SBCs in the plurality of SBCs is an SBC Instance-Id corresponding to the first SBC.

System Embodiment 7. The communications system of System Embodiment 5, wherein the information received from the first client device is included in an encrypted token contained in the first SIP registration request message.

System Embodiment 7A. The communications system of System Embodiment 7, wherein the first processor further controls the first SLB to the perform the following operation: decrypting, by the first SLB, the encrypted token, using an encryption key unknown to the plurality of SBCs or the first client, prior to determining, by the first SLB, based on information received from the client device, a first Session Border Controller (SBC) from a plurality of SBCs to send the first SIP REGISTER request message, said information uniquely identifying the first SBC from other SBCs in the plurality of SBCs.

System Embodiment 7B. The communications system of System Embodiment 7A, wherein the encryption key is a shared encryption key known to each of the SLBs in the plurality of SLBs.

System Embodiment 8. The communications system of System Embodiment 7, further comprising: a second SLB, said second SLB being one of the plurality of SLBs, said second SLB including memory and a second processor, said second processor controlling the second SLB to perform the following operations: generating, by the second SLB of the plurality of SLBs, the encrypted token; and sending, by the second SLB, the encrypted token to the first client device in response to a second SIP registration request message prior to the first SLB receiving the first SIP registration request message.

System Embodiment 8A. The communications system of System Embodiment 8, wherein the encrypted token is sent by the second SLB to the first client device in a SIP 200 OK message indicating a successful registration with a Registrar.

System Embodiment 8B. The communications system of System Embodiment 8, wherein the encrypted token is sent by the second SLB to the first client device in a SIP 401 message.

System Embodiment 9. The communications system of System Embodiment 1, wherein the information received from the first client device is included in a Transport Layer Security session ticket.

System Embodiment 10. The communications system of System Embodiment 2, wherein the first processor further controls the first SLB to perform the following operations: receiving by the first SLB a first TCP SYN packet as part of establishing the first connection oriented protocol connection between the first SLB of the plurality of SLBs and the client device; and in response to receiving the first TCP SYN packet, installing, by the first SLB, a microflow at the first SLB to perform Internet Protocol packet policing of TCP packets received at the first SLB having a source Internet Protocol (IP) address, source port number, destination IP address, destination port number and transport protocol type of TCP matching a source Internet Protocol (IP) address, source port number, destination IP address, destination port number and transport protocol type of TCP of the received TCP SYN packet.

System Embodiment 11. The communications system of System Embodiment 10, wherein the first processor further controls the first SLB to perform the following operations: setting, by the first SLB, a fill rate for the microflow to a value of zero; and setting a bucket size for the microflow to a first threshold value.

System Embodiment 12. The communications system of System Embodiment 11, wherein the first threshold value is based on an estimate of a number of total packets needed for the TCP connection establishment to be completed.

System Embodiment 12A. The communications system of System Embodiment 12, wherein the first threshold value is set to be sufficiently large to allow all packets needed for the TCP connection establishment to be completing including an estimate of the number of possible packets which will need to be retransmitted packets.

System Embodiment 12AA. The communications system of System Embodiment 12, wherein the first threshold value is set to be sufficiently large to allow all packets needed for the TCP and TLS connection establishment to be completing including an estimate of the number of possible packets which will need to be retransmitted packets.

System Embodiment 13. The communications system of System Embodiment 11, wherein the first processor controls the first SLB to perform the following operation: deleting the microflow after a configurable timer T-guard timeout if TCP connection establishment is not completed successfully.

System Embodiment 13A. The communications system of System Embodiment 11, wherein the first processor controls the first SLB to perform the following operation: deleting the microflow after a configurable timer T-guard timeout if TCP connection establishment and TLS connection establishment is not completed successfully.

System Embodiment 14. The communications system of System Embodiment 11, wherein the information received from the client device uniquely identifying the first SBC from other SBCs in the plurality of SBCs is received in one of the following: a transport layer security (TLS) protocol session ticket received from the client device prior to the receipt of the first Session Initiation Protocol (SIP) REGISTER request message; or the first Session Initiation Protocol (SIP) REGISTER request message; and wherein the information is encrypted, said information including a SBC identifier, said SBC identifier uniquely identifying the first SBC from other SBCs in the plurality of SBCs.

System Embodiment 15. The communications system of System Embodiment 14, wherein the first processor controls the first SLB to perform the following operation: receiving with said information from the client device uniquely identifying the first SBC from other SBCs in the plurality of SBCs, one or more of the following additional pieces of information: a client identifier, said client identifier uniquely identifying the client device, or a SLB identifier said SLB identifier identifying one of the SLBs of the plurality of SLBs.

System Embodiment 16. The communications system of System Embodiment 1, wherein the first SIP REGISTER request message is received by the first SLB from the client device after a second connection oriented protocol connection between a second Session Initiation Protocol Load Balancer (SLB) of the plurality of SLBs and the client device has been dropped (e.g., because of a communications link failure, a failure of second SLB, or a failure of a NAT or NAPT behind which the client device is located and which is providing services to the client device.)

System Embodiment 17. The communications system of System Embodiment 16, wherein the first SIP REGISTER request message is received by the first SLB from the client device after a second connection oriented protocol connection between a second Session Initiation Protocol Load Balancer (SLB) of the plurality of SLBs and the client device has been dropped (e.g., because of a communications link failure, a failure of second SLB, or a failure of a NAT or NAPT behind which the client device is located and which is providing services to the client device.)

System Embodiment 18. The communications system of System Embodiment 17, the first processor further controls the first SLB to perform the following operation: receiving with said information from the client device uniquely identifying the first SBC from other SBCs in the plurality of SBCs, one or more of the following additional pieces of information: a client identifier, said client identifier uniquely identifying the client device, or a SLB identifier said SLB identifier identifying one of the SLBs of the plurality of SLBs.

System Embodiment 19. The communications system of System Embodiment 18, wherein said information from the client device uniquely identifying the first SBC from other SBCs in the plurality of SBCs and said one or more of the additional pieces of information are encrypted by and provided to the client device by the second SLB prior to the second connection oriented protocol connection between the second SLB and the client device being dropped.

System Embodiment 20. The communications system of System Embodiment 1 further comprising: a second SLB, said second SLB being one of said plurality of SLBs, said second SLB including a memory and a second processor, said second processor controlling the second SLB to perform the following operations: prior to the first SLB determining based on information received from the client device, the first Session Border Controller (SBC) from the plurality of SBCs to send the first SIP REGISTER request message: creating a token, by the second SLB, said token including the information uniquely identifying the first SBC from other SBCs in the plurality of SBCs; transmitting from the second SLB to the client device the token over a second connection oriented protocol connection established between the second SLB and the client device.

System Embodiment 20A. The communications system of System Embodiment 21, wherein the client device includes persistent memory and a third processor, said third processor controlling the client device to perform the following operation: receiving the token over the second connection oriented protocol connection established between the second SLB and the client device; and storing the received token in said persistent memory.

System Embodiment 21. The communications system of System Embodiment 20, wherein the token or information included in the token is encrypted by the second SLB using a shared encryption key known to each of the SLBs in the plurality of SLBs but not known to the client device, SBCs or other entities.

System Embodiment 22. The communication system of System Embodiment 21, wherein the token includes a SBC identifier identifying the first SBC, a client identifier identifying the client device, and a SLB identifier identifying the second SLB.

System Embodiment 23. The communications system of System Embodiment 22, wherein the token is transmitted to the client device from the second SLB in a SIP 200 or SIP 400 message or in a TLS session ticket.

System Embodiment 24. The communications system of System Embodiment 23, wherein the token is transmitted to the client device from the second SLB prior to the failure of the second SLB causing the second connection oriented protocol connection to be dropped; and wherein the establishment of the first connection oriented protocol connection is in response to the second connection oriented protocol connection being dropped.

System Embodiment 25. The communications system of System Embodiment 1, wherein the first SBC includes a second processor, said second processor controls the second SBC to perform the following operations: receive from the first SLB, the first SIP REGISTER request message; determine that the first SIP REGISTER request message corresponds to an active SIP registration being hosted by the first SBC; and determine whether or not to forward the SIP REGISTER request message to a Registrar based on an amount of time before the active SIP registration being hosted by the first SBC will expire (e.g., the remaining registration expiration time does not require the SBC to forward the SIP REGISTER request to the Registrar to prevent the active SIP registration being hosted by the first SBC from expiring).

System Embodiment 26. The communications system of System Embodiment 25, further comprising: when the amount of time before the active SIP registration being hosted by the first SBC will expire is greater than a first threshold value determining not to forward the SIP REGISTER request message to the Registrar.

System Embodiment 26A. The communications system of System Embodiment 25, further comprising: when the amount of time before the active SIP registration being hosted by the first SBC will expire is less than or equal to the first threshold value determining, by the first SBC, to forward the SIP REGISTER request message to the Registrar.

System Embodiment 27. The communications system of System Embodiment 26, wherein the first processor further controls the first SLB to perform the following operation: receiving with said information from the client device uniquely identifying the first SBC from other SBCs in the plurality of SBCs, a client identifier, said client identifier uniquely identifying the client device from other client devices; and prior to said determining, by the first SBC, that the first SIP REGISTER request message corresponds to an active SIP registration being hosted by the first SBC, sending, from the first SLB to the first SBC, said client identifier; and wherein said determining, by the first SBC, that the first SIP REGISTER request message corresponds to the active SIP registration being hosted by the first SBC is based on said client identifier.

System Embodiment 27A. The communications system of System Embodiment 27, wherein said determining, by the first SBC, that the first SIP REGISTER request message corresponds to the active SIP registration being hosted by the first SBC is based on said client identifier includes comparing said client identifier to information included in active SIP registration records stored at the first SBC (e.g., comparing the received client identifier to determine if any of the stored active SIP registration records includes a matching client identifier).

System Embodiment 28. The communications system of System Embodiment 27, further comprising: wherein the client identifier is received by the first SLB from the client device in an encrypted format; wherein the first SLB decrypts the client identifier; and wherein the first SLB sends the unencrypted client identifier from the first SLB to the first SBC.

System Embodiment 29. The communications system of System Embodiment 28, wherein said first REGISTER request message sent from the first SLB to the first SBC is a modified first REGISTER request, said modified first REGISTER request having been modified by the first SLB to include the unencrypted client identifier.

System Embodiment 30. The communications system of System Embodiment 29, wherein the client identifier is included in a SIP header or SIP extension of the modified first SIP REGISTER request message sent to the first SBC by the first SLB.

List of Exemplary Numbered Non-Transitory Computer Readable Medium Embodiments

Non-transitory Computer Readable Medium Embodiment 1. A non-transitory computer readable medium including a first set of computer executable instructions which when executed by a processor of a Session Initiation Protocol Load Balancer (SLB) cause the SLB to perform the steps of: establishing a first connection oriented protocol connection between a first Session Initiation Protocol Load Balancer (SLB) of a plurality of SLBs and a client device; receiving via the first connection oriented protocol connection at the first Session Initiation Protocol Load Balancer (SLB) a first Session Initiation Protocol (SIP) REGISTER request message from the first client device; determining, by the first SLB, based on information received from the client device, a first Session Border Controller (SBC) from a plurality of SBCs to send the first SIP REGISTER request message, said information uniquely identifying the first SBC from other SBCs in the plurality of SBCs; and sending, by the first SLB, the first SIP REGISTER request message to the first SBC.

Non-transitory Computer Readable Medium Embodiment 1A. The non-transitory computer readable medium of Non-transitory Computer Readable Medium Embodiment 1, wherein the plurality of SLBs is a cluster of SLBs.

Non-transitory Computer Readable Medium Embodiment 1AA. The non-transitory computer readable medium of Non-transitory Computer Readable Medium Embodiment 1A, wherein the plurality of SBCs is a cluster of SBCs.

Non-transitory Computer Readable Medium Embodiment 1B.

The non-transitory computer readable medium of Non-transitory Computer Readable Medium Embodiment 1, wherein the SLBs of the plurality of SLBs and the SBCs of the plurality of SBCs are arranged in a cluster architecture in which front end entities distribute traffic to back end entities.

Non-transitory Computer Readable Medium Embodiment 1BB.

The non-transitory computer readable medium of Non-transitory Computer Readable Medium Embodiment 1B, wherein said plurality of SLBs are front end entities which distribute traffic to back end entities in said cluster architecture; wherein said plurality of SBCs are back end entities in said cluster architecture; and wherein said first SIP registration request message is included in the traffic distributed by the first SLB to the plurality of SBCs.

Non-transitory Computer Readable Medium Embodiment 1BBB.

The non-transitory computer readable medium of Non-transitory Computer Readable Medium Embodiment 1BB, wherein the SLBs of the plurality of SLBs is operated by a first operator (e.g., a first communications network operator).

Non-transitory Computer Readable Medium Embodiment 1BBBB. The non-transitory computer readable medium of Non-transitory Computer Readable Medium Embodiment 1BBB, wherein the plurality of SBCs are also operated by the first operator (e.g., the first communications network operator).

Non-transitory Computer Readable Medium Embodiment 2.

The non-transitory computer readable medium of Non-transitory Computer Readable Medium Embodiment 1, wherein the first connection oriented protocol connection is a Transmission Control Protocol connection.

Non-transitory Computer Readable Medium Embodiment 3.

The non-transitory computer readable medium of Non-transitory Computer Readable Medium Embodiment 1, wherein the first connection oriented protocol connection is a Transmission Control Protocol/Transport Layer Security (TCP/TLS) connection.

One or more of the entities, e.g., Client, SLB, SBC, Registrar, of the above described systems may be, and in some embodiments are, implemented as physical devices including a processor, input/output interface(s), and memory. The memory including instructions which when executed by the processor control the device to perform one or more steps and/or functions in the various embodiments discussed above. One or more of the entities, e.g., Client, SLB, SBC, Registrar, of the above described systems may be, and in some embodiments are, implemented as virtual devices, e.g., on a compute node. In some such embodiments, the compute node includes a processing unit, e.g., a processor, and memory or is connected to memory. The memory being used for storage and/or instructions which when executed by the processing entity of the compute node causing it to perform one or more steps and/or functions of the various embodiments discussed above.

In various embodiments nodes and/or elements described herein are implemented using one or more components to perform the steps corresponding to one or more methods, for example, token generation, message generation, message reception, signal processing, sending, receiving, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a Client device, a SIP load balancer, session border controller, Registrar, network nodes and/or network equipment devices, including a processor configured to implement one, multiple or all of the steps of one or more methods of the invention.

In some embodiments, the processor or processors, e.g., GPUs and/or CPUs, of one or more devices, e.g., computing nodes, are configured to perform the steps of the methods described as being performed by the computing nodes, e.g., SBC, SLB, DB. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., computing node with a processor which includes a component corresponding to each of the steps of the various described methods performed by the device in which the processor is included. In some but not all embodiments a device, e.g., computing node, includes a component corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a computing device or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., GPU or CPU, configured to implement some or all of the steps of the methods described herein. The processor may be for use in a computer node described in the present application.

Numerous additional variations on the methods and apparatus of the various embodiments described above will be apparent to those skilled in the art in view of the above description. Such variations and embodiments are to be considered within the scope of the invention.

What is claimed is:

1. A communications method comprising:
   establishing a first connection oriented protocol connection between a first Session Initiation Protocol Load Balancer (SLB) of a plurality of SLBs and a client device;
   receiving via the first connection oriented protocol connection at the first SLB a first Session Initiation Protocol (SIP) REGISTER request message from the client device;
   determining, by the first SLB, based on information received from the client device, a first Session Border Controller (SBC) from a plurality of SBCs to send the first SIP REGISTER request message, said information uniquely identifying the first SBC from other SBCs in the plurality of SBCs;
   sending, by the first SLB, the first SIP REGISTER request message to the first SBC; and
   wherein the first SIP REGISTER request message is received by the first SLB from the client device after a second connection oriented protocol connection between a second SLB of the plurality of SLBs and the client device has been dropped.

2. The communications method of claim 1, wherein the SLBs of the plurality of SLBs and the SBCs of the plurality of SBCs are arranged in a cluster architecture in which front end entities distribute traffic to back end entities.

3. The communications method of claim 1, wherein the first connection oriented protocol connection is a Transmission Control Protocol (TCP) connection.

4. The communications method of claim 1, wherein the first connection oriented protocol connection is a Transmission Control Protocol/Transport Layer Security (TCP/TLS) connection.

5. The communications method of claim 1, wherein the information received from the client device is included in the first SIP REGISTER request message.

6. The communications method of claim 1, wherein the information uniquely identifying the first SBC from other SBCs in the plurality of SBCs is an SBC Instance-Id corresponding to the first SBC.

7. The communications method of claim 1, wherein the information received from the client device is included in a Transport Layer Security (TLS) session ticket.

8. The communications method of claim 1, further comprising:
   receiving with said information from the client device uniquely identifying the first SBC from other SBCs in the plurality of SBCs, one or more of the following additional pieces of information:
   a client identifier, said client identifier uniquely identifying the client device, or a SLB identifier, said SLB identifier identifying one of the SLBs of the plurality of SLBs.

9. A communications method comprising:
   establishing a first connection oriented protocol connection between a first Session Initiation Protocol Load Balancer (SLB) of a plurality of SLBs and a client device;
   receiving via the first connection oriented protocol connection at the first SLB a first Session Initiation Protocol (SIP) REGISTER request message from the client device;
   determining, by the first SLB, based on information received from the client device, a first Session Border Controller (SBC) from a plurality of SBCs to send the first SIP REGISTER request message, said information uniquely identifying the first SBC from other SBCs in the plurality of SBCs;
   sending, by the first SLB, the first SIP REGISTER request message to the first SBC; and
   wherein the information received from the first client device has been encrypted by a second SLB, said second SLB being one of the plurality of SLBs using an encryption key unknown to any of the SBCs of the plurality of SBCs or to the client device;
   wherein the encryption key is known to other SLBs in the plurality of SLBs; and
   wherein the encryption key is needed to decrypt the information.

10. A communications method comprising:
    establishing a first connection oriented protocol connection between a first Session Initiation Protocol Load Balancer (SLB) of a plurality of SLBs and a client device;
    receiving via the first connection oriented protocol connection at the first SLB a first Session Initiation Protocol (SIP) REGISTER request message from the client device;
    determining, by the first SLB, based on information received from the client device, a first Session Border Controller (SBC) from a plurality of SBCs to send the first SIP REGISTER request message, said information uniquely identifying the first SBC from other SBCs in the plurality of SBCs;
    sending, by the first SLB, the first SIP REGISTER request message to the first SBC; and wherein the information received from the client device is included in an encrypted token contained in the first SIP REGISTER request message.

11. The communications method of claim 10, further comprising:
generating, by a second SLB of the plurality of SLBs, the encrypted token; and
sending, by the second SLB, the encrypted token to the client device in response to a second SIP REGISTER request message prior to the first SLB receiving the first SIP REGISTER request message.

12. A communications method comprising:
establishing a first connection oriented protocol connection between a first Session Initiation Protocol Load Balancer (SLB) of a plurality of SLBs and a client device, the first connection oriented protocol connection being a Transmission Control Protocol (TCP) connection;
receiving via the first connection oriented protocol connection at the first SLB a first Session Initiation Protocol (SIP) REGISTER request message from the client device;
determining, by the first SLB, based on information received from the client device, a first Session Border Controller (SBC) from a plurality of SBCs to send the first SIP REGISTER request message, said information uniquely identifying the first SBC from other SBCs in the plurality of SBCs;
sending, by the first SLB, the first SIP REGISTER request message to the first SBC;
receiving by the first SLB a first TCP SYN packet as part of establishing the first connection oriented protocol connection between the first SLB of the plurality of SLBs and the client device; and
in response to receiving the first TCP SYN packet, installing, by the first SLB, a microflow at the first SLB to perform Internet Protocol (IP) packet policing of TCP packets received at the first SLB having a source IP address, source port number, destination IP address, destination port number and transport protocol type of TCP matching a source IP address, source port number, destination IP address, destination port number and transport protocol type of TCP of the received TCP SYN packet.

13. A communications system comprising:
a first Session Initiation Protocol Load Balancer (SLB), said first SLB being one of a plurality of SLBs, said first SLB including:
a memory; and
a first processor, said first processor controlling the first SLB to perform the following operations:
establishing a first connection oriented protocol connection between the first SLB of the plurality of SLBs and a client device;
receiving via the first connection oriented protocol connection at the first SLB a first Session Initiation Protocol (SIP) REGISTER request message from the client device;
determining, by the first SLB, based on information received from the client device, a first Session Border Controller (SBC) from a plurality of SBCs to send the first SIP REGISTER request message, said information uniquely identifying the first SBC from other SBCs in the plurality of SBCs;
sending, by the first SLB, the first SIP REGISTER request message to the first SBC; and
wherein the first SIP REGISTER request message is received by the first SLB from the client device after a second connection oriented protocol connection between a second SLB of the plurality of SLBs and the client device has been dropped.

14. The communications system of claim 13, wherein the SLBs of the plurality of SLBs and the SBCs of the plurality of SBCs are arranged in a cluster architecture in which front end entities distribute traffic to back end entities.

15. The communications system of claim 13, wherein the first connection oriented protocol connection is a Transmission Control Protocol/Transport Layer Security (TCP/TLS) connection.

16. The communications system of claim 13, wherein the information received from the client device is included in the first SIP REGISTER request message.

17. The communications system of claim 13, wherein the information received from the client device is included in a Transport Layer Security (TLS) session ticket.

18. A communications system comprising:
a first Session Initiation Protocol Load Balancer (SLB), said first SLB being one of a plurality of SLBs, said first SLB including:
a memory; and
a first processor, said first processor controlling the first SLB to perform the following operations:
establishing a first connection oriented protocol connection between the first SLB of the plurality of SLBs and a client device;
receiving via the first connection oriented protocol connection at the first SLB a first Session Initiation Protocol (SIP) REGISTER request message from the client device;
determining, by the first SLB, based on information received from the client device, a first Session Border Controller (SBC) from a plurality of SBCs to send the first SIP REGISTER request message, said information uniquely identifying the first SBC from other SBCs in the plurality of SBCs;
sending, by the first SLB, the first SIP REGISTER request message to the first SBC; and
wherein the information received from the client device has been encrypted by a second SLB, said second SLB being one of the plurality of SLBs using an encryption key unknown to any of the SBCs of the plurality of SBCs or to the client device;
wherein the encryption key is known to other SLBs in the plurality of SLBs; and
wherein the encryption key is needed to decrypt the information.

19. A non-transitory computer readable medium including a first set of computer executable instructions which when executed by a processor of a first Session Initiation Protocol Load Balancer (SLB) of a plurality of SLBs cause the first SLB to perform the steps of:
establishing a first connection oriented protocol connection between the first SLB of the plurality of SLBs and a client device;
receiving via the first connection oriented protocol connection at the first SLB a first Session Initiation Protocol (SIP) REGISTER request message from the client device;
determining, by the first SLB, based on information received from the client device, a first Session Border Controller (SBC) from a plurality of SBCs to send the first SIP REGISTER request message, said information uniquely identifying the first SBC from other SBCs in the plurality of SBCs;

sending, by the first SLB, the first SIP REGISTER request message to the first SBC; and wherein the first SIP REGISTER request message is received by the first SLB from the client device after a second connection oriented protocol connection between a second SLB of the plurality of SLBs and the client device has been dropped.

20. The non-transitory computer readable medium of claim 19, wherein the information received from the client device is included in the first SIP REGISTER request message or in a Transport Layer Security (TLS) session ticket.

* * * * *